United States Patent
Shirley

(10) Patent No.: US 6,690,474 B1
(45) Date of Patent: Feb. 10, 2004

(54) APPARATUS AND METHODS FOR SURFACE CONTOUR MEASUREMENT

(75) Inventor: Lyle Shirley, Boxboro, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/480,043

(22) Filed: Jan. 10, 2000

Related U.S. Application Data

(63) Continuation-in-part of application No. 09/241,354, filed on Feb. 2, 1999, now Pat. No. 6,031,612, which is a continuation-in-part of application No. 08/600,216, filed on Feb. 12, 1996, now Pat. No. 5,870,191.
(60) Provisional application No. 60/087,960, filed on Jun. 4, 1998.

(51) Int. Cl.[7] .......................... G01B 11/02; G01B 11/04
(52) U.S. Cl. ........................ 356/603; 356/605; 356/512
(58) Field of Search ................................ 356/511, 512, 356/603, 604, 605; 382/154

(56) References Cited

U.S. PATENT DOCUMENTS

| | | | |
|---|---|---|---|
| 3,994,589 A | 11/1976 | Nodwell et al. | |
| 4,139,304 A | 2/1979 | Redman et al. | 356/358 |
| 4,298,286 A | 11/1981 | Maxey et al. | 356/381 |
| 4,349,277 A | 9/1982 | Mundy et al. | 356/376 |
| 4,499,492 A | 2/1985 | Hutchin | 358/107 |
| 4,781,455 A | 11/1988 | Mächler et al. | 356/34 |
| 4,832,489 A | 5/1989 | Wyant et al. | 356/359 |
| 5,146,293 A | 9/1992 | Mercer et al. | 356/356 |

(List continued on next page.)

FOREIGN PATENT DOCUMENTS

| | | |
|---|---|---|
| DE | 2554086 | 6/1977 |
| DE | 28 50 092 A1 | 5/1980 |
| DE | 44 04 663 A1 | 8/1995 |
| EP | 0 864 847 A3 | 9/1998 |
| EP | 0 864 847 A2 | 9/1998 |
| FR | 2 595 815 | 9/1987 |
| GB | 2142427 A | 1/1985 |
| JP | 58173412 | 10/1983 |
| JP | 61198009 | 9/1986 |
| WO | 97/29341 | 8/1997 |

OTHER PUBLICATIONS

Butters, Von J. N., "Using the Laser to Measure Length," *Materialprüf*, 24:245–248 (Jul. 7, 1982) (German Abstract).

(List continued on next page.)

*Primary Examiner*—Zander V. Smith
(74) *Attorney, Agent, or Firm*—Testa, Hurwitz & Thibeault, LLP

(57) ABSTRACT

Apparatus and methods of measuring three-dimensional position information of a point on the surface of an object. In one embodiment, the method includes the steps of providing two sources of radiation having a spectral distribution, illuminating the surface with each of the sources to produce a first fringe pattern, moving the first fringe pattern to a second position, generating a first wrapped cycle map, estimating fringe numbers in the first fringe pattern, changing the first fringe pattern, moving the second fringe pattern to a second position, generating a second wrapped cycle map, estimating fringe numbers in the second fringe pattern, and determining position information in response to the estimated fringe numbers in the second fringe pattern and the second wrapped cycle map. In another embodiment the apparatus includes two sources of radiation having a spectral distribution and being coherent with respect to one another, a control system for moving each of the sources relative to each other, a detector positioned at the point on the surface of the object to receive radiation illuminating the point on the surface of the object, and a processor for receiving signals from the detector. The processor calculates position information of the point on the surface of the object in response to the movement of the sources and the radiation received at the point on the surface of the object.

84 Claims, 26 Drawing Sheets

U.S. PATENT DOCUMENTS

| | | | | |
|---|---|---|---|---|
| 5,289,264 | A | | 2/1994 | Steinbichler ............... 356/376 |
| 5,455,670 | A | | 10/1995 | Payne et al. ................ 356/5.1 |
| 5,621,529 | A | * | 4/1997 | Gordon et al. .............. 356/604 |
| 5,666,197 | A | * | 9/1997 | Guerra ....................... 356/512 |
| 6,049,384 | A | * | 4/2000 | Rudd et al. .................. 356/603 |
| 6,438,272 | B1 | * | 8/2002 | Huang et al. ............... 382/286 |
| 2001/0012388 | A1 | | 8/2001 | Muller et al. |

OTHER PUBLICATIONS

Zou et al., "Two–Wavelength DSPI Surface Contouring Through the Temperature Modulation of a Laser Diode," *Optik, 94*(4):155–158 (1993).

Peng et al., "A Simplified Multi–Wavelength ESPI Contouring Technique Based on a Diode Laser System," *Optik, 91*(2):81–85 (1992).

Fercher et al., "Two–Wavelength Speckle Interferometric Technique for Rough Face Contour Measurement," *Optical Engineering, 25*(5):623–626 (May 1986).

Fercher et al., "Rough Surface Interferometry with a Two-Wavelength Heterodyne Speckle Interferometer," *Applied Optics, 24*(14):2181–1288 (Jul. 15, 1985).

Thalmann et al., "Dimensional Profiling by Electronic Phase Measurement," *SPIE Industrial Laser Interferometry, 746*:61–68 (1987).

Takeda et al., "Fourier–Transform Speckle Profilometry: Three–Dimensional Shape Meaurements of Diffuse Objects with Large Height Steps and/or Spatially Isolated Surfaces," *Applied Optics, 33*(34):7829–7837 (Dec. 1, 1994).

Volotovskaya, N.K., "Relationship Between the Frequency and Angular Correlation Function of a Signal that is Scattered by an Extensive Body," *Radio Engineering and Electronic Physics J. 16*(6):1048–1049 (Jun. 1971).

Dresel et al., "Three–Dimensional Sensing of Rough Surfaces by Coherence Radar," *Applied Optics, 31*(7):919–925 (Mar. 1, 1992).

Shirley et al., "Advanced Techniques for Target Discrimination Using Laser Speckle," *Massachusetts Institute of Technology, The Lincoln Laboratory J., 5*(3):367–440 (1992).

Shirley, L. G., "Applications of Tunable Lasers to Laser Radar and 3D Imaging," *Technical Report 1025, Massachusetts Institute of Technology, Lincoln Laboratory*, (1995).

K. Creath, "Phase–measurement interferometry techniques," Chap. 5 in *Progress in Optics XXVI*, E. Wolf Ed. pp. 349–393, Elsevier Science Publishers, New York, NY (1988).

G.T. Reid, R.C. Rixon, and H.I. Messer, "Absolute and comparative measurements of three–dimensional shape by phase measuring moire topography," *Optics and Laser Technology*, 315–319, Dec., (1984).

G. Indebetouw, "Profile measurement using projection of running fringes," *Applied Optics*, 17(8), 2930–2933 (1978).

V. Srinivasan, H.C. Liu, and M. Halioua, "Automated phase-measuring profilometry of 3–D diffuse objects," *Applied Optics*, 23(18), 3105–3108 (1984).

L.S. Wang, B.N. Dobbins, K. Jambunathan, and X.P. Wu, "Fibre optic shape measuring system using phase stepping speckle pattern interferometry," *SPIE*, 2088, MJ. Downs Ed., pp. 104–110 (1993).

L.H. Bieman, "Absolute measurement using field shifted moire," SPIE, 1614, 259–264 (1991).

H.O. Saldner and J.M. Huntley, "Temporal phase unwrapping: application of surface profiling of discontinuous objects," *Applied Optics*, 36(13), 2770–2775 (1997).

K. Creath, "Phase–shifting speckle interferomety," *Applied Optics*, vol. 24, No. 18, (1985).

J.M Huntley and H.O. Saldner, "Shape measurement by temporal phase unwrapping and spatial light modulator-based fringe projector," *SPIE*, vol. 3100, 185–192, (1997).

R.W. Wygant, S.P. Almeida, O.D.D. Soares, "Surface inspection via projection interferometry," *Applied Optics*, vol. 27, No. 22, (1988).

D. Paoletti and S. Spagnolo, "Fast Fourier Transformed Electronic Speckle Contouring for Diffuse Surfaces Profilometry," *Optics and Lasers in Engineering*, 20, 87–96, (1994).

G. Sansoni, L. Biancardi, U. Minoni, F. Docchio, "A Novel, Adaptive System for 3–D Optical Profilometry Using a Liquid Crystal Projector," *IEEE Transactions on Instrumentation and Measurement*, vol. 43, No. 4, (1994).

M. Chang, C. Ho, C. Hu, "A Design for an Optical Coordinate Measuring Machine System," *Proc. Natl. Sci. Counc. ROC(A)*, vol. 18, No. 5, 477–484, (1994).

C. Joenathan, B. Pfister, H.J. Tiziani, "Contouring by electronic speckle pattern interferometry employing dual beam illumination," *Applied Optics*, vol. 29, No. 13, (1990).

\* cited by examiner

APPARATUS AND METHODS FOR SURFACE CONTOUR MEASUREMENT

CROSS-REFERENCE TO RELATED APPLICATIONS

This application is a continuation-in-part of U.S. patent application Ser. No. 09/241,354 which was filed on Feb. 2, 1999 now U.S. Pat. No. 6,031,612 which is a continuation-in-part application of U.S. Ser. No. 08/600,216 now U.S. Pat. No. 5,870,191 which was filed on Feb. 12, 1996 and claims priority to provisional U.S. patent application No. 60/087,960 which was filed Jun. 4, 1998.

GOVERNMENT SUPPORT

Work described herein was supported by Federal Contract No. F19628-95-L-002, awarded by the United States Air Force. The Government may have certain rights in the invention.

FIELD OF THE INVENTION

The invention relates to the field of surface measurement and, more specifically, to the field of non-contact surface measurement.

BACKGROUND OF THE INVENTION

Dimensional metrology, the measurement of the size and shape of objects, is very important in today's manufacturing environment in which machines perform much of the fabrication and assembly of complex objects composed of many subassemblies. The shape and size of each component in a complex assembly, such as an automobile, must be held to close tolerances to ensure that the components fit together properly.

Ideally such measurements of shape and size are accomplished without physical contact in order to save time in making the measurement. Many non-contact measurement methods make use of available machine vision systems. The measurement of surface contour information is an especially difficult problem in machine vision systems since depth information is often lost or is difficult to interpret. To compensate for the loss of depth information and the difficulty in interpreting the information which is available, many machine vision systems utilize light to create moiré patterns on the surface of the object in order to obtain contour information. One disadvantage of the moiré technique is its inflexibility with respect to objects of different sizes. Objects of different sizes may require new corresponding physical setups. Due to this disadvantage, it is difficult to use a moire technique for large-scale objects. Another disadvantage of a moiré technique is that the resolution obtained using the technique may not be high enough for many applications Interferometric methods have also been used when detailed measurements of the surface are needed. Although interferometric systems provide surface contour information, they are sensitive to vibrations in both the object being measured and the source of illumination being used.

What is needed is a technique which avoids these problems by resolving fringe order ambiguities, mitigating degradation due to speckle effects and attaining high resolution.

SUMMARY OF THE INVENTION

The invention is related to a method for determining, on an object having a surface, three-dimensional position information of a point on the surface of the object including the steps of providing two sources of radiation having a spatial distribution of spectral regions, illuminating the surface with radiation from each of the sources to produce a first fringe pattern at a first position on the surface, moving the first fringe pattern to a second position, generating a first wrapped cycle map in response to the first and second positions of the first fringe pattern, estimating fringe numbers in the first fringe pattern, changing the first fringe pattern to generate a second fringe pattern at a first position, moving the second fringe pattern to a second position, generating a second wrapped cycle map in response to the first and second positions of the second fringe pattern, estimating fringe numbers in the second fringe pattern in response to the estimated fringe numbers in the first fringe pattern, and determining three-dimensional position information of the point on the surface in response to the estimated fringe numbers in the second fringe pattern and the second wrapped cycle map.

The invention is further related to a method for synthesizing a wrapped cycle map corresponding to a fringe pattern of a predetermined spacing on a surface including the steps of providing two sources of radiation having a spatial distribution of spectral regions, illuminating the surface with radiation from each of the sources to produce a first fringe pattern at a first position on the surface, moving the first fringe pattern to a second position on the surface, generating a first wrapped cycle map in response to the first and second positions of the first fringe pattern, changing the first fringe pattern to generate a second fringe pattern at a first position, moving the second fringe pattern to a second position, generating a second wrapped cycle map in response to the first and second positions of the second fringe pattern, subtracting the second wrapped cycle map from the first wrapped cycle map, and wrapping the difference between the second wrapped cycle map and the first wrapped cycle map to generate a wrapped cycle map corresponding to the fringe pattern of the predetermined spacing.

The invention further relates to a method for determining, on an object having a surface, three-dimensional position information of a point on the surface of the object including the steps of generating a first and a second beam of radiation having a first frequency and being coherent with respect to one another, illuminating the surface with the second beam of radiation, generating a first interference pattern at a first position in response to the first beam of radiation and radiation from the second beam of radiation scattered by the surface, moving the first interference pattern to a second position, generating a first wrapped cycle map in response to the first and second positions of the first interference pattern, estimating intensity cycles in the first interference pattern, changing the first interference pattern to generate a second interference pattern at a first position, moving the second interference pattern to a second position, generating a second wrapped cycle map in response to the first and second positions of the second interference pattern, estimating intensity cycles in the second interference pattern in response to estimated intensity cycles in the first interference pattern, and calculating three-dimensional position information in response to the estimated intensity cycles in the second interference pattern and the second wrapped cycle map.

The invention further relates to a method for determining, on an object having a surface, three-dimensional position information of a point on the surface of the object including the steps of generating a first and a second beam of radiation being coherent with respect to one another, illuminating the surface with the second beam of radiation, generating a first interference pattern in response to the first beam of radiation and radiation from the second beam of radiation scattered by the surface, phase shifting one of the first and second beams of radiation with respect to the other of the first and second beams of radiation to generate a first phase shifted interference pattern, generating a first wrapped cycle map in response to the first interference pattern and the first phase shifted interference pattern, changing the first interference pattern to generate a second interference pattern, phase shifting one of the first and second beams of radiation with respect to the other of the first and second beams of radiation to generate a second phase shifted interference pattern, generating a second wrapped cycle map in response to the second interference pattern and the second phase shifted interference pattern, subtracting the second wrapped cycle map from the first wrapped cycle map, and wrapping the difference between the second wrapped cycle map and the first wrapped cycle map to generate a wrapped cycle map.

The invention also relates to an apparatus for projecting fringes onto a surface of an object including two sources of radiation having a spectral distribution, a collimator in optical communication with the two sources, the collimator generating two substantially collimated beams of broadband radiation, a diffractive grating in optical communication with the collimator, and a lens in optical communication with the diffractive grating, the lens generating two images of radiation having a spatial distribution of spectral regions.

The invention also relates to a method for projecting fringes onto a surface of an object including the steps of providing two sources of radiation separated by a distance and generating radiation having a spectral distribution, collimating the radiation to generate two substantially collimated beams of radiation, delineating spectral components of the collimated beams of radiation, and generating two images of radiation having a spatial distribution of spectral components.

The invention further relates to a method for determining, on an object having a surface, three-dimensional position information of a point on the surface of the object including the steps of projecting a first cyclical pattern to produce a first projected pattern at a first position on the surface, moving the first projected pattern to a second position, generating a first wrapped cycle map in response to the first and second positions of the first projected pattern, estimating cycle numbers in the first projected pattern, changing the first projected pattern to generate a second projected pattern at a first position, moving the second projected pattern to a second position, generating a second wrapped cycle map in response to the first and second positions of the second projected pattern, estimating cycle numbers in the second projected pattern in response to the estimated cycle numbers in the first projected pattern, and determining the surface in response to the estimated cycle numbers in the second projected pattern and the second wrapped cycle map.

The invention further relates to a method for synthesizing a wrapped cycle map corresponding to a projected cyclical pattern of a predetermined spacing on a surface including the steps of projecting a first cyclical pattern to produce a first projected pattern at a first position on the surface, moving the first projected pattern to a second position on the surface, generating a first wrapped cycle map in response to the first and second positions of the first projected pattern, changing the first projected pattern to generate a second projected pattern at a first position, moving the second projected pattern to a second position, generating a second wrapped cycle map in response to the first and second positions of the second projected pattern, subtracting the second wrapped cycle map from the first wrapped cycle map, and wrapping the difference between the second wrapped cycle map and the first wrapped cycle map to generate a wrapped cycle map corresponding to the projected cyclical pattern of the predetermined spacing.

The invention further relates to a method for mitigating the effects of speckle on a measurement of a point on a surface of an object including the steps of generating a coherent fringe pattern, projecting the coherent fringe pattern along an optical path onto the surface of the object such that the fringe pattern substantially grazes the surface of the object, and detecting the fringe pattern and the speckle in an image of the surface of the object, where a normal to the surface of the object is substantially orthogonal to the optical path.

The invention further relates to a method for mitigating the effects of speckle on a measurement of a point on a surface of an object including the steps of generating a coherent fringe pattern from two sources of radiation separated by a distance, projecting the coherent fringe pattern onto the surface of the object, detecting the fringe pattern and the speckle in an image of the surface of the object, translating the two sources such that the fringe pattern remains substantially stationary and the speckle changes, detecting the new fringe pattern and the changed speckle in an image of the surface of the object, and determining the fringe pattern substantially without speckle in response to the detected fringe patterns and the change in speckle.

The invention also relates to a method for mitigating the effects of speckle on a measurement of a point on a surface of an object including the steps of generating a coherent fringe pattern from two sources of radiation separated by a distance, projecting the coherent fringe pattern onto the surface of the object, detecting the fringe pattern and the speckle in an image of the surface of the object, translating the object laterally with respect to the two sources of radiation along a path parallel to the equiphase plane of the fringe pattern such that the fringe pattern remains substantially stationary with respect to the surface of the object and the speckle changes, detecting the new fringe pattern and the changed speckle in an image of the surface of the object, and determining the fringe pattern substantially without speckle in response to the detected fringe patterns and the change in speckle.

The invention also relates to a method for mitigating the effects of speckle on a measurement of a point on a surface of an object including the steps of projecting a coherent fringe pattern onto the surface of the object, providing a lens having a transmission function having a gradual transmission drop off at the lens edge, and detecting the fringe pattern in an image of the surface of the object, where the transmission function substantially reduces the speckle influence on the measurement.

The invention also relates to a method for mitigating the effects of speckle on a measurement of a point on a surface of an object including the steps of generating a first fringe pattern from two sources of radiation having a first frequency and separated by a distance, changing the first fringe pattern to generate a second fringe pattern by changing the first frequency to a second frequency, and changing the distance in response to the difference between the first frequency and the second frequency, where the ratio of the distance to the difference between the first frequency and the second frequency is substantially constant.

The invention further relates to a method for projecting fringes onto a surface of an object including the steps of providing two sources of radiation separated by a distance, having a spectral distribution, and being coherent with respect to the other of the sources, illuminating the point on the surface of the object with the radiation from each of the sources, moving one of the sources relative to the other of the sources, and detecting radiation scattered by the point on the surface of the object. In another embodiment of the invention, the step of providing two sources of radiation includes providing an initial beam of radiation having a spectral width, generating a first radiation beam at a first beam angle and a second radiation beam at a second beam angle from the initial beam of radiation, and imaging the first radiation beam and the second radiation beam to form the two sources of radiation.

The invention also relates to an apparatus for projecting fringes onto a surface of an object including two sources of radiation separated by a distance, each source having a spectral distribution, and being coherent with respect to the other of the sources, a control system moving each of the sources relative to the other of the sources, and a detector positioned to receive radiation scattered from the point on the surface of the object. In another embodiment of the invention, the two sources of radiation include, an initial source of a beam of radiation having a spectral width, a beam separator in optical communication with the initial source of a beam of radiation generating a first optical beam and a second optical beam, and an imaging system optically connected to the beam separator. The imaging system generates the two sources of radiation each respective source of radiation corresponding to the first optical beam and the second optical beam, respectively.

The invention further relates to a method for determining, on an object having a surface, three-dimensional position information of a point on the surface of the object including the steps of providing two sources of radiation having a spectral distribution and being coherent with respect to the other of the two sources, providing a detector at the point on the surface, illuminating the point on the surface of the object with the radiation from each of the sources, moving each of the sources relative to each other, detecting the radiation at the point on the surface of the object, and calculating position information in response to the movement of the sources and the radiation detected at the point on the surface of the object.

The invention further relates to an apparatus for determining, on an object having a surface, three-dimensional position information of a point on the surface of the object including two sources of radiation having a spectral distribution and being coherent with respect to one another, a control system moving each of the sources relative to each other, a detector positioned at the point on the surface of the object to receive radiation illuminating the point on the surface of the object, and a processor receiving signals from the detector, the processor calculating position information of the point on the surface of the object in response to the movement of the sources and the radiation received at the point on the surface of the object.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

While describing the embodiment of the invention, reference will be made to "sources" and "sources of radiation." These terms are meant to refer to any source of radiation, including highly localized sources of radiation.

Figure 1:
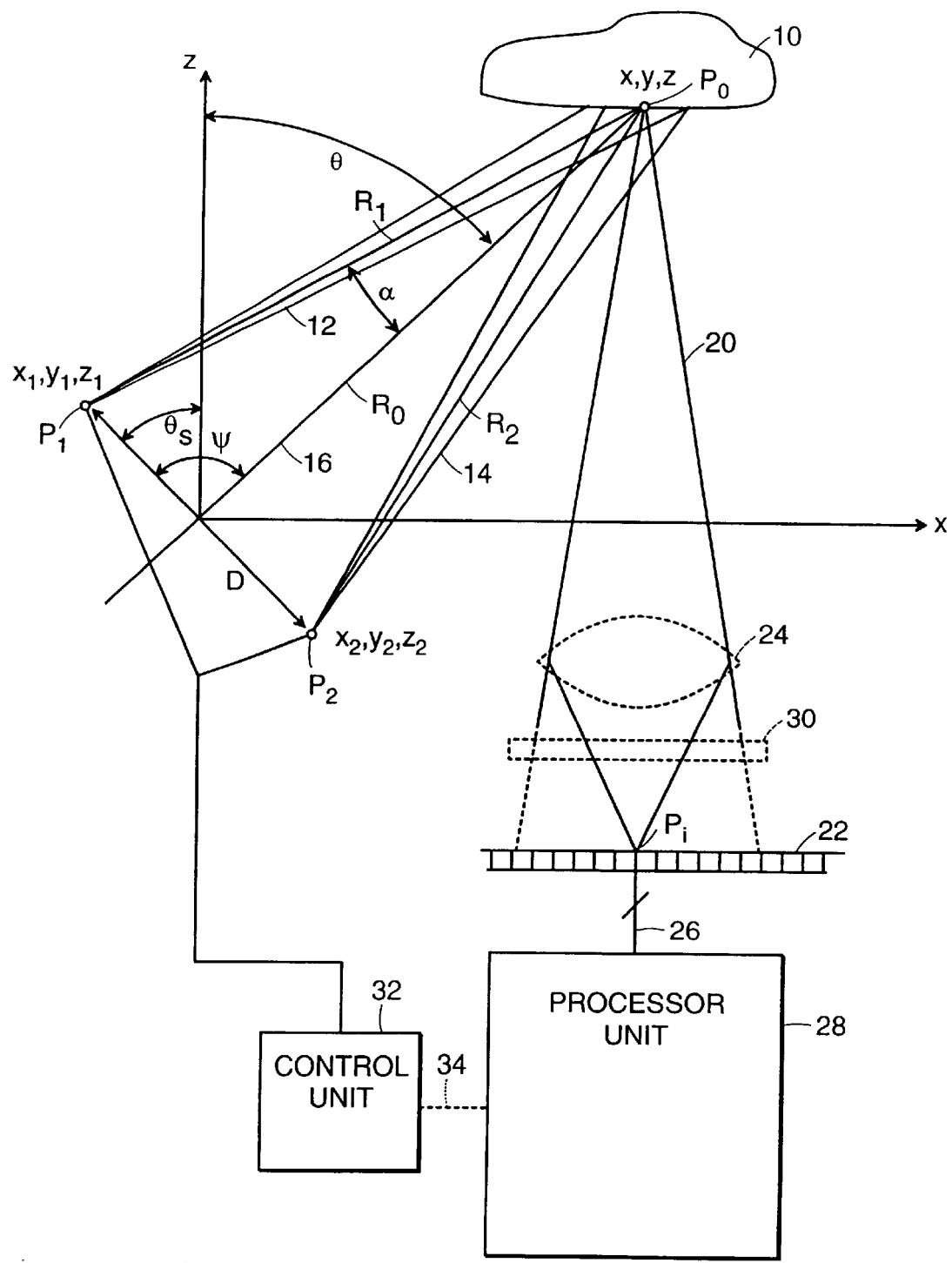
FIG. 1 is a block diagram of an embodiment of the invention for making surface contour measurements.

Referring to FIG. 1, and in brief overview, two sources of radiation $P_1$ and $P_2$ are separated by a fixed distance D and have spatial coordinates of $(x_1,y_1,z_1)$ and $(x_2,y_2,z_2)$, respectively. The radiation from each of the sources $P_1$ and $P_2$ is coherent with respect to the radiation from the other one of the sources. Each source, $P_1$ and $P_2$, directs its respective divergent beam of radiation 12 and 14 toward a point $P_0$ on the surface of an object 10. The distance from each respective source of radiation, $P_1$ and $P_2$, to the point on the surface $P_0$ is indicated by $R_1$ and $R_2$, respectively. $\psi$ is the angle between the line extending from the origin to the point $P_0$ and the line extending between sources $P_1$ and $P_2$, $\theta_s$ is the angle between the z axis and the line extending between the sources $P_1$ and $P_2$, and $\alpha$ is the half angle subtended by the source points as viewed from $P_0$. Each beam 12, 14 is substantially polarized in the same direction as the other beam 14, 12 and may be independently scannable to simultaneously illuminate different regions on the object 10. Alternatively, the entire object 10 may be illuminated simultaneously.

Light scattered 20 by the point $P_0$ is detected by a photodetector 22. In one embodiment, the photodetector 22 comprises an array of photodetector elements providing a two dimensional image of the object 10 to be measured. In a further embodiment, the array of photodetector elements is a charge coupled device (CCD). The detector 22 provides an output signal 26 comprising one or more individual signals, each one associated with a corresponding one of the photodetector elements of the detector 22.

In a preferred embodiment, a focusing element 24 is positioned between the point $P_0$ on the surface of the object 10, and the photodetector 22, so as to image the illuminated portion of the object including point $P_0$ onto the detector 22. Because of the roughness of the surface of the object, and because the illuminating radiation is coherent, the focused image will be speckled. The output signal 26 from the photodetector 22 is the input signal to a processor unit 28.

A polarizer 30, in one embodiment, is placed between the focusing element 24 and the detector 22. Polarizer 30 is oriented in a direction to maximize its coincidence with the principal polarization component of the scattered light 20, so as to improve the speckle contrast or the contrast of the fringe pattern. With this arrangement, the signal-to-noise ratio associated with light scattered from the surface of the object 10 is maximized.

In one embodiment, the processor 28 is a single processor which operates on detector output signals 26 associated with each of the photodetector elements of the detector array 22. In another embodiment, the processor 28 is a multiprocessor having a plurality of individual processors and each photodetector element provides an input signal to a respective one of the processors. In yet another embodiment, in which the detector 22 is a CCD array, a plurality of the CCD elements provide an input signal to a respective processor of a multiprocessor. With the multiprocessor arrangements, computations on signals from a plurality of individual photoelements occur substantially simultaneously, thereby enhancing the signal processing speed.

A control unit 32 controls the operation of the sources of radiation, $P_1$ and $P_2$, so as to change the phase of the radiation of one of the sources relative to the phase of the radiation from the other source as measured at the point $P_0$ on the surface of the object 10. The processor 28 may be in communication with control unit 32 via signal line, or bus 34. For example, in certain applications it may be desirable for the processor 28 to process signals from the detector 22 at specific times relative to the scanning of the sources $P_1$ and $P_2$ over the surface of the object 10 or relative to the rate at which the frequency of the radiation from the sources is swept. Since such scanning and frequency sweeping operations are controlled by control unit 32, communication between the control unit 32 and the processor 28 is desirable in these circumstances. It will be appreciated that the control unit 32 and the processor 28 may be physically separate units or, alternatively, may be implemented by a single processing system.

Figure 2:
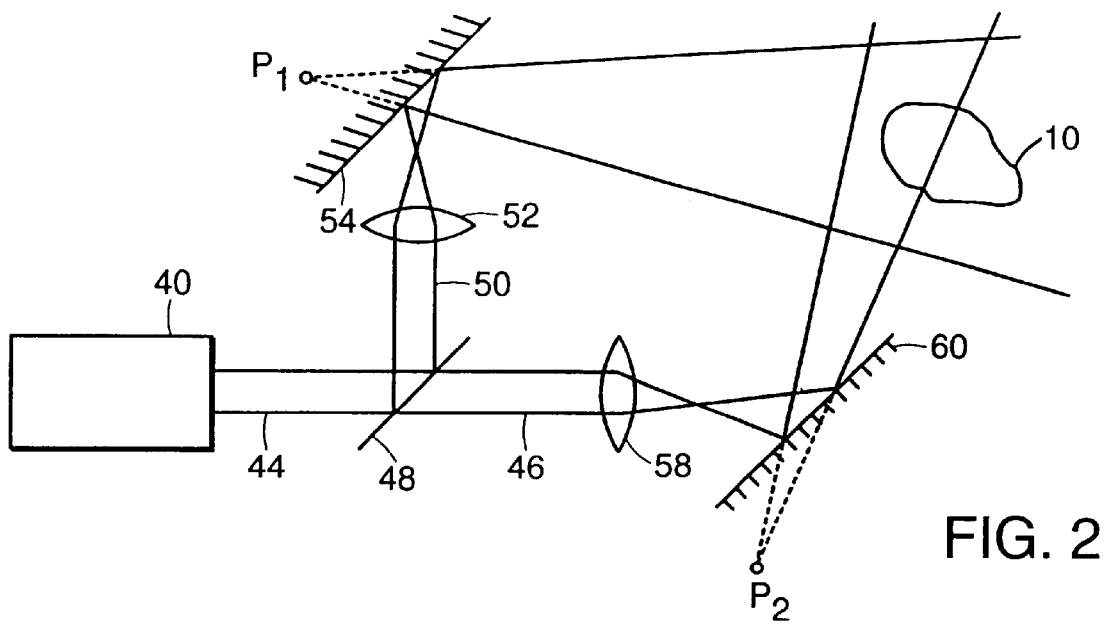
FIG. 2 is a block diagram of an embodiment of a system for producing the two sources of radiation shown in FIG. 1.

Referring now to FIG. 2, in one embodiment the sources of radiation $P_1$ and $P_2$ are formed from the radiation emitted from a tunable laser 40. The radiation beam 44 emitted by the tunable laser 40 is split by a beam splitter 48. The radiation beam 50 reflected by the beam splitter 48 is caused to diverge by a lens 52. The divergent beam is then reflected by a moveable aiming mirror 54. The radiation beam reflected by the aiming mirror 54 provides one of the sources of coherent radiation, $P_1$. Similarly, the radiation beam 46 passing through the beam splitter 48 is caused to diverge by a lens 58 which directs the divergent beam to a second moveable aiming mirror 60. The radiation beam reflected by mirror 60 provides the second source of radiation, $P_2$. Aiming mirrors 54 and 62 may be pivotable to selectively illuminate the surface of object 10. They may also be moveable to vary the positions of sources $P_1$ and $P_2$.

Figure 2A:
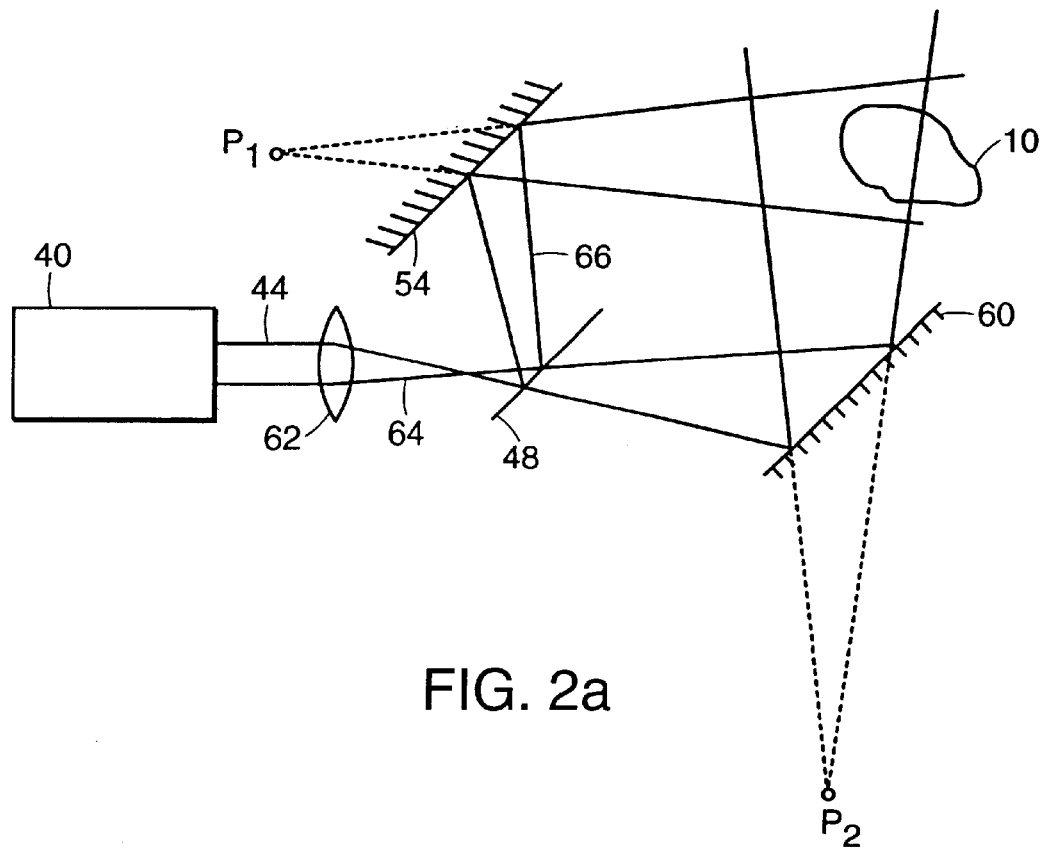
FIG. 2a is a block diagram of another embodiment of a system for producing the two sources of radiation shown in FIG. 1.

Referring to FIG. 2a, another embodiment of the sources of radiation $P_1$ and $P_2$ is shown to include a tunable laser source 40 providing a beam of radiation 44. The radiation beam 44 passes through a lens 62 which causes the beam to diverge, providing divergent beam 64. Divergent beam 64 is then reflected by beam splitter 48 to provide a first beam 66. A second beam 68 passes through the beam splitter 48, as shown. Moveable aiming mirrors 54 and 60 reflect beams 66 and 68 to provide sources $P_1$ and $P_2$ respectively.

Figure 2B:
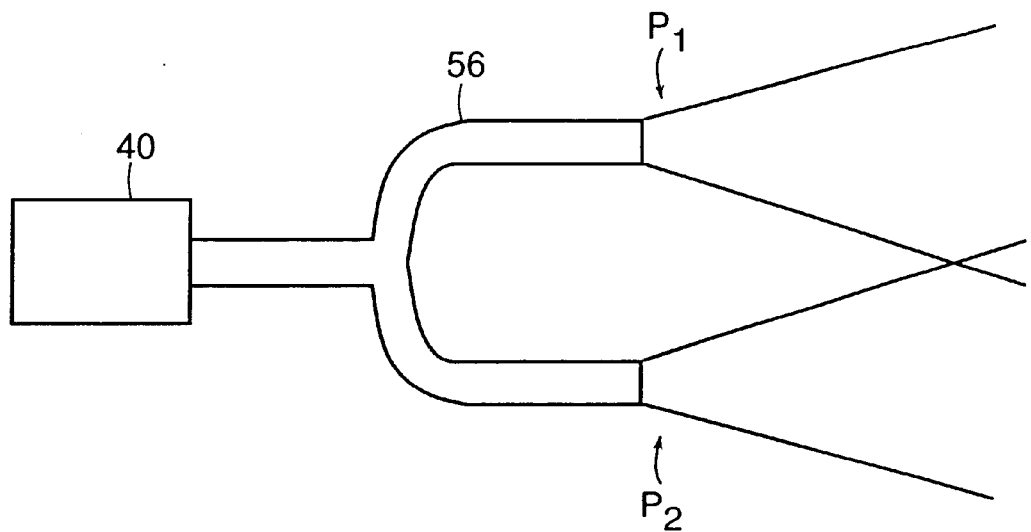
FIG. 2b is a block diagram of yet another embodiment of a system for producing the two sources of radiation shown in FIG. 1.

Referring to FIG. 2b, in another embodiment the sources of radiation $P_1$ and $P_2$ are split from the radiation emitted from a tunable laser 40 using a fiber optic splitter 56. Fibers may have beam-forming elements at their end to control or set the divergence angle of the two beams, and in one embodiment the beam-forming elements may be lenses. Sources $P_1$ and $P_2$ may alternatively be formed from a pair of tunable lasers which are frequency locked together. Other suitable embodiments of radiation sources include any sources which generate a wave having a controllable phase, such as microwaves and sonic waves.

In one embodiment, the sources of radiation $P_1$ and $P_2$ are maintained at a fixed distance D from one another by attaching each source to one end of a bar comprised of a material having a small coefficient of expansion. In another embodiment, the sources of radiation $P_1$ and $P_2$ are not held at a fixed distance but instead the distance between them, D, is known to a high degree of accuracy.

Figure 3:
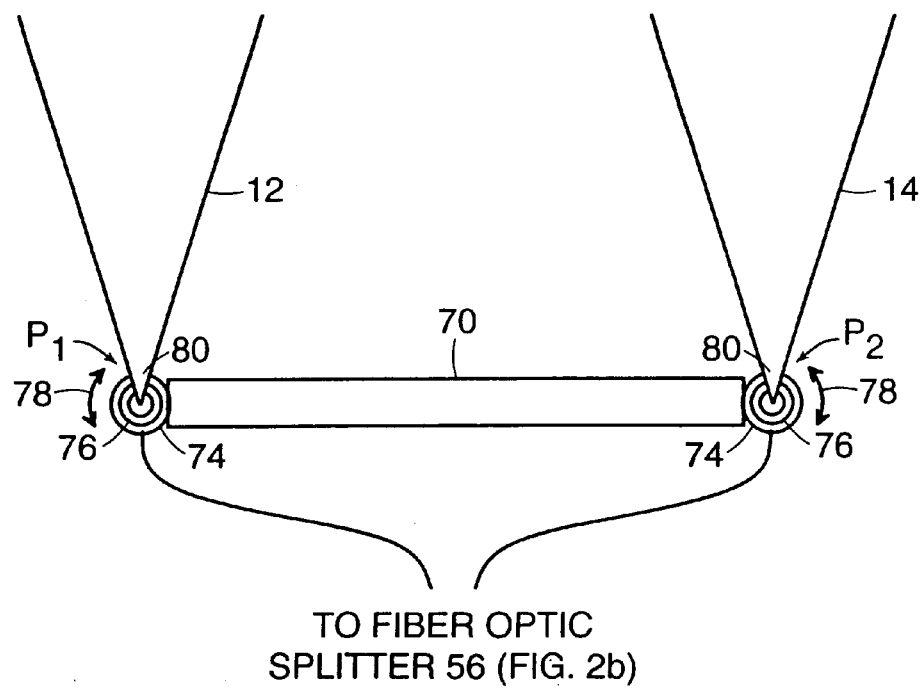
FIG. 3 is a block diagram of an embodiment of apparatus for supporting the two sources of radiation of FIG. 1 at a fixed distance relative to one another.

One illustrative bar 70 for supporting radiation sources $P_1$ and $P_2$ at a fixed distance D relative to one another is shown in FIG. 3. A bar 70 is provided with sockets 74 at opposite ends thereof. A ball joint 76 is pivotally positioned within each of the sockets 74, as shown. Each of the ball joints 76 has an end of a fiber from a fiber optic splitter 56 (shown in FIG. 2b) positioned therein and an aperture 80 through which divergent radiation passes. Fibers may have beam-forming elements at their end to control or set the divergence angle of the two beams and in one embodiment the beam forming elements are lenses. In operation, the ball joints 76 are pivotable as shown by arrows 78 within the respective socket 74 and may be under the control of control unit 32 (shown in FIG. 1). With this arrangement, the divergent beams 12 and 14 provided by the sources $P_1$ and $P_2$ at the ends of the fibers can be directed as desired to illuminate all, or a portion, of the object 10 including the point $P_0$ to be processed, while maintaining a fixed separation distance D.

Referring again to FIG. 1, the coordinates of point $P_0$ on the surface of object 10 are (x, y, z). Although the x and y coordinates of $P_0$ are generally directly determinable from the geometry of the detector 22 and the object 10, taking into account any magnification by intervening focusing element 24, the depth coordinate z, where the z axis is defined as being parallel to the optical axis of the imaging system, is not directly obtainable. The depth coordinate, z, however can be measured by first considering the difference in path length $$s = R_2 - R_1 + S_0 \quad (1)$$

from the radiation sources $P_1$ and $P_2$ to the point $P_0$ on the surface of the object 10. The quantity $S_0$ is included to account for any path length difference in the beams that may occur before they reach points $P_1$ and $P_2$.

If s is non-zero, then changing the frequency of the radiation emitted from sources $P_1$ and $P_2$ will result in the phase of the radiation from one source, as measured at point $P_0$, changing with respect to the other source. This phase change results in a modulation of intensity of the radiation at point $P_0$. The change in frequency, $\Delta v$, required to complete one cycle of a change in intensity is given by the expression:

$$\Delta v = \frac{c}{s} \quad (2)$$

where c is the speed of light. Thus, by measuring the change in laser frequency, $\Delta v$, needed to cause one oscillation of intensity, the path difference s may be determined. The measurement of z is then based on determining the value of s for each value of x and y, as discussed below.

Improved accuracy in the determination of s is obtained by measuring $\Delta v$ over many oscillation cycles. In practice it is convenient to work in terms of the number of oscillation cycles N (not necessarily a whole number) induced by a total change in frequency B.

N is given in terms of $\Delta v$ and B as:

$$N = \frac{B}{\Delta v} \quad (3)$$

Elimination of $\Delta v$ from Eq. (3) using Eq. (2) yields the following expression for s in terms of N:

$$s = \frac{c}{B} N \quad (4)$$

It should be noted that the number of oscillation cycles N induced by a frequency scan of length B corresponds to the number of interference fringes that move across the measurement point $P_0$ during the frequency scan. The interference fringes are produced by the interference of radiation emitted from the sources $P_1$ and $P_2$. These oscillations occur whether or not the fringes are resolved by the imaging lens 24.

An uncertainty $\Delta N$ in the measurement of N, corresponds to an uncertainty $\Delta s$ in s of $$\Delta s = \frac{c}{B} \Delta N = s \frac{\Delta N}{N} \quad (5)$$

Equation (5) indicates that if the uncertainty $\Delta N$ to which a single oscillation cycle can be determined remains constant, the uncertainty $\Delta s$ in s is reduced by a factor equal to the number of cycles N that are measured. There are numerous methods for determining N to various levels of resolution $\Delta N$ that are known to those skilled in the art. Examples of methods yielding a resolution of roughly one oscillation-cycle count ($\Delta N=1$) are to perform a fast Fourier transform (FFT) on the data sequence or to count zero crossings of the high-pass filtered signal. Improved resolution of a fraction of an oscillation-cycle count ($\Delta N<1$) can be achieved, for example, by finding the argument of the discrete Fourier transform (DFT) where the magnitude of the DFT is maximized or by inspecting the phase of the oscillation cycle at the ends of the frequency scan. One technique known to those skilled in the art for accurate inspection of the phase is to insert a phase modulator in one leg of the beam path, i.e., between the beam splitter or fiber-optic splitter and one of the sources $P_1$ or $P_2$ in FIGS. 2, 2(a), and 2(b).

If $I_1$, $I_2$, and $I_3$ are signal intensities corresponding to phase shifts induced by the phase modulator of $-90°$, $0°$, and $90°$, respectively, then the phase $\phi$ of the oscillation cycle is given by:

$$\phi = \tan^{-1}\left(\frac{I_1 - I_3}{2I_2 - I_1 - I_3}\right) \quad (6)$$

An uncertainty $\Delta \phi$ in phase is converted to an uncertainty $\Delta N$ in the cycle count by dividing by $2\pi$.

For a typical frequency scan of B=15 THz for a tunable diode laser, and for an uncertainty of $\Delta N=1$ cycle, an uncertainty of $\Delta s=20$ $\mu m$ is provided. An uncertainty of $\Delta N=0.1$ cycle would improve the uncertainty in s to $\Delta s=2.0$ $\mu m$, provided that the spread in s over the lateral resolution is smaller than this quantity. If the spread in s over the lateral resolution on the surface of the object is larger than $\Delta s$, then the improved resolution in the measurement of s may still result in an improved estimate of an average or representative value of s over that lateral resolution.

In terms of the coordinate system:

$$s = \sqrt{(x-x_2)^2 + (y-y_2)^2 + (z-z_2)^2} - \sqrt{(x-x_1)^2 + (y-y_1)^2 + (z-z_1)^2} \quad (7)$$

To make the calculation simpler, assume that the two sources $P_1$ and $P_2$ are located symmetrically about the origin at $(x_1,y_1,z_1)$ and $(-x_1,-y_1,-z_1)$. Then Eq. (7) becomes, in terms of $(x_1,y_1,z_1)$:

$$s = \sqrt{(x+x_1)^2 + (y+y_1)^2 + (z+z_1)^2} - \sqrt{(x-x_1)^2 + (y-y_1)^2 + (z-z_1)^2} \quad (8)$$

Solving for z, Eq. (8) becomes:

$$z = \frac{4(xx_1 + yy_1)z_1 \pm \frac{s}{2}\sqrt{16(xx_1+yy_1)^2 + (s^2 - 4z_1^2)(s^2 - D^2 - 4x^2 - 4y^2)}}{s^2 - 4z_1^2} \quad (9)$$

where D is the distance between the two sources $P_1$ and $P_2$. Thus z is determined to within an ambiguity due to the existence of the positive and negative roots of Eq. (9). One way to avoid this ambiguity is by illuminating the object 10 so that the s=0 line (labeled 16 in FIG. 1 for the case $s_0=0$) does not bisect the region of the object to be imaged. One way of moving the s=0 line is to vary $s_0$ in Eq. (1).

The sensitivity of the system to changes in s is shown by the ratio of $\Delta s/\Delta z$, where $\Delta z$ is the uncertainty in z introduced by an uncertainty $\Delta s$ in the value of s. This ratio ranges between zero, for a system lacking any practical range sensitivity and two, for a theoretically maximal system. A value of two is impractical to achieve because the surface of the object 10 would have to lie between the two point sources $P_1$ and $P_2$ and only one side of the surface could be illuminated from each beam. The ratio $\Delta s/\Delta z$ is calculated by taking the partial derivative of s with respect to z, from which the following expression for the range resolution is obtained:

$$\Delta z = \Delta s \left( \frac{z+z_1}{\sqrt{R_0^2 + R_0 D\cos\psi + \frac{D^2}{4}}} - \frac{z-z_1}{\sqrt{R_0^2 - R_0 D\cos\psi + \frac{D^2}{4}}} \right)^{-1} \quad (10)$$

In equation (10), $R_0$ is the distance from the origin to $P_0$ and $\psi$ is the angle between the line extending from the origin to the point $P_0$ and the line extending from point $P_1$ to point $P_2$ as shown in FIG. 1. A useful configuration that provides good range resolution is to set $\psi=90°$ for which the expression for $\Delta z$ simplifies to $$\Delta z = \frac{\Delta s}{2\sin\alpha\cos\theta_s} \quad (11)$$

where $\theta_s$ and $\alpha$ are as shown in FIG. 1. In terms of $R_0$ and D, $\tan\alpha = D/(2R_0)$. Equation (11) shows that the range resolution improves as the angle $\alpha$ increases and the angle $\theta_s$ decreases. For values of $\Delta s=5$ $\mu$m, $\alpha=10°$, and $\theta_s=45°$, the range resolution is $\Delta z=20$ $\mu$m.

Uncertainties ($\Delta x$, $\Delta y$) in the lateral position (x, y) of point $P_0$ also affect the range resolution $\Delta z$. If the two source points lie in the x-z plane, then the measurement of z is insensitive to uncertainties $\Delta y$. For $\psi=90°$, uncertainties $\Delta x$ in x cause an uncertainty $$\Delta z = \Delta x \tan\theta_s \quad (12)$$

in the measurement of z. Therefore, angles near $\theta_s=0°$ offer the best immunity to uncertainty in the lateral position of point $P_0$.

Because the depth of focus decreases as the lateral resolution of the optical system improves, there is a tradeoff between lateral resolution and maximum object depth. One method for reducing this limitation in object depth is to sequentially focus on different range planes and use only those pixels that are within the depth of focus. For example, a 100 $\mu$m lateral resolution would limit the depth of field to the order of 1 cm, and an object with a 10 cm range could be imaged at full resolution by focusing sequentially at ten different ranges. To minimize the effects of depth of field, the z axis can be defined in a direction that minimizes the range extent, i.e., normal to the average plane of the surface of the object. To increase the lateral area that can be imaged without losing lateral resolution, multiple cameras (i.e., detector arrays 22) can be used to cover the entire area of interest of the object 10 or individual cameras can be used for inspecting regions of interest. Alternatively, the focal plane of single lenses can be populated with a plurality of detector arrays. These arrays can be translated independently to inspect various regions of the object at high resolution. Translation of individual detector arrays along the z axis or tilting of the detector arrays can achieve simultaneous focusing for regions of the object at different depths to increase the allowable object depth.

A potential difficulty with the optical imaging system in FIG. 1 is that the bistatic angle between the sources and the detector may introduce shadowing effects. These effects can be reduced by placing the lens closer to the sources as in FIG. 4 and using the lens in an off-axis configuration where the detector is offset laterally in the image plane. If the lens is designed for this purpose or has a sufficiently large field of view, then aberrations resulting from off-axis imaging can be minimized.

Figure 5:
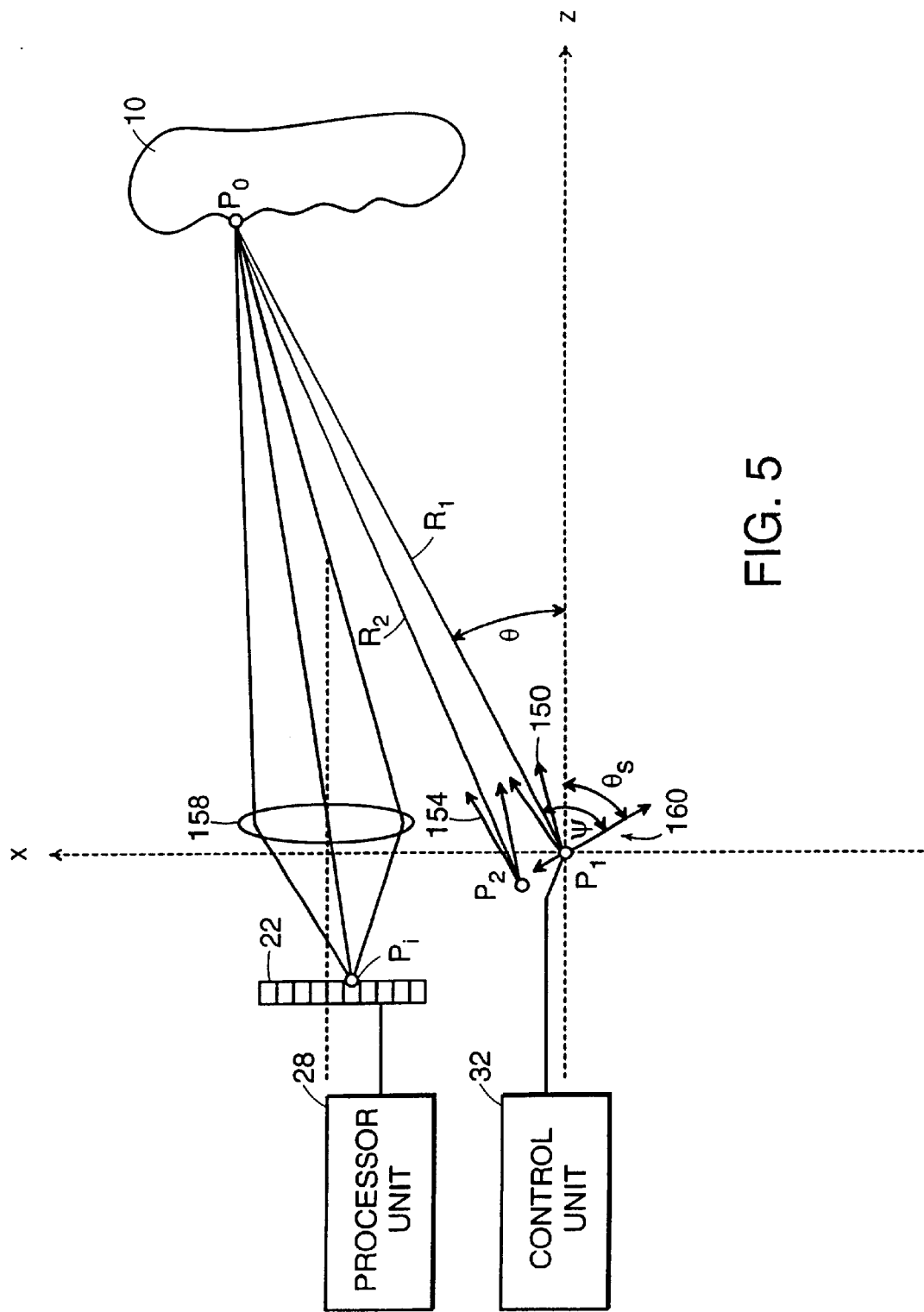
FIG. 5 is a block diagram of an alternate embodiment of the invention for making surface contour measurements.

Referring to FIG. 5, an alternate embodiment of the present invention includes a moveable radiation source $P_1$ and a stationary radiation source $P_2$, each providing a divergent beam 150 and 154 and having a path length labeled $R_1$ and $R_2$ between such radiation source and a point $P_0$ on the surface of an object 10, respectively. The sources $P_1$ and $P_2$ may be generated by any suitable source of coherent radiation, such as a monochromatic laser, which is split to provide the two point sources $P_1$ and $P_2$. Moreover, various techniques are suitable for splitting the radiation from the coherent radiation source, such as the beam splitter embodiments of FIGS. 2 and 2a and the fiber-optic splitter embodiment of FIG. 2b.

Figure 4:
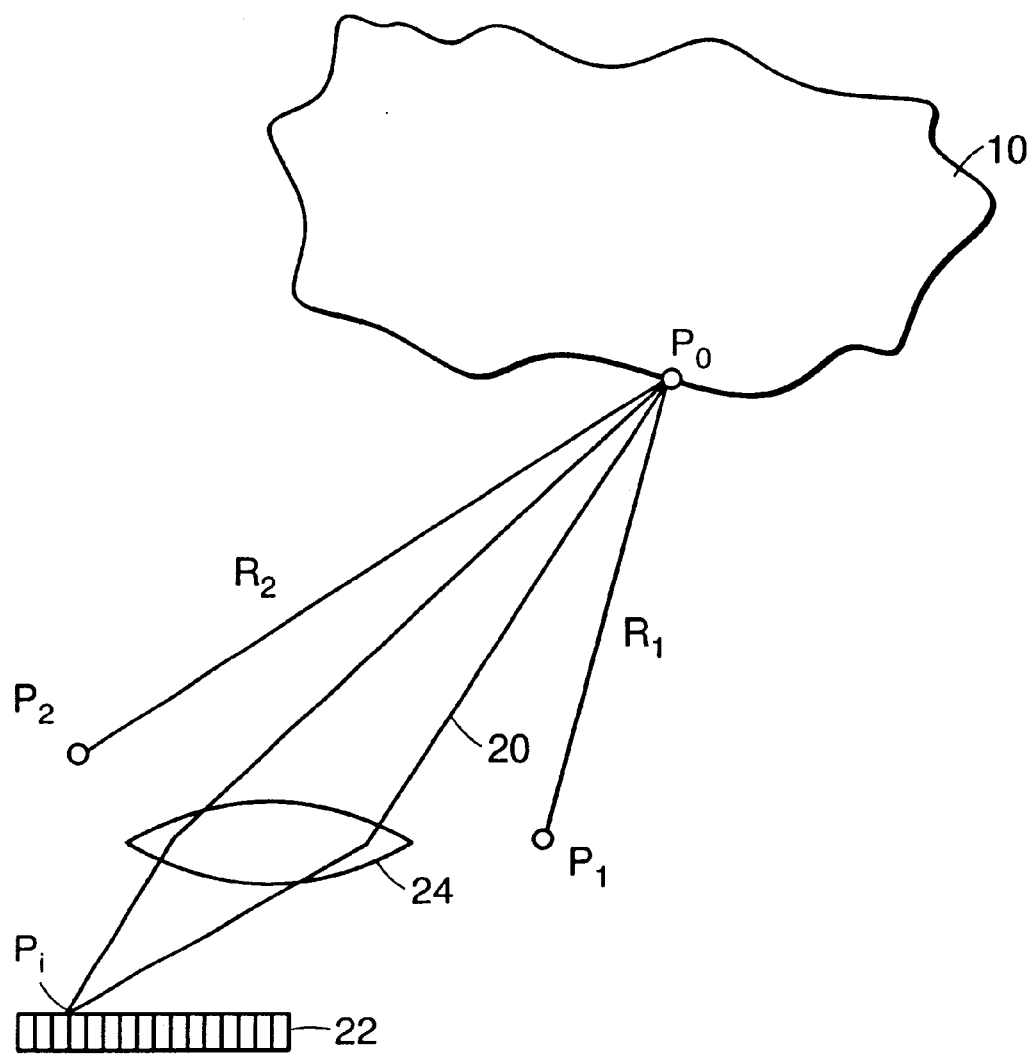
FIG. 4 is another embodiment of the imaging system in FIG. 1.

The divergent beams 150 and 154 are directed toward a surface of an object 10 on which a point $P_0$ is located having position information which is to be measured. Illumination scattered by the surface of the object 10 is focused by a focusing element, or lens 158 to impinge on a detector array 22. The lens can be used in an off-axis configuration as illustrated in FIG. 4 to reduce shadowing effects due to the bistatic angle. An optional polarizer (not shown) of the type described above in conjunction with FIG. 1 may be positioned between the focusing element 158 and the detector array 22 in order to improve the contrast of the speckle image or the fringe pattern incident on the detector array 22.

The detector array 22 is in communication with a processor unit 28 for processing the image incident on the detector, as will be described. A control unit 32 is in communication with at least the moveable source $P_1$ for moving the source $P_1$ along an axis 160. As noted above, the control unit 32 and the processor unit 28 may be implemented by separate devices or alternatively, may be part of a single system. Additionally, the control unit 32 and the processor unit 28 may communicate with each other, as may be desirable in certain applications.

As described above in conjunction with FIG. 1, the depth coordinate z associated with a point $P_0$ on the surface of the object 10 can be determined as a function of the difference, $R_2-R_1$, between the path lengths $R_1$ and $R_2$ of beams 150 and 154, from sources $P_1$ and $P_2$ respectively, to point $P_0$ In the embodiment of FIG. 5, the phase of the radiation from moveable source $P_1$ is changed by moving the source $P_1$ along the axis 160 under the control of the control unit 32. With this arrangement, oscillations in the intensity at point $P_0$ are produced.

The instantaneous coordinates of moveable point source $P_1$ are $$x_1=al_s, y_1=am_s, \text{ and } z_1=an_s \tag{13}$$

where a represents the magnitude of translation of point source $P_1$, and $l_s$, $m_s$, and $n_s$ are direction cosines representing the direction of translation with respect to the x, y and z axes, respectively. The phase difference of the radiation from the sources $P_1$ and $P_2$ as measured after propagation to point $P_0$ is given by:

$$\phi = \frac{2\pi}{\lambda}(R_2 - R_1) + \phi_0 \tag{14}$$

where $\phi_0$ represents a constant phase offset that may exist between the two coherent sources $P_1$ and $P_2$. As $P_1$ translates along axis 160, the value of $R_1$ changes, causing $\phi$ to vary as a function of a.

The number of intensity oscillations that occur at point $P_0$ (or interference fringes that cross point $P_0$) as source $P_1$ moves away from the origin is given by:

$$N = \frac{\phi(a) - \phi(0)}{2\pi} = \frac{R_0 - R_1}{\lambda} = \frac{1}{\lambda}\left[\sqrt{x^2 + y^2 + z^2} - \sqrt{(x - al_s)^2 + (y - am_s)^2 + (z - an_s)^2}\right] \tag{15}$$

where $R_0$ is the distance between point $P_0$ and the origin of the coordinate system, $\phi(a)$ is the optical phase difference in Eq. (14) for a source separation of a, and $\phi(0)$ is the optical phase difference in Eq. (14) for a equal to 0. Consideration of Eq. (15) reveals that the number of intensity oscillations, N, resulting from movement from source $P_1$ is independent of the location of the stationary source $P_2$. This independence permits the sources $P_1$ and $P_2$ to be positioned in close proximity to one another. With this arrangement, the divergent beams 150 and 154 from respective sources $P_1$ and $P_2$ experience common disturbances, such as air turbulence and vibrations. In this way, the effects of such disturbances are minimized. Additionally, beams 150 and 154 reach the surface of the object 10 with substantially identical polarization.

Note also that a small separation between the sources $P_1$ and $P_2$ produces a fringe pattern on the surface of the object 10 with a large fringe spacing that can be easily resolved by the imaging lens 24.

Since the magnitude of translation a of point source $P_1$ is relatively small as compared to the value of $R_0$, Eq. (15) can be approximated to second order in $a/R_0$ as follows:

$$N = \frac{a}{\lambda}\left[\cos\psi - \frac{1}{2}\sin^2\psi\frac{a}{R_0} - \frac{1}{2}\cos\psi\sin^2\psi\frac{a^2}{R_0^2}\right] \tag{16}$$

where $\psi$ is the angle between the line extending from the origin to the point $P_0$ and the line defined by the direction of translation of $P_1$.

Eq. (16) indicates that to lowest order in $a/R_0$, knowledge of N allows the angle $\psi$ to be determined. Given knowledge of $\psi$ from three or more locations, the (x,y,z) coordinates of $P_0$ could be determined through triangulation. We now describe an embodiment similar to the one corresponding to FIG. 1, where the x and y coordinates are determined from location of the image point in the detector array.

The measurement of z for a given (x,y) location can be made either by determining the number of intensity oscillation cycles N corresponding to a movement of $P_1$ by a distance or by measuring the rate at which such intensity oscillations occur. Consider first a measurement of z based on determining the number of cycles N. With N known, all of the variables in Eq. (15) are known except for z. Solving Eq. (15) for z yields the following expression:

$$z = \frac{An_s \pm \overline{p}\sqrt{A^2 - (\overline{p}^2 - n_s^2)(x^2 + y^2)}}{\overline{p}^2 - n_s^2} \tag{17}$$

where $$A = xl_s + ym_s + \frac{a}{2}(\overline{p}^2 - 1) \tag{18}$$

and $$\overline{p} = \frac{\lambda N}{a} \tag{19}$$

Equation (19) defines a dimensionless parameter having a magnitude ranging between zero and unity that represents the average modulation rate of the speckle intensity in terms of oscillation cycles N per wavelength unit traveled by $P_1$. For values of a approaching zero, Eq. (17) can be approximated as:

$$z = \frac{(xl_s + ym_s)n_s \pm \overline{p}\sqrt{(xl_s + ym_s)^2 - (\overline{p}^2 - n_s^2)(x^2 + y^2)}}{\overline{p}^2 - n_s^2} \tag{20}$$

The expressions for z in Eqs. 17 and 20 can be simplified by setting $n_s=0$, so that the translation of source $P_1$ is confined to the x-y plane. This arrangement represents a good practical choice for translation of source $P_1$, as described below. The resulting expression for z can be written as follows:

$$z = \sqrt{R_0^2 - x^2 - y^2} \tag{21}$$

where the distance $R_o$ from the scattering point $P_0$ to the origin of the x, y coordinate system is given by the exact expression:

$$R_0 = \frac{xl_s + ym_s + \frac{a}{2}(\bar{\rho}^2 - 1)}{\bar{\rho}} \quad (22)$$

When a is small, $R_o$ can be approximated as:

$$R_0 = \frac{xl_s + ym_s}{\bar{\rho}} \quad (23)$$

Consider now the measurement of z based on knowledge of the instantaneous rate at which the intensity oscillations occur. The instantaneous oscillation rate $\rho$ can be expressed in a manner similar to the average oscillation rate in Eq. (19), as follows:

$$\rho = \lambda \frac{\partial N}{\partial a} \quad (24)$$

Substituting the expression for the number of intensity oscillations, N, from Eq. (15) into Eq. (24) yields:

$$\rho = \frac{xl_s + ym_s + zn_s - a}{\sqrt{(x - al_s)^2 + (y - am_s)^2 + (z - an_s)^2}} \quad (25)$$

where the relation:

$$l_s^2 + m_s^2 + n_s^2 = 1 \quad (26)$$

has been used to simplify the numerator. For small values of a, $\rho$ can be approximated as:

$$\rho \approx \cos\psi - \sin^2\psi \frac{a}{R_0} - \frac{3}{2}\cos\psi\sin^2\psi \frac{a^2}{R_0^2} \quad (27)$$

Solving, Eq. (25) for z yields:

$$z = \frac{O \pm Q}{\rho^2 - n_s^2} \quad (28)$$

where $$O = [xl_s + ym_s + a(\rho^2 - 1)]n_s \quad (29)$$

and $$Q = \rho \sqrt{a(\rho^2 - 1)[2(xl_s + ym_s) - a(l_s^2 + m_s^2)] + (xl_s + ym_s)^2 - (\rho^2 - n_s^2)(x^2 + y^2)} \quad (30)$$

When $n_s = 0$, Eq. (29) can be written in the form of Eq. (21), with:

$$R_0 = \frac{\sqrt{a(\rho^2 - 1)[2(xl_s + ym_s) - a] + (xl_s + ym_s)^2}}{|\rho|} \quad (31)$$

For small values of a, Eqs. (28) and (31) can be approximated by Eqs. (20) and (23), respectively, with $\bar{\rho}$ replaced by $\rho$.

In order to estimate range resolution, consider the uncertainty $\Delta z$ in the measurement of z that would be introduced by an uncertainty ($\Delta N$ or $\Delta \rho$) in the quantity being measured. For simplicity, this calculation is based on the approximate expression for N given by Eq. (16). To find $\Delta z$, we take the partial derivative of N (or $\rho$) with respect to z and equate this derivative to the ratio $\Delta N/\Delta z$ (or $\Delta \rho/\Delta z$), to yield:

$$\Delta z = G \frac{R_0}{a} \lambda \Delta N = G R_0 \Delta \rho \quad (32)$$

where $$G = \frac{1}{n_s - (ll_s + mm_s nn_s)n} = \frac{1}{\sin\theta[\cos\theta_s \sin\theta - \cos\theta \sin\theta_s \cos(\phi - \phi_s)]} \quad (33)$$

is a geometrical factor that accounts for the direction of translation and the direction to the scattering point. In the first form for G, $$l = x/R_0, \; m = y/R_0, \text{ and } n = z/R_0 \quad (34)$$

are direction cosines for the Point $P_0$. In the second form for G, $\theta$ and $\phi$ are the polar and azimuthal angles, respectively, representing the direction from the origin to $P_0$ in a spherical-polar coordinate system. Likewise, the direction of translation of the source point is given by $\theta_s$ and $\phi_s$.

Consideration of Eq. (32) reveals that range resolution degrades with increasing object distance $R_o$ and improves with increasing magnitude of translation a of source $P_1$. Consideration of Eq. (33) reveals that the geometrical factor G ranges between unity and infinity, where unity corresponds to the best range resolution achievable.

The optimal direction of translation of source $P_1$ for a given scattering-point direction is obtained from Eq. (33) by choosing $l_s$, $m_s$, and $n_s$ such that G is minimized for the given values of l, m and n. Application of this constraint yields:

$$(l_s, m_s, n_s) = \left(-\frac{nl}{\sqrt{1-n^2}}, -\frac{nm}{\sqrt{1-n^2}}, \sqrt{1-n^2}\right) \quad (35)$$

which implies that the optimal translation direction is orthogonal to the line extending from the origin to the scattering point $P_0$ ($\psi = 90°$) and lies in the plane of incidence formed by said line and the z axis ($\phi_s = \phi$). Substitution of the values in Eq. (35) into Eq. (33) results in:

$$G = \frac{1}{\sqrt{1-n^2}} = \frac{1}{\sqrt{l^2 + m^2}} = \frac{1}{\sin\theta} \quad (36)$$

From Eq. (36), it is observed that the best achievable G value of unity occurs when $n=0$ ($\theta=90°$), which implies that the scattering point lies in the x-y plane. It is also observed that the resolution degrades such that G approaches infinity for scattering points lying on the z axis. For example, G=2 for $\theta=30°$ and G=5.76 for $\theta=10°$. Although it is not possible to satisfy Eq. (35) for every point in the image without changing the translation direction for each point, the condition for optimal resolution can be approximated by satisfying Eq. (35) for a representative image point.

By Eqs. (25) and (27), the instantaneous modulation rate $\rho$ depends on the offset magnitude a of the translating point. For techniques based on measuring $\rho$, it is desirable for $\rho$ to vary as little as possible during the scan so that there is nearly a one-to-one correspondence between values of ρ and z. Then standard spectral-analysis techniques can be applied to estimate the value of ρ and determine z. To quantify the degree of nonuniformity in ρ that occurs during a scan, we define:

$$\chi = \frac{\rho(a) - \rho(0)}{\rho(0)} = \frac{\rho(a) - \cos\psi}{\cos\psi} \quad (37)$$

Substitution of the approximate form for ρ from Eq. (27) into Eq. (37) and keeping only the lowest order term containing a, yields:

$$\chi \approx \frac{\sin^2\psi}{\cos\psi} \frac{a}{R_0} \quad (38)$$

Equation (38) states that the modulation nonuniformity increases linearly in the ratio $a/R_0$ of scan length to object distance. Furthermore, the nonuniformity vanishes when ψ=0° and increases without bound when ψ=90°. We observe, however, that there is no range resolution when ψ=0° because all points on the ψ=0° line have the same modulation rate, regardless of range, i.e., G=∞ in Eq. (33). Therefore, there is a tradeoff between minimizing the non-uniformity and obtaining optimal range resolution.

A reasonable measurement configuration that simultaneously provides good range resolution and reduced modulation nonuniformity is to set $n_s$=0 and to use an off-axis optical system with the offset in the $\phi_s$ direction, i.e., $\phi=\phi_s$. Then Eq. (33) for G reduces to:

$$G = \frac{-2}{\sin(2\theta)} \quad (39)$$

As an illustrative example of the measurement technique, suppose it is desired to image an object that is 200 mm by 200 mm in the x-y plane from a distance of $R_0$=1 m using a laser of wavelength λ=0.7 μm. If $n_s$=0 and the center of the object is located at θ=30° and $\phi=\phi_s$, then, by Eq. (39), the geometric factor G will vary between 2.1 and 2.6 over the field of view. By Eq. (32), a translation of a=5 mm will produce a range uncertainty of Δz=16 μm (in the middle of the image) for an uncertainty in the number of oscillations of one-twentieth of a count, i.e., ΔN=0.05. The total number of oscillation counts for the entire scan is N=3600 by Eq. (16). To estimate the modulation nonuniformity at the center of the image, we set ψ=60° in Eq. (38) and obtain χ=0.0075 so that there is less than a 1% nonuniformity over the scan. This nonuniformity could be reduced further by introducing slight variations in the scan rate during the scan to compensate for any change in frequency during the measurement.

Figure 6:
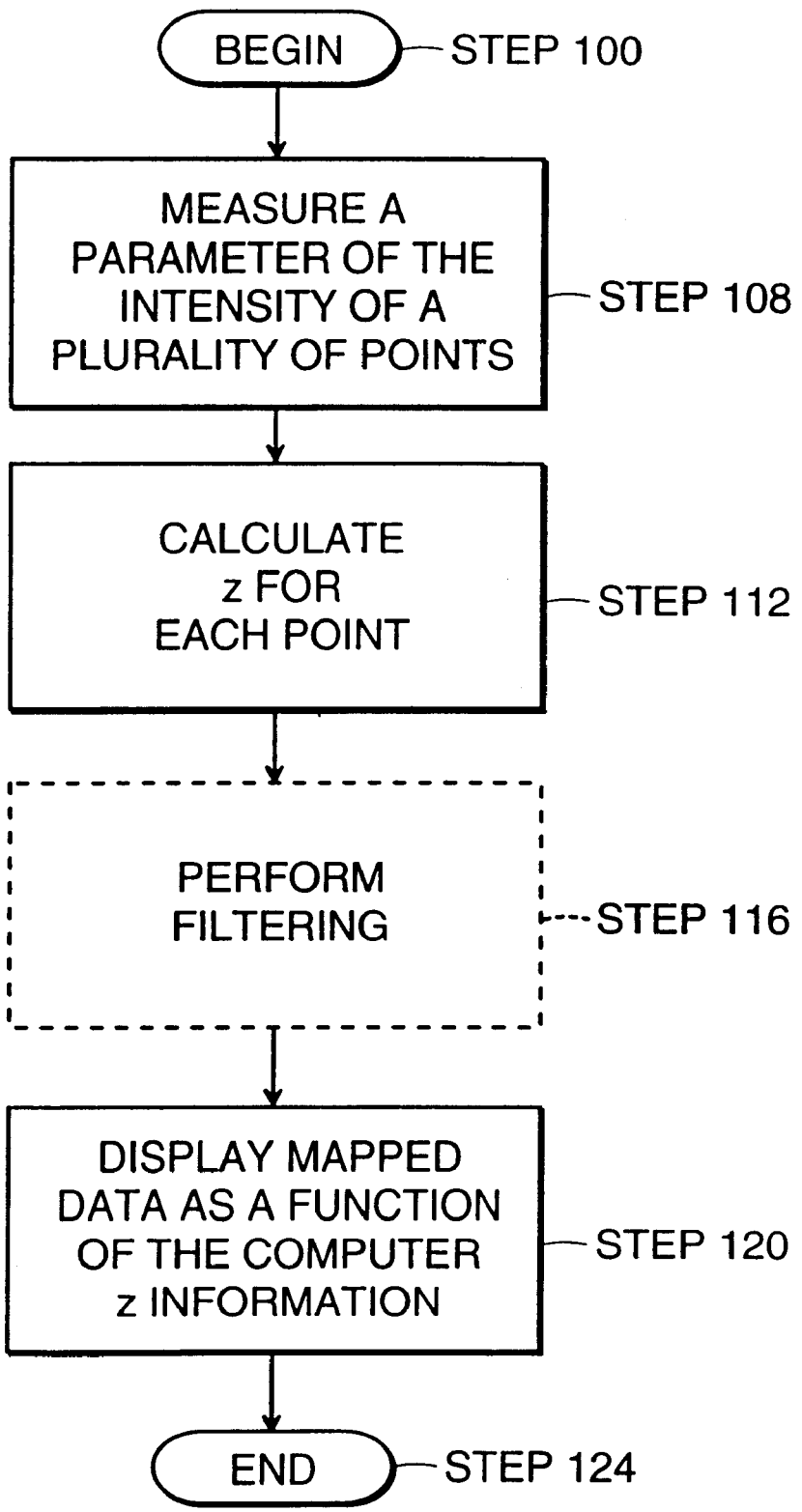
FIG. 6 is a flow diagram of an embodiment of the steps utilized by the processor of FIGS. 1 and 5 in making surface contour measurements.

FIG. 6 depicts an illustrative series of steps to be executed by the processor 28 of FIGS. 1 and 5 to determine the depth coordinate z at each point (x, y) on the object. The processor begins (step 100) by measuring a parameter of the intensity of the radiation scattered by a plurality of illuminated points on the object surface (step 108). From this information, the z coordinate for each measured point is calculated (step 112).

An optional filtering process may be performed in step 116. Suitable filters known to those skilled in the art include, but are not limited to, smoothing filters, median filters and curve-fitting filters. Thereafter, the mapped points can be displayed or output in anyway known to one of ordinary skill in the art, following which the process is terminated in step 124, as shown. In one embodiment, the mapped points are plotted as a function of the computed z information on a mesh plot in step 120.

Figure 6A:
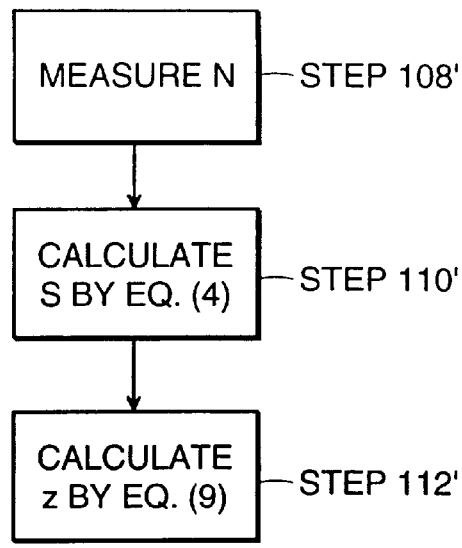
FIG. 6a is one embodiment of a portion of the flow diagram of FIG. 6.

Referring also to FIG. 6a, one embodiment of steps 108 and 112, suitable for use with the embodiment of FIG. 1 is shown. In step 108', the intensity of the scattered illumination is measured as a function of laser frequency offset and N is measured using one of the methods known to those skilled in the art. Thereafter, s is calculated for each location (x,y) in step 110' using Eq. (4) and z is calculated for each location (x,y) in step 112' using Eq. (9).

Figure 6B:
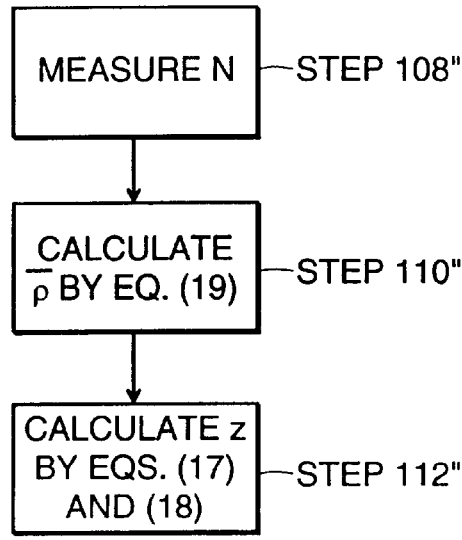
FIG. 6b is another embodiment of a portion of the flow diagram of FIG. 6.
Figure 6C:
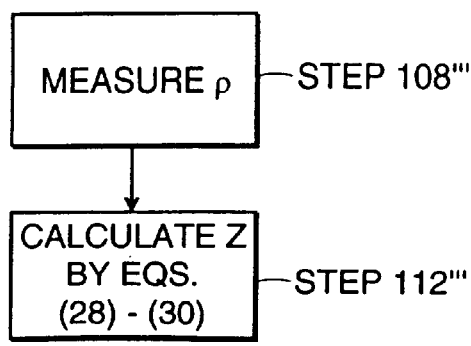
FIG. 6c is yet another embodiment of a portion of the flow diagram of FIG. 6.

An alternate embodiment of process steps 108 and 112 for use in conjunction with the embodiment of FIG. 5 is shown in FIG. 6b. In this case, the parameter of the intensity measured in step 108" is the number of times, N (not necessarily a whole number), that the intensity cycles as the moveable source $P_1$ (FIG. 5) translates. Once N has been determined in step 108" through one of the methods known to be skilled in the art it is converted to $\bar{\rho}$ by Eq. (19) in step 110". z is then calculated in step 112" with the use Eqs. (17) and (18). Another embodiment of process steps 108 and 112 for use in conjunction with the embodiment of FIG. 5 is shown in FIG. 6C. Here, the parameter of the intensity measured in step 108'" is the instantaneous oscillation rate ρ at which oscillations occur as the source point $P_1$ translates. ρ is converted to z in step 112'" through Eqs. (28)–(30).

Figure 7:
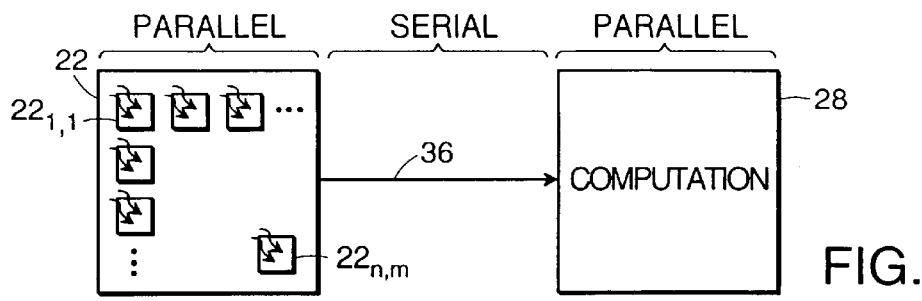
FIG. 7 is a block diagram of one embodiment of a detector and processor arrangement for use with the systems of FIGS. 1 and 5.

Various arrangements of detector 22 and processor 28 are possible. In one embodiment, shown in FIG. 7, the photodetector elements $22_{1,1}$ to $22_{n,m}$ of the detector array 22 are read out serially. The serial output 36 of detector array 22 provides an input to a processor 28. Processor 28 may comprise a single processor or alternatively, may be a multiprocessor comprising a plurality of processors.

Figure 7A:
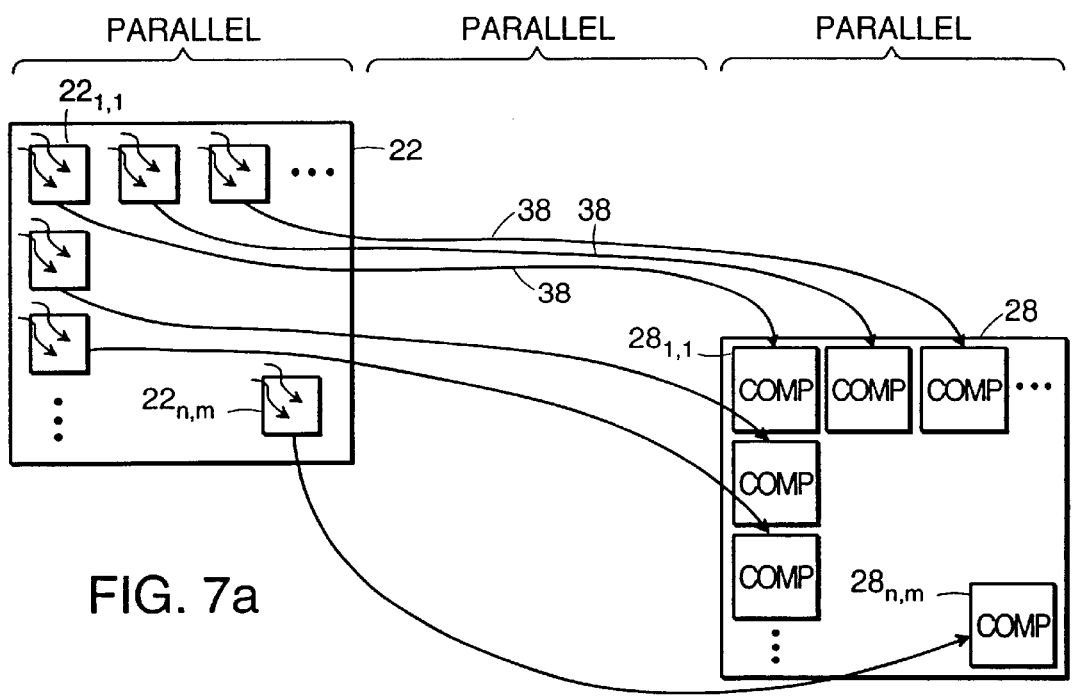
FIG. 7a is a block diagram of an alternate embodiment of a detector and processor arrangement including a multiprocessor for use with the systems of FIGS. 1 and 5.

Referring also to FIG. 7a, an alternate detector and processor arrangement is shown. In this embodiment, the processor 28 is a multiprocessor comprising a plurality of processors $28_{1,1}$ to $28_{n,m}$. Each of the photodetector elements $22_{1,1}$ to $22_{n,m}$ of the detector array 22 provides a respective output signal 38 to a corresponding one of the processors $28_{1,1}$ to $28_{n,m}$. With this arrangement, each of the processors $28_{1,1}$ to $28_{n,m}$ is able to operate substantially simultaneously, in order to provide substantial performance advantages. More particularly, each processor $28_{1,1}$ to $28_{n,m}$ in the multiprocessor unit 28 is responsible for making the z coordinate calculation based upon the data received from the corresponding element $22_{1,1}$ to $22_{n,m}$ of the photodetector array 22. Thus, the z coordinate for each location of the surface of the object 10 may be determined rapidly.

Figure 7B:
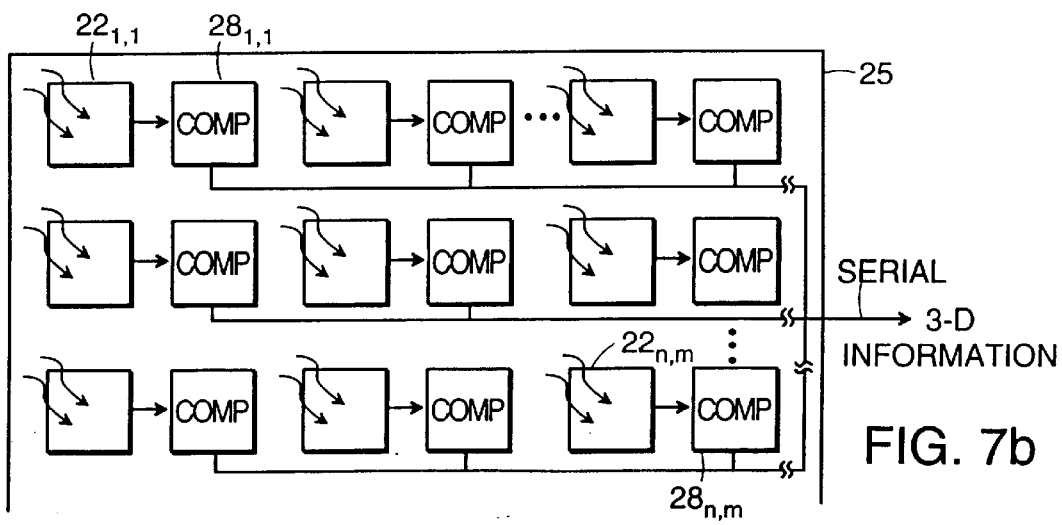
FIG. 7b is a block diagram of another alternate embodiment of a detector and processor arrangement for use in the systems of FIGS. 1 and 5.

FIG. 7b shows a further alternate embodiment of the detector and processor components for use in the systems of FIGS. 1 and 5 in the form of a unitary detector and processor array 25. The array 25 is fabricated on, and supported by, a common substrate or is fabricated as a Multi-Chip Module (MCM) or with Surface Mount Technology (SMT). The detector portion of the array 25 includes photodetector elements $22_{1,1}$ to $22_{n,m}$ and the multiprocessor portion of the array includes processors $28_{1,1}$ to $28_{n,m}$. More particularly, each of the detectors $22_{1,1}$ to $22_{n,m}$ is associated with, and positioned adjacent to, a respective one of the processors $28_{1,1}$ to $28_{n,m}$ and provides an input signal to the respective processor, as shown. The processors $28_{1,1}$ to $28_{n,m}$ process the information from the respective detectors $22_{1,1}$ to $22_{n,m}$ substantially simultaneously to provide the determined depth coordinates.

Figure 8:
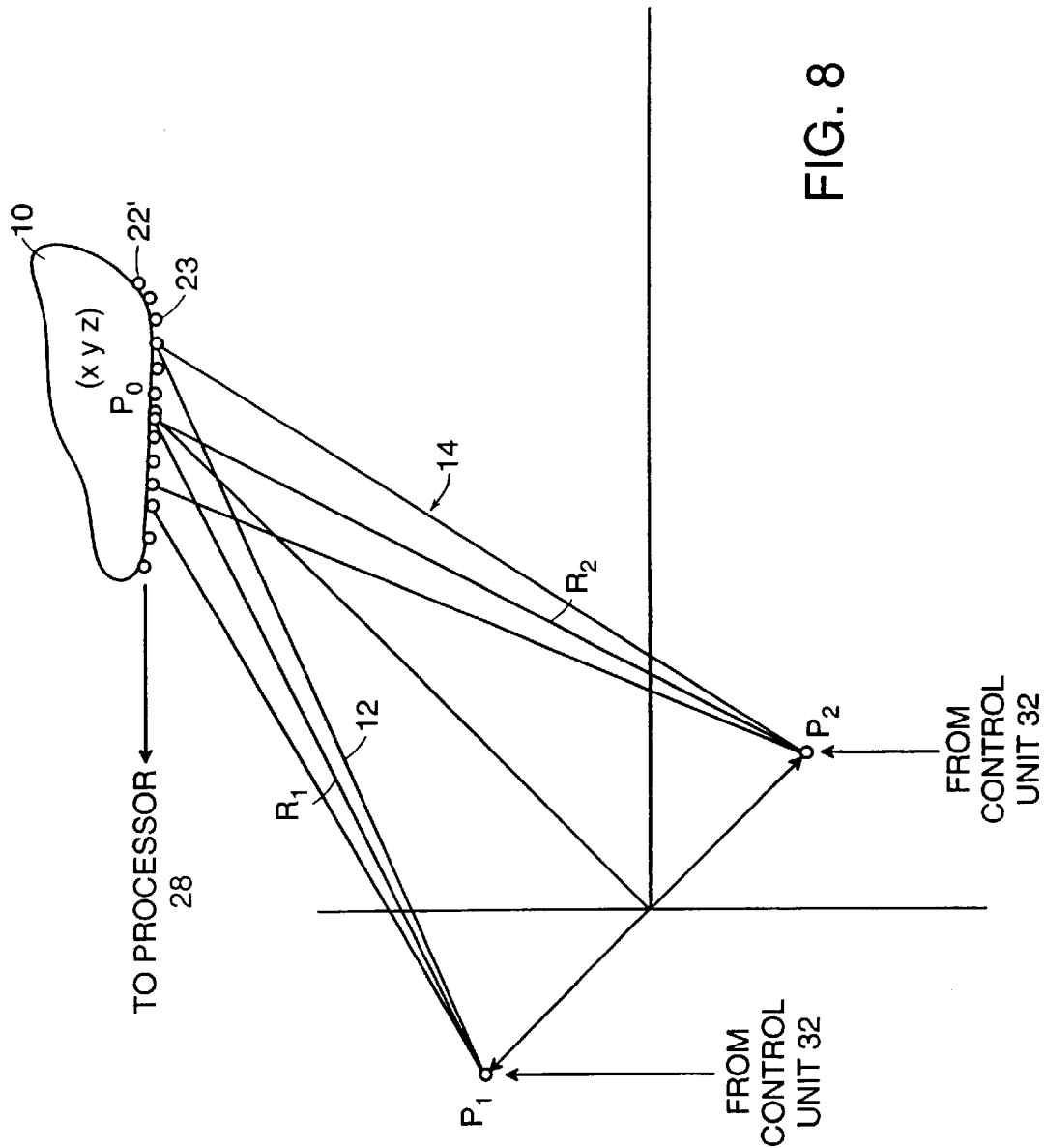
FIG. 8 is a block diagram of another embodiment of the invention for making surface contour measurements.

Referring to FIG. 8, another embodiment of the invention includes an array of detectors 22' placed against the surface of the object 10 whose surface contour is to be measured.

With this arrangement, rather than observing the light scattered from the point $P_0$ on the surface of the object 10 to determine z, the measurement of the phase shifting of the light is performed directly at the surface of the object. Although not shown, the system of FIG. 8 includes a control unit 28 for controlling sources $P_1$ and $P_2$ and a processor 28 for processing radiation incident on detector 22' as shown and described above in conjunction with FIGS. 1, 5 and 6.

Figure 9:
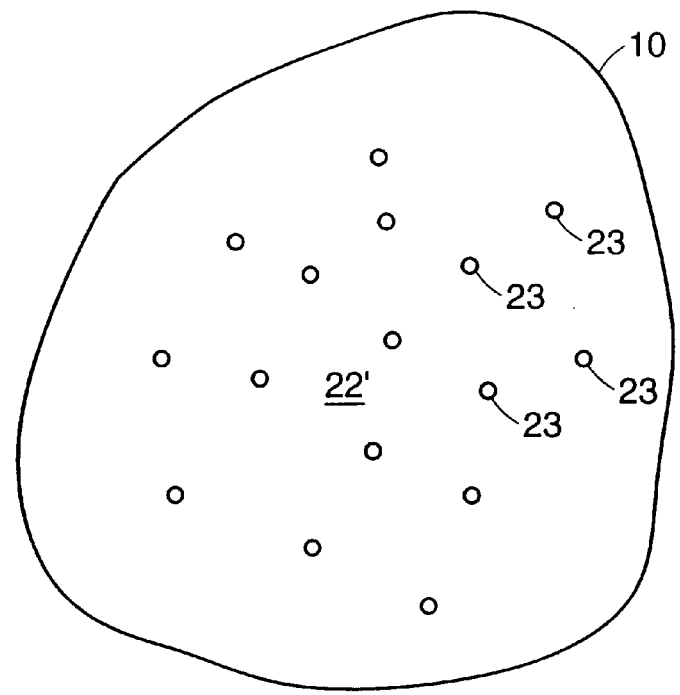
FIG. 9 shows one embodiment of photodetector elements positioned on the surface of an object in accordance with the embodiment of FIG. 8.

The arrangement and mechanism for locating the photodetector elements 23 on the surface of the object 10 may vary. In one embodiment shown in FIG. 9, a plurality of individual photodetector elements 23 of array 22' are positioned on the surface of the object 10 in the area of interest.

Figure 9A:
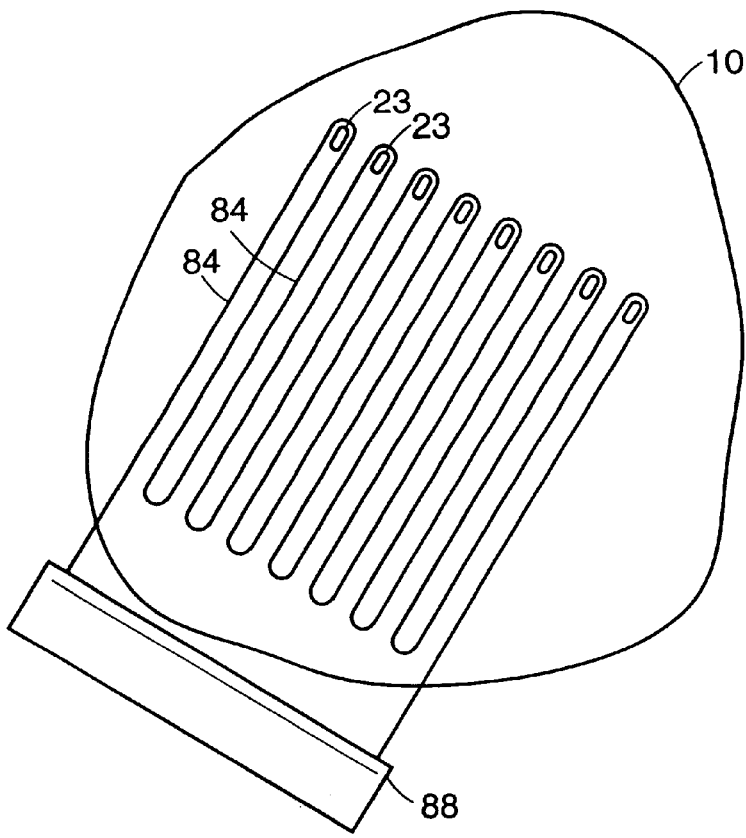
FIG. 9a shows another embodiment of photodetector elements positioned on spring arms for use in the embodiment of FIG. 8.

In another embodiment, shown in FIG. 9a, individual photodetector elements 23 of the array 22' are mounted on spring arms 84 cantilevered from a support and control unit 88. The spring arms 84 are moved over the surface of the object 10 by the control unit 88 in order to contact specific points, or regions of interest. The cantilevered support of spring arms 84 causes each individual detector 23 to remain in contact with a location on the surface of the object 10 as the arms 84 are moved thereover. That is, as the contour of the object surface varies, the spring arms 84 move up and down accordingly.

It will be appreciated that two or more additional radiation sources may be used in apparatus and methods of the present invention. For example, an additional source or sources can be used to determine x,y coordinate information regarding the object or a portion thereof. Additionally, extra radiation sources may be used to reduce any processing inaccuracies or ambiguities attributable to shadowing of a region of interest.

It will also be appreciated that other variations to the embodiment involving moving source points may be used. For example, the two points may both move with opposing motion, they may both move in the same direction with constant separation, they may rotate about a common center point, or motion may be simulated by using an array of source points that can be switched on and off by the control system.

Movement of both sources can provide advantages over a single moveable source such as reduction of the modulation nonuniformity in Eq. (38). A strategy for reducing this nonuniformity is to eliminate the linear term in Eq. (27) for r by moving the points in such a way that N is an odd function of a. Splitting the translation equally between the two sources so that their center remains fixed (referred to as opposing motion) results in the following expression:

$$N = \frac{R_2 - R_1}{\lambda} = \frac{1}{\lambda}\left[\sqrt{\left(x + \frac{a}{2}l_s\right)^2 + \left(y + \frac{a}{2}m_s\right)^2 + \left(z + \frac{a}{2}n_s\right)^2} - \sqrt{\left(x - \frac{a}{2}l_s\right)^2 + \left(y - \frac{a}{2}m_s\right)^2 + \left(z - \frac{a}{2}n_s\right)^2}\right] \quad (40)$$

The expansion of N corresponding to Eq.(16) that contains terms up to fourth order in a is:

$$N \approx \frac{a}{\lambda}\left[\cos\Psi - \frac{1}{8}\cos\Psi\sin^2\Psi\frac{a^2}{R_0^2}\right] \quad (41)$$

Thus, the second-order term in a and all higher-order even terms in a are eliminated and the magnitude of the third-order term is decreased by a factor of four.

An exact expression for z based on Eq. (17) and Eq. (22) is thus given by:

$$z = \frac{(xl_s + ym_s)n_s \pm \bar{p}\sqrt{(xl_s + ym_s)^2 - (\bar{p}^2 - n_s^2)[x^2 + y^2 + (a^2/4)(\bar{p}^2 - 1)]}}{\bar{p}^2 - n_s^2} \quad (42)$$

When $n_s=0$, Eq. (42) reduces to Eq. (21) with $$R_0 = \sqrt{\left(\frac{xl_s + ym_s}{\bar{p}}\right)^2 - \frac{a^2}{4}(\bar{p}^2 - 1)} \quad (43)$$

For small values of a, Eqs. (42) and (43) reduce to Eqs. (20) and (23), respectively. Elimination of the first-order dependence on a by moving both sources, however, makes this approximation more accurate than for a single moving source.

For opposing motion of two sources, the expression for the modulation rate given in Eq. (25) becomes:

$$\rho = \frac{1}{2}\frac{xl_s + ym_s + zn_s - \frac{a}{2}}{\sqrt{\left(x - \frac{a}{2}l_s\right)^2 + \left(y - \frac{a}{2}m_s\right)^2 + \left(z - \frac{a}{2}n_s\right)^2}} + \frac{1}{2}\frac{xl_s + ym_s + zn_s + \frac{a}{2}}{\sqrt{\left(x + \frac{a}{2}l_s\right)^2 + \left(y + \frac{a}{2}m_s\right)^2 + \left(z + \frac{a}{2}n_s\right)^2}} \quad (44)$$

Using a small a approximation that is valid up to and including third order of a, Eq. (44) becomes:

$$\rho \approx \cos\Psi - \frac{3}{8}\cos\Psi\sin^2\Psi\frac{a^2}{R_0^2} \quad (45)$$

In comparison with Eq. (27), the absence of the linear term in Eq. (45) results in an average oscillation rate ρ that remains more constant during a scan. The corresponding modulation nonuniformity χ previously defined in Eq. (37) can now be expressed as $$\chi \approx -\frac{3}{8}\sin^2\Psi\frac{a^2}{R_0^2} \quad (46)$$

Eq. (46) yields a much smaller value for χ than Eq. (38) because of the second-order dependence on the ratio $a/R_0$ and because of the absence of cos ψ in the denominator. One of the advantages of moving both source points is that the nonuniformity remains small for the optimal range-resolution situation where ψ=90°.

The results for range uncertainty Δz previously given for motion of a single source are based on the first term in the small-a approximations of N and ρ. Because the first terms in these approximations are identical for motion of two sources, the previously described results are also valid for the motion of two sources.

Figure 10:
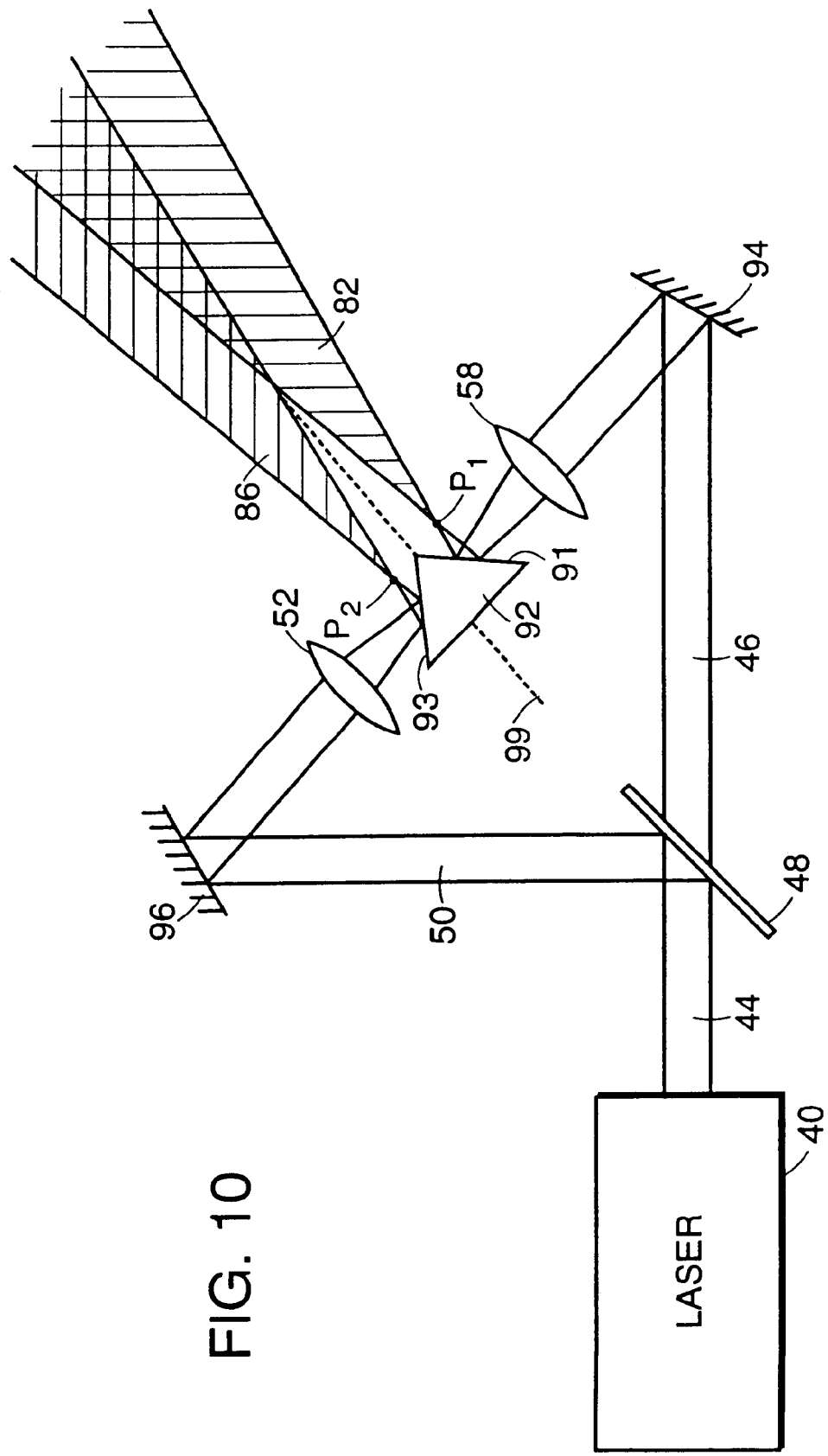
FIG. 10 is a block diagram of yet another embodiment of a system for producing the two sources of radiation shown in FIG. 1.

Referring to FIG. 10, another embodiment of the present invention includes two oppositely moveable sources $P_1$ and $P_2$. A beam 44 from a laser source 40 is split into a transmitted beam 46 and a reflected beam 50 by beam splitter 48. The transmitted beam 46 is reflected from a mirror 94 to a lens 58. Similarly, the reflected beam 50 is reflected from a mirror 96 to a lens 52. A right angle prism 92 with mirrored surfaces 91 and 93 is used to redirect the beams 46 and 50 from the lenses 58 and 52, respectively. The beams 46 and 50 converge at points $P_1$ and $P_2$, respectively, and continue as divergent beams 82 and 86, respectively. Phase shifting can be accomplished by changing the optical path length difference between the beam paths followed by the separated beams 46 and 50. This can be achieved, for example, by inducing out-of-plane translations of at least one of the elements 48, 94, or 96 with a piezoelectric transducer (not shown). Alternately, a phase-shifting device (not shown) may be inserted in one of the beam paths 46 or 50. An example of such a device is a rotating glass disk that has been coated such that its optical thickness varies in discrete steps with rotation angle. Prism 92 is translatable along an axis 99 to affect a symmetric motion of the sources $P_1$ and $P_2$. Alternatively, the prism 92 can remain fixed while the laser 40, beamsplitter 48, mirrors 94 and 96 and lenses 52 and 58 are translated as one group along the axis 99 in order to cause a symmetric translation of the sources $P_1$ and $P_2$. Changing the separation of the sources $P_1$ and $P_2$ can also be accomplished using an angular modulation device (not shown) positioned in the beam 44 between the laser 40 and beam splitter 48 which causes a change in the beam angle. Examples of angular modulation devices are galvanometer mirrors and acousto-optic modulators.

In another embodiment (not shown), the sources $P_1$ and $P_2$ are virtual sources. That is, the sources $P_1$ and $P_2$ are not small sources of light or regions where the beams 46 and 50 pass through focus. Instead, diverging beams 82 and 86 are generated using optical components which cause the beams 46 and 50 to diverge (i.e. negative lenses). The resulting illumination at the object can be indistinguishable from other embodiments using real sources $P_1$ and $P_2$.

Figure 11:
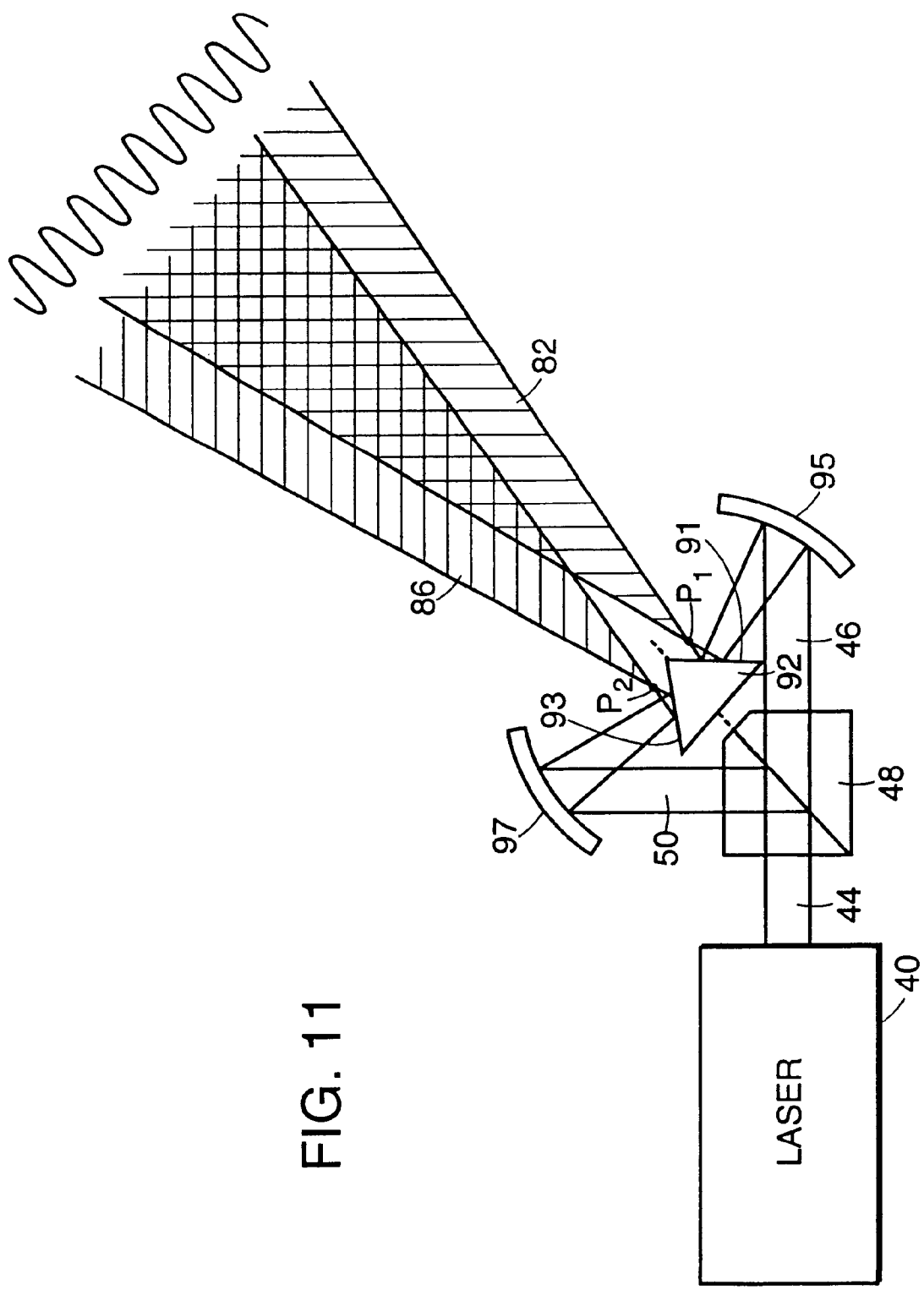
FIG. 11 is a block diagram of yet another embodiment of a system for producing the two sources of radiation shown in FIG. 1.

FIG. 11 shows yet another configuration for generating oppositely moving sources $P_1$ and $P_2$. The beam 44 from a laser source 40 is split into a transmitted beam 46 and a reflected beam 50 by beam splitter cube 48. The transmitted beam 46 is reflected from a curved mirror 95 and from a mirrored surface 91 of a right angle prism 92. Similarly, the reflected beam 50 is reflected from a curved mirror 97 and from a mirrored surface 93 of the right angle prism 92. The beam splitter cube 48 can be modified (e.g., removal of glass outside the beam path) to permit close mounting of optical components. The curved mirrors 95,97 perform the functions of the flat mirrors 94,96 and lenses 58,52 in FIG. 10. The curved mirrors 95,97 can be off-axis parabolic mirror segments which yield small focal spots at $P_1$ and $P_2$. Alternatively, the curved mirrors 95,97 can be spherical elements. Aberrations caused by spherical elements will not affect the fringe contrast, but only the fringe position. These aberrations can be incorporated into the analysis. Phase shifting can be accomplished by translating beam splitter 48 or by placing a phase-shifting device (not shown) in one of the beam paths 46 or 50 as discussed previously.

Referring again for a moment to FIG. 1, the derivation in the prior description is based on a telecentric imaging configuration. The lateral position of the image point $P_i$ in the focal plane is related to the lateral position of the object point $P_0$ by the magnification of the lens 24 and is independent of the separation between the lens 24 and the object 10. Defocusing blurs the image $P_i$ but does not affect its apparent lateral position at the detector 22. Consequently, the lateral position of an object point $P_0$ can be estimated by the position of its image point $P_i$, regardless of the distance. Unfortunately, telecentric imagers 24 may be impractical for large objects because the lens 24 must be at least as large in diameter as the largest dimension of the measured object 10. Thus most lenses are not telecentric.

Figure 12:
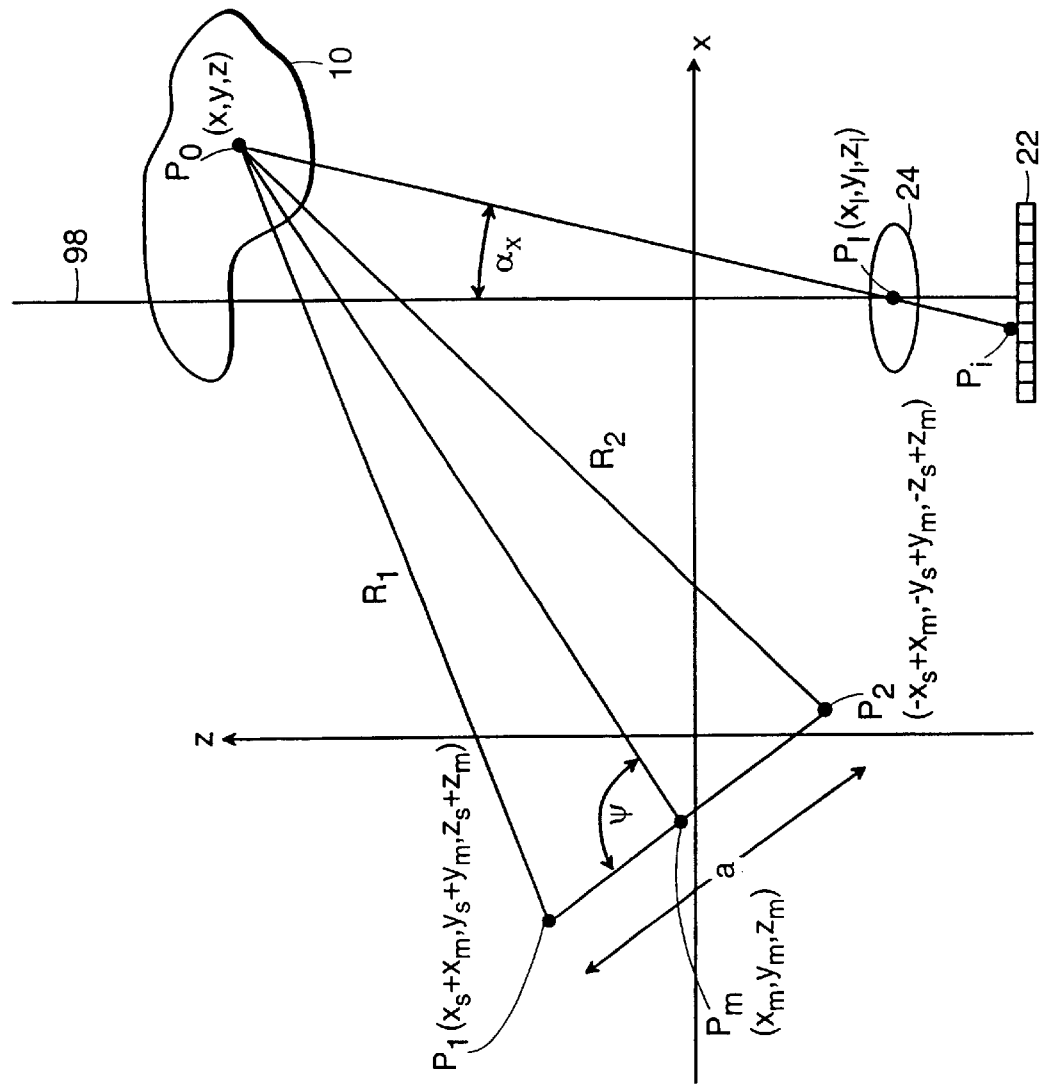
FIGS. 12 and 12A are block diagrams of the embodiment of FIG. 1.

Referring now to FIG. 12, to avoid this problem, a more general approach for determining the (x,y,z) coordinate of the point $P_0$ is to assume that the position of the image point $P_i$ at the detector 22 is a measure of the angle $\alpha_x$ between the object point $P_0$ and the optical axis 98 of the focusing element 24. The coordinate can be derived from the fringe number N and the location of the image point at the detector 22. The following equations are exact (do not assume small a). The lateral coordinates are given by:

$$x = x_f + (z - z_l) \tan \alpha_x \tag{47}$$

and $$y = y_f + (z - z_l) \tan \alpha_y \tag{48}$$

where $\alpha_x$ and $\alpha_y$ are the components of angle $\alpha$ as measured in the x-z and y-z planes, respectively.

The z coordinate is given by:

$$z = z_{IN} + \frac{\bar{\rho}^2 B - B_s C_s \pm \bar{\rho} \sqrt{\bar{\rho}^2 \left[ B^2 - AC + \frac{a^2}{4}(\bar{\rho}^2 A - B_s^2) \right]}}{B_s^2 - \bar{\rho}^2 A} \tag{49}$$

where $$A = 1 + \tan^2 \alpha_x + \tan^2 \alpha_y \tag{50}$$

$$B = x_p \tan \alpha_x + y_p \tan \alpha_y \tag{51}$$

$$C = \frac{a^2}{4} + x_p^2 + y_p^2 \tag{52}$$

$$B_s = l_s \tan \alpha_x + m_s \tan \alpha_y + n_s \tag{53}$$

$$C_s = l_s x_p + m_s y_p \tag{54}$$

$$x_p = x_f - x_m - z_l \tan \alpha_x \tag{55}$$

and $$y_p = y_f - y_m - z_l \tan \alpha_y. \tag{56}$$

The coordinate $(x_m, y_1, z_1)$ represents the mid-position $P_m$ between points $P_1$ and $P_2$ and allows for a generalized solution with $(x_m, y_m, z_m)$ located at other than the origin of the coordinate system. For increased versatility, $P_m$ and other parameters may vary with time.

The generalized determination of object coordinates described above can be implemented in software on a computer which receives data from a processor unit in communication with a plurality of detectors 22 (e.g., a CCD array). Alternatively, the algorithm can be implemented directly in the processor unit 28.

The use of Eqs. (47)–(49) to determine the (x, y, z) coordinates of a point $P_0$ requires knowledge of the angles $\alpha_x$ and $\alpha_y$ in addition to the normalized fringe number $\bar{\rho}$ as defined by Eq. (19). In the example above, these angles are determined by the location of the image point $P_i$ in the focal plane 22. In order to determine $\alpha_x$ and $\alpha_y$ accurately, it is necessary to correct for any image distortion that may occur in the lens 24. Distortion can be corrected, for example, by creating a distortion function that maps angles $\alpha_x$ and $\alpha_y$, onto image points $P_i$. The distortion map may vary for different lenses and may even vary slightly for the same lens 24 in different imaging configurations.

Figure 12A:
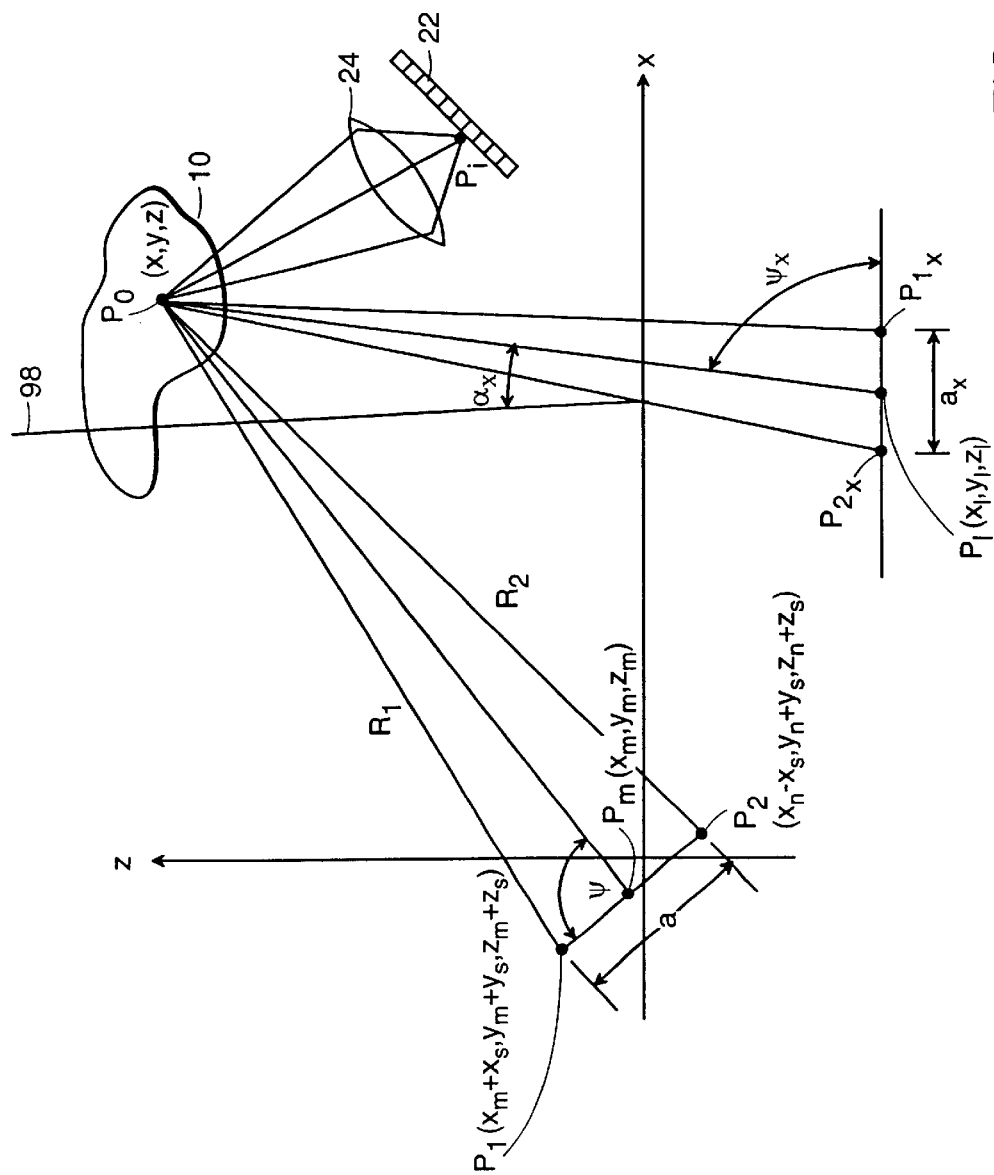

In another embodiment of the present invention, the inconvenience of characterizing lens distortion is avoided by using additional source heads to determine the remaining two direction components necessary for triangulation. For example, as depicted in FIG. 12a, an additional source head is placed at the position $P_i$ and the lens 24 which was previously at $P_i$ (see FIG. 12) is placed at any convenient position for viewing the region of interest on object 10. If the sources $P_{1x}$ and $P_{2x}$ in the second source head are oriented parallel to the x axis, then a measurement of the fringe number $N_x$ at point $P_0$ for this source head is equivalent to measuring the angle $\psi_x$ between the lines defined by points $P_{1x}$ and $P_1$, and points $P_1$ and $P_0$ (see Eq. (41)). The angle $\alpha_x$ required for Eqs. (47)–(49) is then determined from $\psi_x$ by the relationship $\alpha_x = \pi/2 - \psi_x$. Likewise, (not shown in FIG. 12a) the angle $\alpha_y$ can be determined by using a source head at position $P_1$ with sources $P_{1y}$ and $P_{2y}$ oriented parallel to the y axis. The fringe number $N_y$ for this orientation of a source head provides a measurement of the angle $\alpha_y$ through $\alpha_y = \pi/2 - \psi_y$. The source heads providing the angles $\alpha_x$ and $\alpha_y$ can, for example, be the same source head rotated 90° about the z axis or different source heads made to appear at the same location through use of a beam splitter.

When triangulating using multiple source heads, it is not necessary to know the location of lens 24 and detector 22 (or the location components of detectors 23 placed on the object 10). The purpose of the imaging system 22 and 24 (or detectors 23) is to observe the illumination intensity at $P_0$. Each pixel in the detector array 22 represents an observation point $P_0$. Consequently, an (x, y, z) coordinate may be determined for each pixel. Various approaches may be used to separate the measurements of N corresponding to different source heads. For example, the measurements may be time multiplexed by illuminating sequentially with different source heads or wavelength multiplexed by simultaneously illuminating with multiple source heads operating at different wavelengths. Measurements can be further distinguished through the use of polarization diversity.

To further elucidate the process of triangulation using multiple source heads, reference is made again to Eq. (41). For typical applications, a is small compared with $R_0$ and Eq. (41) can be simplified to.

$$N = \frac{a}{\lambda}\cos\Psi = \frac{a\nu}{c}\cos\Psi \tag{57}$$

The dependence on source spacing a and wavelength $\lambda$, or frequency $\nu$, is eliminated from Eq. (57) by writing N in terms of the normalized fringe number $\bar{\rho}$ using Eq. (19):

$$\bar{\rho} = \cos\Psi \tag{58}$$

Thus, the normalized fringe number corresponding to a particular source head is a direct measure of a component v of direction from the mid-point $P_m$ of the source head to the observed point $P_0$. The three-dimensional coordinates of $P_0$ can be determined through triangulation given measurements from three or more source heads Suppose that source heads are located at the three positions $P_{m1}$, $P_{m2}$, and $P_{m3}$, and the orientations of the source pairs corresponding to each of these locations are given by the direction cosines ($l_{s1}$, $m_{s1}$, $n_{s1}$), ($l_{s2}$, $m_{s2}$, $n_{s2}$), and ($l_{s3}$, $m_{s3}$, $n_{s3}$). In terms of Cartesian coordinates and direction cosines, Eq. (58) takes the form $$\bar{\rho}_i = \frac{l_{s_i}(x - x_{m_i}) + m_{s_i}(y - y_{m_i}) + n_{s_i}(z - z_{m_i})}{\sqrt{(x - x_{m_i})^2 + (y - y_{m_i})^2 + (z - z_{m_i})^2}} \tag{59}$$

where the subscript i distinguishes between source heads. Determination of $P_0$ coordinates (x, y, z) is achieved by measuring the normalized fringe numbers $\bar{\rho}_1$, $\bar{\rho}_2$ and, $\bar{\rho}_3$ for each source head and solving the set of three simultaneous equations represented by Eq. (59). The formalism of Eq. (59) is convenient because it handles generalized source-head placement and orientation in a compact form.

For those cases where the object point $P_0$ corresponding to a particular pixel 22 is not illuminated by three or more source heads, the missing direction information for that pixel 22 can be filled in by interpolating between the directions calculated for surrounding pixels 22. Furthermore, direction information obtained from multiple source heads can be combined with direction information obtained from pixel location to improve measurement quality.

The fact that multiple source heads makes it possible to determine $P_0$ without knowing receiver parameters (such as position, orientation, magnification, and distortion) makes it a simple matter to combine information from multiple imagers 22 and 24 (only one shown for clarity). This fact follows because the point clouds produced for each camera are already in the same coordinate system and do not need to be registered by going through a calibration procedure. Multiple imagers 22 and 24 can be positioned to view specific regions of interest at any desired view angle and lateral resolution. Thus, one imager 22 and 24 can give an overview of the entire object 10, and other imagers 22 and 24 can inspect regions of interest at high resolution.

In one of the above major classes of embodiments, the fringe number N at a point $P_0$ on the surface of the object 10 is determined by counting intensity-oscillations caused by motion of one or both of the sources $P_1$ and $P_2$. In its most rudimentary form, cycle counting requires sampling the intensity at least twice per cycle in order to keep track of the count. Also, to minimize cost, it may be desirable to count cycles using standard off-the-shelf components such as a charge-coupled device (CCD) connected to a frame grabber. Because the number of counts increases the farther a point $P_0$ in the image frame is from the N=0 position, it may be necessary to acquire and process hundreds of image frames using this approach.

The need for acquiring many image frames to determine N can be overcome by using a more sophisticated counting technique. This technique, denoted as progressive fringe division, takes advantage of the periodic and predictable nature of the intensity modulation. Thus, N can be determined by sampling the intensity modulation at a few discrete values of the source spacing a.

Figure 13:
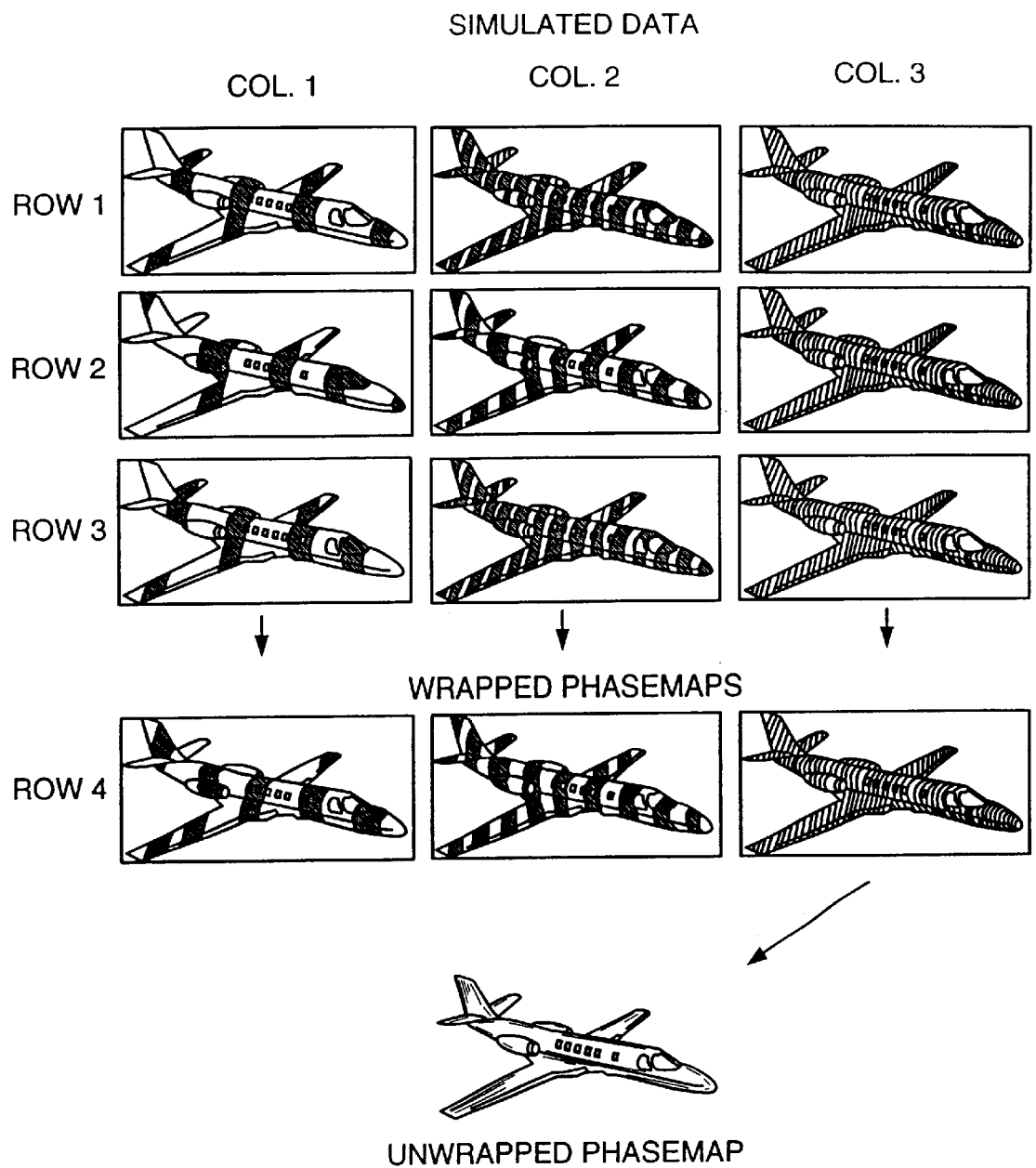
FIG. 13 illustrates an embodiment of a series of steps used to perform progressive fringe division.

As depicted in FIG. 13, progressive fringe division consists of varying the fringe size from an initial coarse spacing (Col. 1) to a final fine spacing (Col. 3) in discrete steps. At each step, a wrapped phase map, or cycle map, (Row 4) is generated from phase-shifted fringe patterns (Rows 1–3). Each successive wrapped phase map is unwrapped based on the previous unwrapped phase map in a bootstrapping operation. The ratio of fringe spacings between steps is typically of the order of 10 or more, allowing a very dense fringe pattern to be unwrapped using a small number of data frames. Calculating the position coordinates from a dense fringe pattern improves precision. One of the advantages of progressive fringe division is that the algorithm correctly assigns the fringe order number to each fringe, regardless of the complexity of the surface of object 10. For example, object 10 can contain surface discontinuities, large cliffs, and holes, or consist of a number of disjoint objects. Because progressive fringe division does not rely on surface continuity, it can be used to locate the position of a number of unconnected discrete points that are distributed in space.

A further explanation of progressive fringe division and its embodiment is aided by considering three facts. (For simplicity, opposing motion of the sources $P_1$ and $P_2$ is assumed in this discussion, although the following results can be formulated for other situations, including motion of only one source $P_1$ and stationary frequency-tuned sources.) First, the number of intensity oscillations N that occur at a point $P_0$ as the source spacing increases from an initial value of zero to the final value a is equal to the fringe number N at $P_0$ for the final value a. For example, if 10 were a simple object such as a plane, one could count N fringes on the surface of the object between the N=0 position (occurring at $R_1=R_2$) and the point $P_0$. The value of N includes partial cycles or fringes and thus is not necessarily a whole number.

This first fact can be further explained by noting that N can also be interpreted as the number of fringes that move past the point $P_0$ to be collected inside the region between $P_0$ and N=0 as the source spacing a increases from zero to its final value. In other words, when a=0 there are no fringes within this region, and the number of fringes contained inside this region increases by one every time a fringe moves across $P_0$. This correspondence between fringe number N and oscillation cycles is key to the robust three-dimensional imaging technique and makes it possible to determine N at an arbitrary point $P_0$ without making assumptions about the continuity of the surface surrounding the point $P_0$. Consequently, discontinuities in the surface such as holes and cliffs (i.e., edges) are handled without ambiguity.

A second fact is that N is directly proportional to the separation a according to Eq. 57. Consequently, it is not necessary to complete an entire scan with a running from zero to its final value to determine N(a). The value of N for a spacing $a_2$ can be estimated from its value at a spacing $a_1$ using the relationship $$N_{estimate}(a_2)=(a_2/a_1)N(a_1) \tag{60}$$

Likewise, $$N_{estimate}(a_2-a_1)=N(a_2)-N(a_1) \tag{61}$$

which states that knowledge of the value of N at two source spacings $a_1$ and $a_2$ can be used to estimate its value at the smaller difference spacing $a_2-a_1$.

A third fact is that a phase-shifting measurement can be made at any intermediate value of the source spacing a to provide a high-resolution map of the partial-cycle or "wrapped" component of the fringe number N at each measurement point $P_0$ within the field of view. In doing so, the wrapped component is calculated from the phase by $$N_{wrapped}=\phi/(2\pi) \tag{62}$$

and the phase is determined, for example, by Eq. (6). Thus, if $\phi$ ranges between $\pm\pi$, $N_{wrapped}$ ranges between $\pm 0.5$. Although a phase-shifting measurement can determine $N_{wrapped}$ to high precision, it leaves the integer-valued offset for N undetermined.

Because finer fringes represent a smaller variation in $\bar{\rho}$ per fringe, they can provide higher precision in the determination of $\bar{\rho}$ (assuming successful unwrapping). For example, finer fringes reduce the effect that phase-step errors have on the measurement of the surface profile. Finer fringes, however, also make it more difficult to perform the unwrapping because of the increased fringe density. The advantage of progressive fringe division is that it allows very fine fringes to be unwrapped correctly to achieve the highest possible resolution.

To implement progressive fringe division, wrapped cycle maps (as depicted in Row 4 of FIG. 13) are produced for the imaged surface at each of a number of discrete source separations a. It is often sufficient to produce these cycle maps for three or fewer fringe sizes: coarse, medium, and fine. Successive unwrapped cycle maps are used in a bootstrapping operation to unwrap the next cycle map without introducing errors in the integer offset. The unwrapped cycle map corresponding to the finest fringe pattern provides the highest-resolution measurement.

Figure 14:
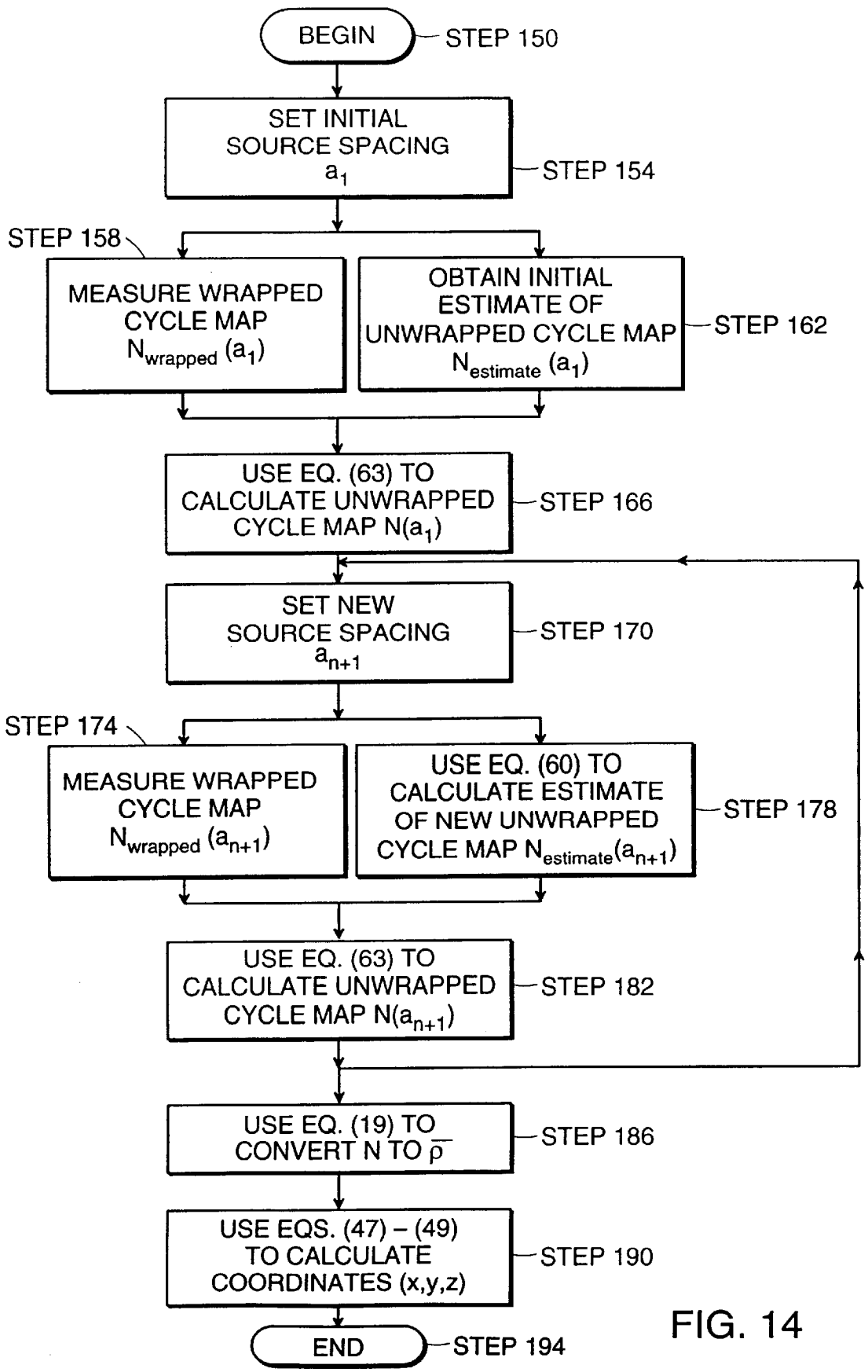
FIG. 14 is a flowchart of an embodiment of a series of steps used to perform progressive fringe division.

FIG. 14 depicts an illustrative series of steps used to execute progressive fringe division. The procedure begins (step 150) by setting the source spacing at an initial value $a_1$ (step 154). This value is normally the smallest in a series of source spacings and is chosen so as to produce a coarse fringe pattern on the object 10. A wrapped cycle map is then produced (step 158) by performing a phase-stepping measurement, as illustrated by Eq. (6). Step 158 is completed by converting phase to cycles by Eq. (62).

Independently of step 158, (step 162) an initial unwrapped estimate of N for the coarse fringe pattern corresponding to $a_1$ is obtained. Step 162 may be performed simultaneously with step 158, before step 158, or after step 158. However, both step 158 and 162 must be performed in order to continue to the next step. There are many approaches for producing this initial estimate. For example, $a_1$ can be made to be so small that the entire object falls within one fringe (e.g., $-0.5<N\leq 0.5$) this making unwrapping unnecessary. Alternately, a can be large enough to produce a small number of fringes across the object 10 so that a simple model (such as a linear ramp) for the variation of N over the field of view will suffice as an estimate for N as long as this estimate is accurate to within one-half of a cycle at all measurement points to be unwrapped. Another example of a method for obtaining the initial estimate is to assume a generic shape or an expected shape and to calculate N based on Eq. (40). Other examples are to use the result of a previous measurement on the same or a similar object 10, or to use cycle counting to partition the field of view into cycles. The number of frames necessary for cycle counting is small here because of the small number of fringes corresponding to $a_1$.

The purpose of the next step (step 166) is to unwrap the wrapped cycle map obtained from the measurement in step 158. If the unwrapped estimate from step 162 is accurate to within one-half of a cycle, unwrapping is achieved by use of the expression $$N(a) = N_{wrapped}(a) + \text{Round}[N_{estimate}(a) - N_{wrapped}(a)] \tag{63}$$

Note that the second of the two terms on the right-hand side of Eq. (63) is simply the integer offset required for unwrapping. Subtracting the wrapped measurement from the unwrapped estimate in this term produces a stair-step-like function whose value is approximately equal to the integer offset. Rounding to the nearest integer makes the expression exact, as long as the error falls within the one-half-cycle limits. Otherwise Eq. (63) introduces an integer offset error in N that may vary across the field of view.

The result of step 166 is an improved estimate of N for the smallest source spacing $a_1$. In order to further improve the quality of the measurement, a new source spacing $a_2$ is set in step 170 that produces a finer fringe pattern on the object 10. A new phase-stepping measurement is then completed in step 174 to yield a new wrapped cycle map corresponding to the finer fringe pattern. The unwrapping of this measurement requires a new unwrapped estimate corresponding to $a_2$. This estimate is obtained in step 178 by using Eq. (60) to scale the previous unwrapped estimate (obtained for the source spacing $a_1$ from step 166) into the appropriate range. Once scaling has taken place, the new wrapped cycle map from step 174 is unwrapped in step 182 by substituting it and the scaled estimate from step 178 into Eq. (63).

The result of the first pass through steps 170 through 182 is a refined estimate of N that corresponds to the larger source spacing $a_2$. Steps 170 through 182 can now be repeated with successively finer fringes (larger source spacings) until optimal $\bar{\rho}$ resolution is achieved. (Each time through the loop the source-spacing subscript is incremented by one.) Normally, optimal resolution is achieved in one to three iterations. Typically, the ratio between the new and old source spacings is of the order of ten or more. The maximum value this ratio can take is determined in practice by requiring that the error between the estimated and true value of N remains under the one-half cycle limit.

The loop represented by steps 170 through 182 in FIG. 14 is exited once the desired number of iterations has been completed. In step 186, N is converted to $\bar{\rho}$ through Eq. (19). If the objective of the measurement is to determine full three-dimensional coordinates, a triangulation takes place using, for example, Eqs. (47)–(49) or Eq. (59), to obtain coordinates for each measurement point (step 190). Step 194 represents the end of progressive fringe division. It should be appreciated that FIG. 14 is only an illustration of the procedure to be followed for progressive fringe division, and that the component steps can be executed in a number of different orders. For example, it may be desirable to collect all data before beginning the calculations.

The ability to produce fringes of widely varying size for use with progressive fringe division requires the source spacing to vary by the same ratio as the fringe spacing. A technique is now described for synthesizing a fringe pattern of a desired spacing from two other measurements. One advantage of this approach is that the two measurements used to synthesize the fringe pattern may be more readily obtainable.

Fringe synthesis is based on the following modification of Eq. (61):

$$N_{wrapped}(a_2-a_1) = [N_{wrapped}(a_2) - N_{wrapped}(a_1)]_{wrapped} \tag{64}$$

This result follows from wrapping both sides of Eq. (61) and observing that wrapping the difference $N(a_2) - N(a_1)$ on the right-hand side of Eq. (61) is equivalent to wrapping the difference $N_{wrapped}(a_2) - N_{wrapped}(a_1)$ of individually wrapped components. In other words the difference between the wrapped quantities within the square brackets in Eq. (64) ranges between ±1 and this difference must be wrapped to lie within the correct range of ±0.5.

Equation (64) provides a means for synthesizing phase-stepping measurements of wrapped N at a source spacing equal to the difference $a_2-a_1$ from individual phase-stepping measurements obtained at source spacings $a_1$ and $a_2$. This equation has a remarkable property for small values of $a_2-a_1$. Although the individual measurements from which the synthesized measurement is composed may be highly irregular and contain numerous discontinuities, the left-hand side of Eq. (64) can be smooth over the field of view, having only the number of wrapping discontinuities that correspond to the difference $a_2-a_1$. Thus fringe synthesis is an effective technique for producing an initial phase map for beginning progressive fringe division. Fringe synthesis can also be used, to synthesize any of the remaining unwrapped phase maps in the sequence to be used for progressive fringe division. If $\bar{\rho}$ is to be calculated from a synthesized cycle map, Eq. (19) is modified to read $$\bar{p} = \frac{\lambda N(\Delta a)}{\Delta a} \tag{65}$$

where $\Delta a$ represents the spacing difference between the two measurements.

Figure 14A:
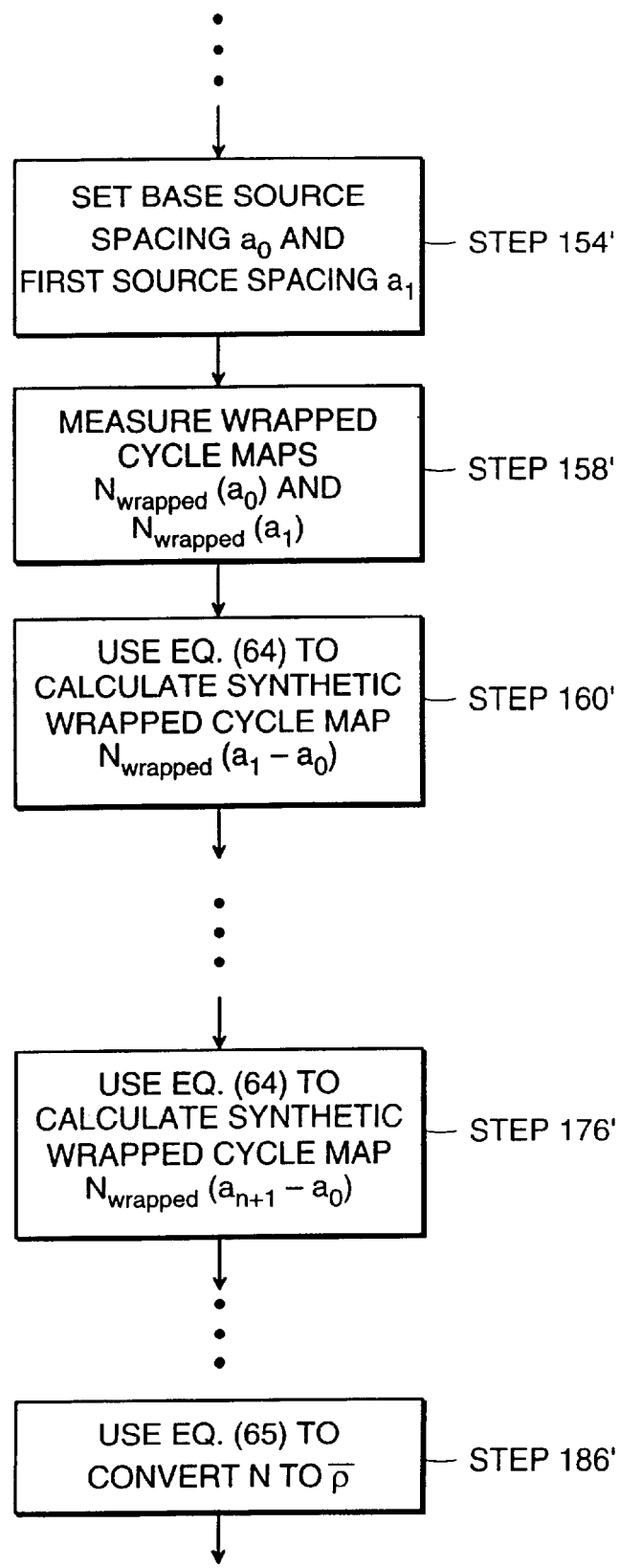
FIG. 14a is a flowchart of an embodiment of steps used to perform progressive fringe division utilizing fringe synthesis.

FIG. 14a illustrates one way that fringe synthesis can be incorporated into the progressive-fringe-division flow chart in FIG. 14. Step 154' is a modification of step 154 to include the selection of a base separation $a_0$ in addition to the separation $a_1$. Step 158' is a modification of step 158 to measure wrapped cycle maps at both separation values $a_0$ and $a_1$. Steps 160' (inserted after Step 158) and 176' (inserted after step 174) are additional steps that make use of Eq. (64) to synthesize the wrapped cycle map corresponding to the differences $a_n-a_o$. Step 186' is a modification of step 186 that allows $\bar{\rho}$ to be calculated from a synthesized cycle map using Eq. (65).

One of the advantages of fringe synthesis is that it may reduce the demands on a system for producing motion between sources $P_1$ and $P_2$. For example, a small incremental change from the widest source separation can produce fringes corresponding to a very small source separation. This approach not only reduces the travel requirement, but also overcomes some potential limitations of the source heads described in FIGS. 10 and 11. For example, with these source heads it is difficult to produce extremely small source separations, and fringes may become unstable due to vibrations when attempting to do so. Another advantage of fringe synthesis is that it may improve measurement repeatability and accuracy due to the fact that it is normally easier to repeat a constant difference between two source separations than it is to maintain an absolute source-spacing calibration.

Yet another advantage of fringe synthesis is that it minimizes errors of motion due to source-head misalignment. These motion errors may occur, for example, if the focal spots $P_1$ and $P_2$ in FIGS. 10 and 11 do not overlap for the nominal a=0 position. There are two types of misalignment to be considered. First, suppose that one of the focal spots $P_1$ is displaced out of the plane of the diagram with respect to the other $P_2$ by an amount d. Even though these two focal spots $P_1$ and $P_2$ each follow a straight-line trajectory and these trajectories can be parallel, the two spots miss by the distance d at their closest approach (i.e., the nominal a=0 position). As the spots $P_1$ and $P_2$ pass at closest approach, the orientation of the fringe pattern on the object 10 flips by 90° with respect to the nominal, or desired, orientation. Furthermore, the fringe spacing is never larger than that corresponding to a source separation d. (Alignment of the source head is facilitated by adjusting the displacement d until the fringes stay properly oriented near a=0.)

In the second type of misalignment, one of the focal spots $P_1$ is displaced along the direction of motion 99 with respect to the other focal spot $P_2$. This type of misalignment is caused by a sideways displacement of prism 92 (i.e., the displacement is perpendicular to axis 99 and is in the plane of FIGS. 10 and 11). At closest approach, one source $P_1$ lies directly behind the other source $P_2$, producing a circularly concentric fringe pattern on the object. As a increases, the fringes exhibit less curvature and approach their normal appearance. (Minimization of this source of error during source-head alignment is facilitated by adjusting the prism 92 sideways for small a to minimize fringe curvature.)

The difficulty that motion errors create for progressive fringe division is due to the resulting phase errors which are magnified when Eq. (60) is used to produce a scaled estimate of N. Motion errors limit the magnitude of the a ratio that can be used without introducing half-cycle errors in the estimate of N. Fringe synthesis overcomes this limitation because motion-induced phase errors are common to both measurements and cancel in the subtraction. Thus, even though the measurements may produce fringes that are distorted from the desired shape, the synthesized fringes are normal.

Cancellation of phase errors between the two beams with fringe synthesis has the additional advantage of automatically compensating for a global phase-offset error between the two beams. These phase-offset errors are introduced, for example, by a path-length difference So between the two separated beams that is not an integer multiple of the wavelength $\lambda$. Phase offset errors cause the N=0 position to occur at a fringe phase of other than 0° (i.e., at other than an intensity maximum). These phase errors automatically cancel when performing fringe synthesis, making it unnecessary to calibrate the phase of the fringe pattern. Alternatively, phase calibration can be achieved by determining the precise N=0 position by fringe synthesis and adjusting the phase-shifting element for constructive interference at that point.

The cancellation of phase errors for synthesized fringes is important for the additional reason that it tends to cancel out wavefront errors in the illumination patterns falling on object 10 from the individual sources $P_1$ and $P_2$. Wavefront errors arise from the use of imperfect or extended sources and produce perturbations or ripples in the fringe pattern. These perturbations translate into small height errors in the measurement. Cancellation of wavefront errors occurs in fringe synthesis because these errors are largely independent of the distance between sources. Therefore, the error is common to the measurements taken at each source spacing and cancels due to the subtraction in Eq. (64). Fringe synthesis is an effective means for reducing errors due to illumination defects and can serve to decrease system cost by reducing requirements on the quality of the source-head optics.

Fringe synthesis allows progressive fringe division to be carried out with a reduced range of motion of the source points thus allowing a simpler source head design. Recall that in general, a source head provides two types of fringe modulation—a variation in fringe size and sideways motion of the fringe pattern arising from phase shifting. For a pure phase shift, the phase is changed without altering the position of the source. Another way of changing phase, however, is to move one source $P_1$ towards or away from the object relative to the other source $P_2$. Although doing so changes the location of the source $P_1$, this change is very small (less than a wavelength), and the resulting change in orientation of the source pair $P_1$ and $P_2$ is small if the sources are sufficiently far apart. Because the source separation can remain large for fringe synthesis, both types of modulation can be achieved through small motions of one or both source points $P_1$ and $P_2$. This reduced motion requirement allows simple source heads to be designed. For example, a source head might consist of the fiber-optic-splitter arrangement depicted in FIG. 2b. Phase shifting and variation in fringe size are accomplished by moving the end of one of the fibers in orthogonal directions.

Fringe synthesis has an important additional advantage of enabling progressive fringe division to be used for measurements based on laser-frequency tuning. Without fringe synthesis, application of progressive fringe division to the measurements would require an extremely high fractional tuning bandwidth in order to achieve the large variations in fringe size that are necessary for progressive fringe division. Fringe synthesis makes it possible to produce fringe-spacing variations that lie far outside the conventional tuning range. The tuning approach can provide measurements with very high repeatability and precision because of the fact that source motion is eliminated and frequency can be measured and controlled to high precision.

Application of progressive fringe division and fringe synthesis with frequency-tuning is explained with respect to Eq. (57). N has the same functional dependence on laser frequency v as it does on source spacing a. (It is assumed that the path-length difference represented by $S_0$ in Eq. (1) is zero, otherwise this offset must be accounted for in the equations.) Therefore, Eqs. (60), (63), and (64), which form the basis for progressive fringe division and fringe synthesis, also apply to frequency tuning if N is written as a function of frequency v. The expressions that govern frequency tuning are then $$N_{estimate}(v_2) = (v_2/v_1) N(v_1) \tag{66}$$

$$N_{wrapped}(v_2 - v_1) = [N_{wrapped}(v_2) - N_{wrapped}(v_1)]_{wrapped} \tag{67}$$

and $$N(v) = N_{wrapped}(v) + \text{Round}[N_{estimate}(v) - N_{wrapped}(v)] \tag{68}$$

Equations (19) and (65) also take the modified forms $$\bar{p} = \frac{c}{a} \frac{N(v)}{v} \text{ and} \tag{69}$$

$$\bar{p} = \frac{c}{a} \frac{N(\Delta v)}{\Delta v} \tag{70}$$

respectively, where $\Delta v$ represents the difference frequency if N has been synthesized from two measurements.

Figure 15:
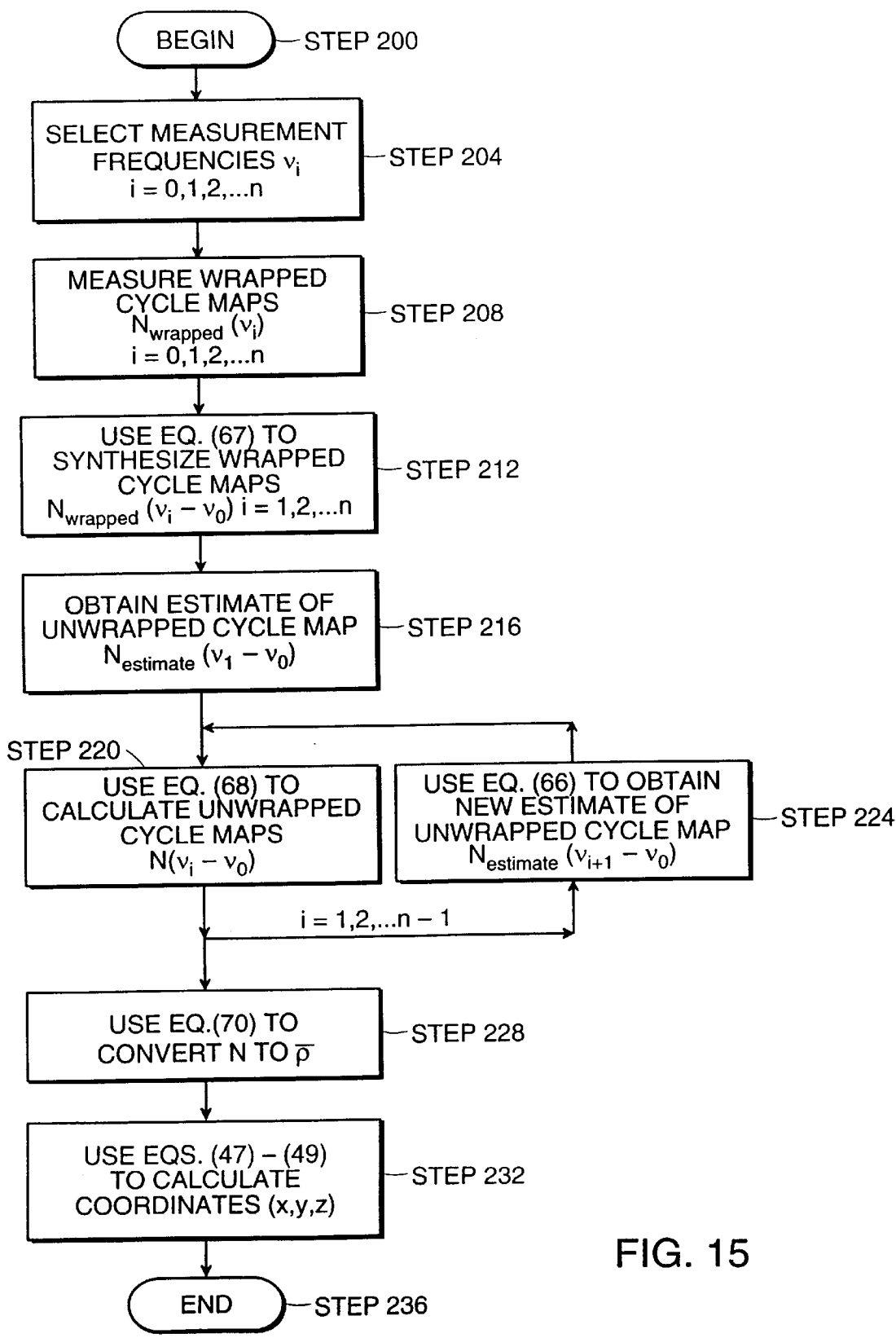
FIG. 15 is a flowchart of an embodiment of a method of progressive fringe division using fringe synthesis and frequency tuning.

FIG. 15 illustrates the steps to be followed for execution of progressive fringe division using fringe synthesis and frequency tuning. (Note that FIG. 15 also applies to progressive fringe division using fringe synthesis and source motion if v is replaced by a.) In this illustration, all data is collected at the beginning of the process. The procedure begins (step 200) by selecting the laser frequencies $v_0$, $v_1, \ldots v_n$ (step 204) to be used in the measurement of wrapped cycle maps $N_{wrapped}(v_0), N_{wrapped}(v_1), \ldots N_{wrapped}(v_n)$ (step 208). Equation (67) is then used to synthesize wrapped cycle maps for the difference frequencies $v_1-v_0$, $v_2-v_0, \ldots v_n-v_0$ (step 212). An estimate of the unwrapped cycle map is then obtained (step 216) for the first difference $v_1-v_0$ using one of many possible approaches (e.g., step 162 of FIG. 14). A preferred approach is to begin with a difference $v_1-v_0$ that is small enough so that $N(v_1-v_0)$ lies within the $\pm 0.5$-cycle limit. In step 220, Eq. (68) is used to calculate the unwrapped cycle map for the next larger difference $v_i-v_0$ in the series. This unwrapped cycle map is scaled using Eq. (66) in step 224 to be fed back into step 220 to unwrap the next synthesized cycle map in the series. The loop is exited after the cycle map corresponding to the final frequency difference $v_n-v_0$ has been unwrapped. In step 228, Eq. (70) is used to convert the final unwrapped cycle map N to fringe number $\bar{\rho}$. Equation (69) is used if the final cycle map N was not synthesized. In step 232 directional information corresponding to $\bar{\rho}$ is transformed into three-dimensional coordinates for each point of interest $P_0$ using, for example, Eqs. (47)–(49) or Eq. (59).

It should be appreciated that progressive fringe division and the combination of progressive fringe division with fringe synthesis are powerful general techniques for resolving counting ambiguities and refining counting estimates and that these techniques have applications beyond those described above. In particular, these techniques are not limited to the above methods and apparatus for acquiring data or even to the analysis of fringes.

Figure 16:
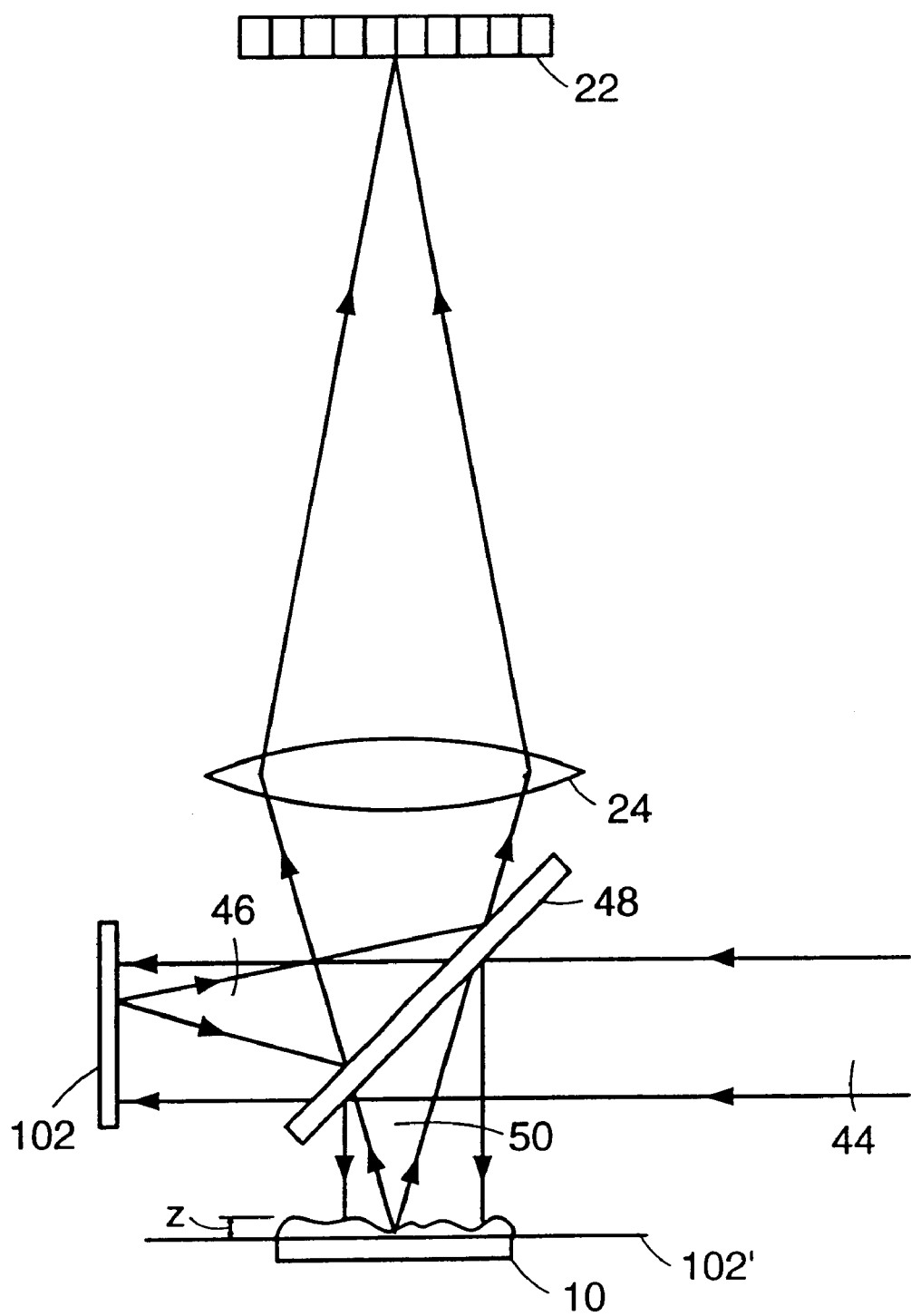
FIG. 16 illustrates a block diagram of an embodiment of the invention used in the method of FIG. 15.

With reference to FIG. 16, a variation is now described that utilizes the progressive-fringe-division and fringe-synthesis techniques on unresolved fringes, or image speckle. In this figure, laser beam 44 is incident on beam splitter 48 which splits beam 44 into beams 46 and 50. Beam 50 reflects off beam splitter 48 and illuminates a region of interest on object 10. Beam 46 passes through beam splitter 48 and illuminates reference surface 102. Light reflected off of object 10 and reference surface 102 is recombined by beam splitter 48 and passes through lens 24 which produces a speckled image on detector array 22. Phase shifting is accomplished by inserting a phase-shifting element (not shown) in one of the separated beam paths. The frequency of laser beam 44 is variable or can be switched between two or more discrete values. Path length differences due to a difference in height z between object 10 and virtual image 102' of reference surface 102 produce a modulation of speckle intensity that changes with laser frequency. The phase of the modulation at a particular laser frequency can be determined accurately through phase-shifting measurements.

There are no fringes produced on the surface of object 10 in FIG. 16 because the object 10 is illuminated by only one laser beam 50. Interference occurs at the detector 22 because of the coherent superposition of light from the two beams 46 and 50. In accordance with Eqs. (1)–(5), varying the laser frequency causes the individual speckle lobes in the image of the object 10 to oscillate in intensity at a rate that is proportional to the path length difference s. For simplicity, assume that the reference surface 102 is flat and lies in the x-y plane. Let z represent the height above the virtual reference surface 102' of the point $P_0$ on object 10 to be measured. Nominally, s=2z (due to round-trip propagation) and z can be calculated from N by $$z = \frac{c}{2} \frac{N(v_n - v_0)}{v_n - v_0} \tag{71}$$

if N is obtained through fringe synthesis, and by.

$$z = \frac{c}{2} \frac{N(v_n)}{v_n} \tag{72}$$

otherwise.

The procedure for producing three-dimensional images using FIG. 16 is the same as that outlined in FIG. 15, with the exception that in step 232, Eq. (71), or Eq. (72), is used to convert N to z. The approach depicted in FIG. 16 does not rely upon triangulation. Consequently, it has the advantage that shadowing effects between source $P_1$ and $P_2$ and receiver 22 and 24 can be eliminated. This approach is particularly useful for shorter-range applications, including three-dimensional microscopy, where the separated path lengths remain small.

The above embodiments are based on interference using coherent illumination. Those embodiments that use a lens 24 to form an image of the object 10 on a detector 22 have the potential disadvantage that the resulting image is speckled and that speckle can limit range resolution. It should be noted that detectors 23 placed directly on the surface of the object do not suffer from this limitation. Speckle occurs for imaging with coherent illumination because the finite point-spread function of the lens 24 allows light scattered from regions surrounding $P_0$ on the surface of object 10 to interfere at point $P_i$ at detector 22. The average speckle size at the detector plane is determined by the size of the point-spread function of the lens. Speckle can cause a measurement of $\bar{\rho}$ to be drawn to one side or the other by scattering regions surrounding $P_0$ whose contributions can phase up constructively at the image point $P_i$.

A number of techniques are now presented for mitigating the effects of speckle on a measurement. In practice, speckle effects tend to average out if many speckles fall within the area corresponding to a single pixel of the detector array 22. One way of satisfying this condition is to require that the interference fringes are resolved by lens 24 and that the point-spread function of lens 24 is small enough to cause many speckles to fall on each element of detector array 22. This approach works well in situations that do not require the ultimate lateral resolution. Generally, lateral resolution is traded off for speckle averaging.

In situations requiring high lateral resolution, it can be necessary to more closely match speckle size and pixel size. In general it is desirable to reduce the magnitude of the side lobes of the point-spread function of the lens (i.e., to apodize). Doing so reduces the ability of a scattering region that would otherwise be contained within a strong side lobe of the point-spread function to bias the measurement of $\bar{\rho}$. Apodization can result in a slightly degraded lateral resolution. In some instances, it can be advantageous to trade off this lateral resolution for improved range resolution.

An additional technique for mitigating speckle effects is to minimize the variation of $\bar{\rho}$ over the region of the surface of object 10 corresponding to an individual pixel 22.

For example, increasing the pixel density while maintaining a constant ratio of speckles per pixel 22 decreases the change in $\bar{\rho}$ from one side of the region corresponding to the pixel 22 to the other and improves both range resolution and lateral resolution.

For a given optical configuration and pixel density, the variation of $\bar{\rho}$ over individual pixels 22 can be minimized by making an appropriate choice of the position and orientation of the source head. Variation of $\bar{\rho}$ is minimized, for example, if the surface element corresponding to a pixel 22 lies along an equiphase surface of the three-dimensional fringe pattern. In other words, speckle effects are minimized if the surface being measured is parallel (or nearly parallel) to a surface of constant phase for the illuminating fringe pattern. This condition can be achieved by using grazing incidence with the vector representing the orientation of the two source points being parallel to the surface normal. Except for specialized cases, it is impossible to satisfy this condition for every point $P_0$ on the surface. The condition can be approximated, however, for many objects of practical importance, including, for example, aerodynamic surfaces such as auto-body and airframe panels.

Many objects have a broad range of surface slopes and orientations, making it impossible to satisfy the above condition for minimizing $\bar{\rho}$ over the entire surface using a single source head. In these situations, this condition can be better satisfied through the use of multiple source heads that are positioned such that one of them is responsive to each major region of the object 10, or to those regions of greatest interest. It is assumed that some form of multiplexing takes place to distinguish which information comes from each source head. If more than one source head illuminates the same region, the resulting measurements can be weighted according to the level of speckle noise expected in each measurement for that region. Multiple source heads can also help to overcome shadowing limitations. Information from multiple source heads can be readily combined for a given detector 22 that views a region of overlap. Registration is automatic because the angular information corresponding to each pixel is the same for each source head.

In some instances, it is not possible to illuminate certain regions of an object 10 in a way that satisfies the condition for minimizing the variation of $\bar{\rho}$ over a pixel. An additional technique for mitigating speckle effects that is not affected by this limitation is based on speckle averaging. Speckle averaging can be achieved by making additional measurements with slightly different parameters (e.g., variations in the optical configurations). Alternatively, the parameters can be varied during the exposure. Averaging effectively reduces speckle effects if the set of parameters being varied changes enough to produce different statistical realizations of the speckle pattern.

In one embodiment, the mid-position $P_m$ between sources is the adjusted parameter. If the direction of displacement of $P_m$ is out of the plane of FIGS. 1 and 12, then variations of object illumination will be minimized. Variations of $P_m$ are explicitly accounted for in Eqs. (47)–(56) and (59). Reduction of speckle effects can be achieved, for example, by averaging the individual measurements of (x, y, z) coordinates for different values of $P_m$.

In another embodiment, the source separation a and the laser frequency v vary simultaneously during the exposure time such that the fringe pattern remains stationary. The condition for the fringes to remain stationary is seen by inspection of Eq (57) to be that the ratio a/λ (or the product a v) remains constant. To achieve stationary fringes, the motion of the point sources $P_1$ and $P_2$ can be slaved to the tuning of the laser 40, or vice versa, by a feedback mechanism such as a fringe monitor. The fringe monitor may consist of discrete detectors or a linear array of detectors that is incorporated into the source head and measures a fringe pattern that is separated from the main beam by a beam splitter.

For speckle averaging to be effective, the tuning excursion used is large enough to cause a number of decorrelation cycles to occur in the image speckle. Care should be taken to minimize the path-length offset $S_0$ between the separated paths in the source head. Otherwise, the phase of the fringe pattern will vary with frequency shift Δv by the expression.

$$\Delta\phi = 2\pi\frac{\Delta v S_0}{c} \tag{73}$$

Alternatively, the path-length offset can intentionally be set to a nonzero value and the fringe pattern "strobed" at 2π increments of the phase Δϕ to freeze the phase of the fringe. Different phase shifts could then be achieved by varying the strobe timing.

It will be appreciated that cycle counting, progressive fringe division, and progressive fringe division using fringe synthesis are general techniques for resolving counting ambiguities and increasing measurement precision, and that their usefulness goes far beyond the applications described above. Furthermore these techniques can be applied to generalized signals (including one-dimensional signals) and are not limited to sinusoidal variations.

It should also be appreciated that these techniques apply to general structured-light patterns formed by arbitrary means. Examples of means for producing structured light patterns are the interference or diffraction of coherent radiation, the "white-light" superposition of interference or diffraction patterns formed at different wavelengths, and the imaging of patterns onto the object with a lens using either coherent or incoherent radiation. As an example of the imaging approach, a white-light pattern produced by a digital projector can be made to expand and contract to produce accordion motion and to translate sideways to produce phase modulation. Although projecting white-light patterns onto the surface in this manner may eliminate speckle effects, this approach has certain disadvantages. With an imaged light pattern, there is a limit to how small the fringe period may be. It is also necessary to consider the depth of field of the projected pattern. It may not be possible to project a fine fringe pattern from an oblique angle that is in focus over the entire object. On the other hand, fringes produced by interference or diffraction are always "in focus" on the object surface, no matter what the distance to the observation point or the size of the fringes.

A further embodiment of the invention maintains the advantages of forming fringes by interference or diffraction and eliminates speckle effects by forming these fringes in broad-band illumination or white light. This embodiment is based on the incoherent superposition of interference-fringe intensities formed at different component wavelengths in the illumination spectrum. If these fringes have the same size and shape, the interference-fringe intensities corresponding to different wavelengths reinforce each other at every point in the pattern.

By reference to Eq. (57), fringes of the same size and shape are produced by fixing the ratio a/λ. This objective can be achieved simultaneously for each component wavelength by using a diffraction grating followed by a lens. For small diffraction angles, the angular deviation of the first-order beam diffracted by the grating is proportional to the wavelength of that beam. The lens converts this angular deviation into a displacement of the source $P_1$ or $P_2$ that is also proportional to λ, thus making it possible to maintain a constant a/λ ratio. In this embodiment, the location of source $P_1$ or $P_2$ is smeared out in wavelength. White-light phase shifting can be achieved by translating the grating sideways or through the use of a white-light phase shifter, based on, for example, the Pancharatnam phase.

There are many possible optical arrangements for implementing a source head based on these principles. In one arrangement, Bragg gratings are placed in beams 46 and 50 in FIG. 10. The gratings (not shown) and prism 92 are positioned such that the two focal spots corresponding to the undiffracted beams overlap and the first-order beams are deviated towards the base of prism 92. This arrangement causes the source separation a corresponding to the diffracted beams to be proportional to the optical wavelength λ. White-light phase shifting is achieved by translating one of the Bragg gratings laterally. Variation of fringe size is achieved by changing the period of the grating. In one embodiment, the grating period is changed electronically using a Bragg cell, or acousto-optic modulator. In this embodiment, both Bragg cells are driven at the same frequency and phase shifting is accomplished by shifting the phase of one drive signal with respect to the other. (The fringes are stationary because each beam suffers the same Doppler shift.) In another embodiment, Bragg gratings of different periods are moved into place sequentially. In yet another embodiment, a single diffractive element is placed in beam 44. A separate white-light phase shifter (not shown) is placed in one of the beams 46 or 50. In some embodiments of a white-light phase shifter known to those skilled in the art, beam splitter 48 is a polarizing beam splitter.

Figure 17:
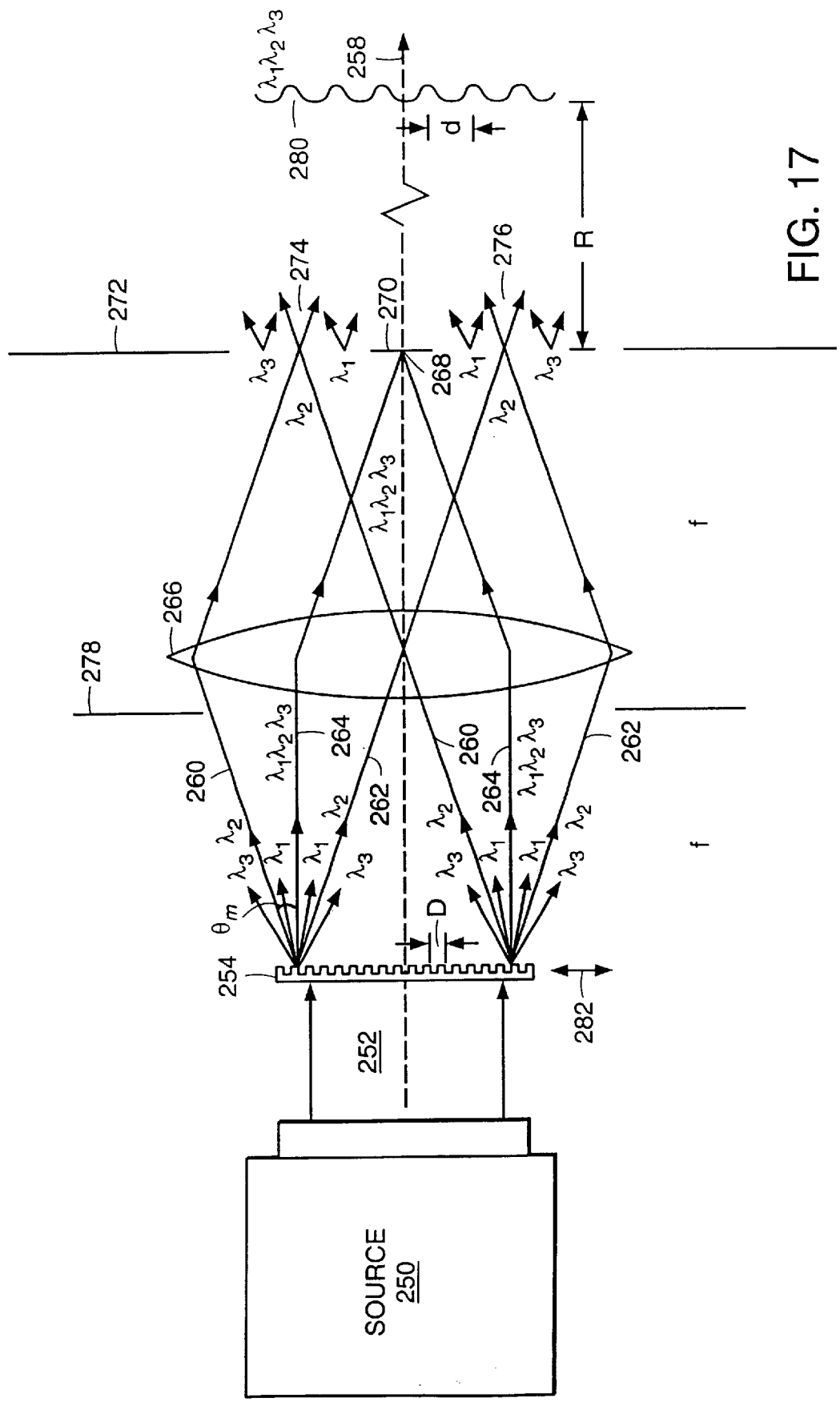
FIG. 17 illustrates an embodiment of a broadband interference-fringe projector of the present invention.

Referring now to FIG. 17, therein is shown an embodiment of a broadband or white-light interference fringe projector. Source 250 generates a substantially collimated beam of radiation 252 that is directed to diffraction grating 254 at substantially normal incidence. Diffraction grating 254 has grating period D. Input beam 252 is represented by three constituent wavelength components $\lambda_1$, $\lambda_2$, and $\lambda_3$ for illustration. Beam 252, in actuality, can have arbitrary spectral composition. Diffraction grating 254 splits beam 252 into multiple diffracted beams whose diffraction orders can be represented by the integer m. For illustration purposes, only rays along the perimeter of beam 252 are shown. These diffracted beams propagate at angles $\theta_m$ with respect to the optical axis 258 according to the grating equation for normal incidence, which is given by:

$$\sin\theta_m = \frac{m}{\lambda D} \quad (74)$$

In one embodiment, diffraction grating 254 is designed to maximize and equalize the diffracted efficiency for the diffraction order m=+1 diffracted beam 260 and the diffraction order m=−1 diffracted beam 262. In other embodiments, diffraction grating 254 is designed to maximize and equalize the diffracted efficiency for any set of positive and negative beams of equal order |m|, and to minimize the energy diffracted into all other orders. Any residual undiffracted (m=0) beam 264, will pass undeviated through diffraction grating 254 and is focused by lens 266 onto focal spot 268.

The spectral components $\lambda_1$, $\lambda_2$, and $\lambda_3$ of focal spot 268 substantially overlap. Focal spot 268, in one embodiment, may be substantially blocked by the central obstruction 270 of optional double slit 272. The different spectral components $\lambda_1$, $\lambda_2$, and $\lambda_3$ of diffracted beams 260 and 262 are focused by lens 266 onto spectral regions 274 and 276. The distance a(λ) between the focal spot within spectral region 274 and the focal spot within spectral region 276 corresponding to a given wavelength λ is substantially proportional to the wavelength λ. Aperture stop 278 of lens 266, in one embodiment, can be used to block undesired higher-order diffracted beams. Any undesired residual diffracted orders that pass through lens 266 can be blocked, in another embodiment, by the opaque regions of optional double slit 272. Radiation from the two spectral regions 274 and 276 expands and overlaps as it propagates and forms a broadband interference-fringe pattern 280. Fringe pattern 280 has representative fringe period d at representative distance R from double slit 272.

Prior equations such as Eq. (57) which are based on a specific source separation a and a specific wavelength λ, can be applied to first order to the broadband interference fringe projector illustrated in FIG. 17 by making the substitution $$\frac{a}{\lambda} = \frac{2f}{D} \quad (75)$$

where f is the focal length of lens 266 and D is the period of diffraction grating 254.

It should be noted that the fringe-generation scheme depicted in FIG. 17 can also produce fringes using narrowband or laser illumination. One advantage of using diffraction grating 254 followed by lens 266 for narrow-band illumination is that fringe period d is insensitive to wavelength so that frequency drifts of the source do not substantially degrade measurements. For example, although laser diodes are relatively inexpensive and readily available sources, they have a temperature-dependent operating wavelength. However, since this technique is insensitive to temperature-dependent wavelength shifts, laser diodes can be used without measurement degradation.

In one embodiment, diffraction grating 254 is a thin phase grating having a square-wave phase profile whose relative phase delay alternates between 0° and 180° for a representative wavelength, $\lambda_2$, with a 50% duty cycle. Grating 254 is relatively efficient, diffracting approximately 40.5% of the available energy into each of the m=−1 and m=+1 diffracted orders, and nominally 0% into the m=0 and other even diffracted orders. The relative phase delay of grating 254 is a function of wavelength, causing the energy in the undiffracted beam 264 at order m=0 to increase for wavelengths that differ from the representative wavelength $\lambda_2$. In one embodiment, grating 254 is made relatively thin which reduces the wavelength dependence of the grating so that it performs well over a wide frequency spectrum.

Phase shifting the resulting broadband (or narrow-brand) interference-fringe pattern 280 is achieved by simply translating diffraction grating 254 in the direction 282 shown in FIG. 17. White-light or broadband phase shifting is realized because a translation of diffraction grating 254 by a given fraction of the grating period D shifts each spectral component of fringe pattern 280 by the same fraction of the fringe period d. For example, a translation of grating 252 by D/4, or one-quarter cycle, also shifts the interference-fringe pattern 280 by one-quarter cycle, or 90°.

Accordion motion (or variation of fringe size) of interference-fringe pattern 280 can be achieved in a number of ways. In one embodiment, for small diffracted angles $\theta_m$, doubling the period D of grating 254 halves the magnitude of $\theta_m$ of beams 260 and 262 (this is a small-angle approximation of Eq. (74)), which in turn doubles the period d of fringe pattern 280. In another embodiment, decreasing the focal length of lens 266 can increase the period d of fringe pattern 280. The period d of fringe pattern 280 is related to the period D of diffraction grating 254, the focal length f of lens 266, and the propagation distance R to first order by $$d = \frac{RD}{2f} \quad (76)$$

In order to produce a continuous variation in d of fringe pattern 280 or to produce an arbitrary set of d values lying along a continuum, it is necessary to be able to continuously vary one or more of the parameters in Eq. (76). In one embodiment, lens 266 may be a zoom lens with variable focal length f. In another embodiment, the period D of grating 254 may be varied by stretching the grating with an applied force. In yet another embodiment, the period D of grating 254 may be varied electronically through, as an example, the variable grating mode (VGM) effect in liquid crystal devices. In yet another embodiment, the period of grating 254 may vary along the axis orthogonal to the grating lines so that sliding grating 254 sideways in the direction perpendicular to 282 can control the period D of grating 254. By using fringe synthesis, previously described, it is possible to achieve large variations in effective period d with small variations in f, D, or R. For example, fringe-synthesis Eqs. (64) and (67) can be modified as follows:

$$N_{wrapped}\left(\frac{f_2}{D_2} - \frac{f_1}{D_1}\right) = \left[N_{wrapped}\left(\frac{f_2}{D_2}\right) - N_{wrapped}\left(\frac{f_1}{D_1}\right)\right]_{wrapped} \quad (77)$$

where $N_{wrapped}$ is now a function of the ratio f/D.

It is typically adequate to have a predetermined discrete set of values for f and/or D and to resolve fringe-number ambiguities through progressive fringe division as previously discussed. In one embodiment, progressive fringe division is accomplished by sequentially moving a discrete set of diffraction gratings 254 or lenses 266 into respective positions in FIG. 17. In alternative embodiments, grating 254 or lens 266 is switchable and assumes discrete values of D and f Some examples of switchable gratings include liquid-crystal spatial light modulators, patterned alignment liquid-crystal spatial light modulators, electrically switchable diffractive optical elements, cascaded electrically switchable diffractive optical elements, and microelectromechanical systems (MEMS).

Figure 18:
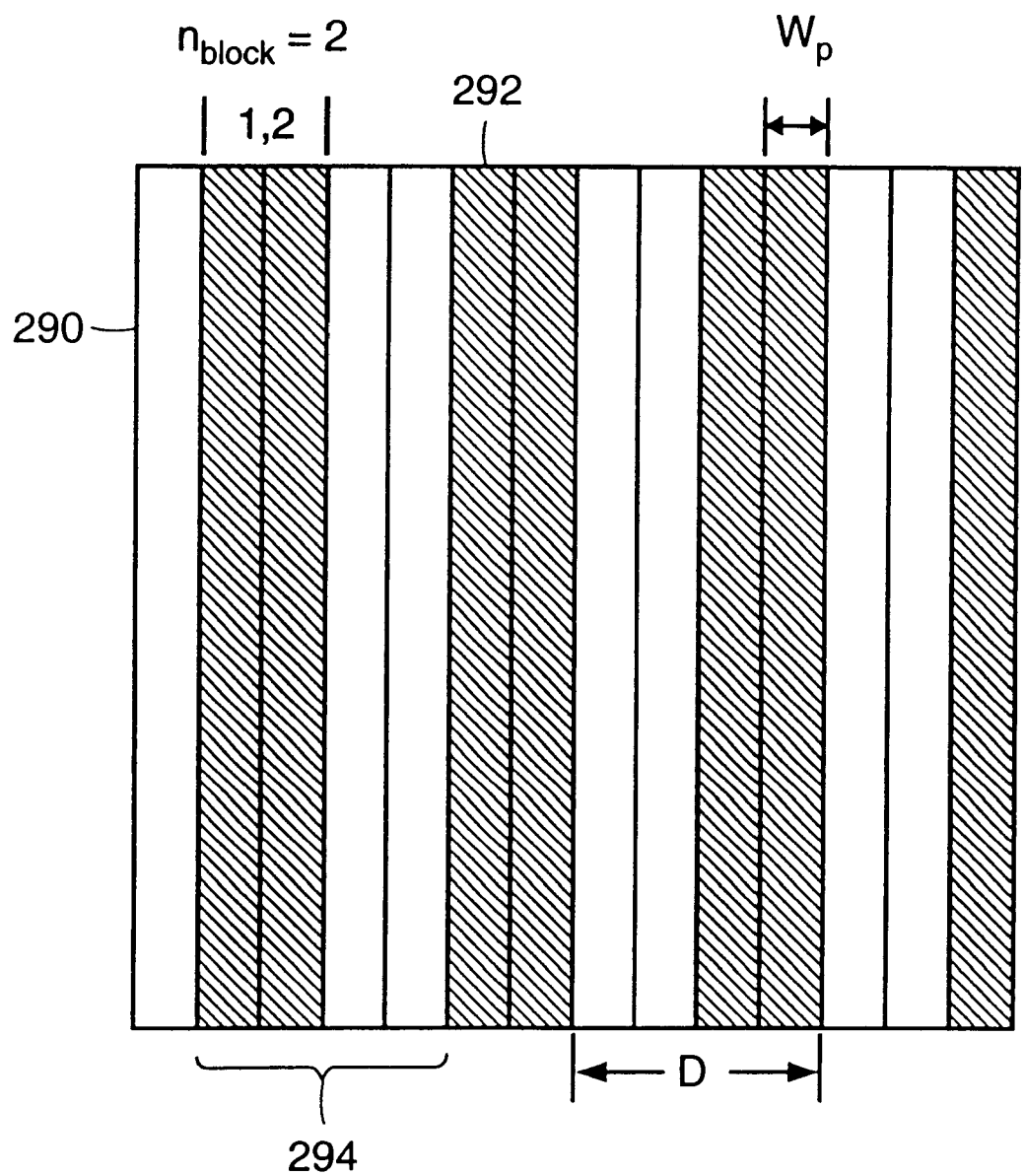
FIG. 18 illustrates one embodiment of a liquid-crystal spatial light modulator for use with an embodiment of the invention.

In one embodiment, illustrated in FIG. 18, diffraction grating 254 is a liquid-crystal spatial light modulator 290 consisting of a linear array of long parallel phase retarders 292, or pixels, whose phase retardance can be controlled to produce a cyclical phase-retardance pattern 294. In this manner, a thin phase grating can be produced and actuated electrically. For example, it is possible to produce a square-wave phase profile whose nominal relative phase delay alternates between 0° and 180° with a 50% duty cycle. The period D and offset 282 of the resulting diffraction grating 254 are variable in discrete steps with high repeatability. Thus, both the fringe spacing d and the phase shift of the resulting fringe pattern 280 is controllable electrically in discrete repeatable steps at high speeds.

In FIG. 18, $w_p$ is the width of pixel 292, and $n_{block}$ is the number of pixels 292 that are repeated at the same phase retardance level to produce one half of a 50%-duty-cycle thin phase grating. As an example, $n_{block}=2$ in FIG. 18. The grating period D is given by $$D = 2n_{block}w_p \quad (78)$$

and can be varied by changing the value of $n_{block}$. The smallest phase shift $\Delta\phi$ of diffraction grating 254, and hence of interference-fringe pattern 280, that can be produced for a given value of $n_{block}$ is $$\Delta\phi = \frac{180°}{n_{block}} \quad (79)$$

Thus, for example, phase shifts of ±90°, ±180°, and ±270° can be produced for an $n_{block}$ value of 2 and phase shifts of ±60°, ±120°, ±180°, ±240°, and ±300° for an $n_{block}$ value of 3. A generalized from of Eq. (6) that is valid for three arbitrary phase shifts $\phi_1$, $\phi_2$, and $\phi_3$ can be expressed as:

$$\phi = \tan^{-1}\frac{I_1(\cos\phi_2 - \cos\phi_3) + I_2(\cos\phi_3 - \cos\phi_1) + I_3(\cos\phi_1 - \cos\phi_2)}{I_1(\sin\phi_3 - \sin\phi_2) + I_2(\sin\phi_1 - \sin\phi_3) + I_3(\sin\phi_2 - \sin\phi_1)} \quad (80)$$

where $I_1$, $I_2$, and $I_3$ are signal intensities corresponding to phase shifts $\phi_1$, $\phi_2$, and $\phi_3$. Thus the phase shift values can be selected differently for each value of $n_{block}$ according to the availability of phase-shift values.

Fringe synthesis is an effective means of obtaining additional values of D beyond those achievable by varying the integer $n_{block}$ in Eq. (78). The available values of the effective grating period $D_{eff}$ that can be synthesized from two measurements with different values of $n_{block}$ are given by $$D_{eff} = \frac{w_p}{\frac{1}{n_{block1}} - \frac{1}{n_{block2}}} \quad (81)$$

where $n_{block1} < n_{block2}$. Large values of $D_{eff}$ can be obtained using Eq. (81) by making $n_{block1}$ and $n_{block2}$ successive integers. As an illustration of a possible measurement strategy, assume that the pixel width $w_p$ is 10 μm and that a sequence of three measurements is taking with $n_{block0}=2$, $n_{block1}=19$, and $n_{block2}=20$. This sequence can be used to produce a first grating period D of 40 μm using $n_{block}=2$ in Eq. (78) and a second grating period of 400 μm using $n_{block}=20$ in Eq. (78). A third, and much larger grating period, of 4.2 mm can be synthesized by using $n_{block1}=19$, and $n_{block2}=20$ in Eq. (81). The ratio between successive grating periods in this sequence is approximately ten, which is a reasonable sequence for progressive fringe division.

Figure 19:
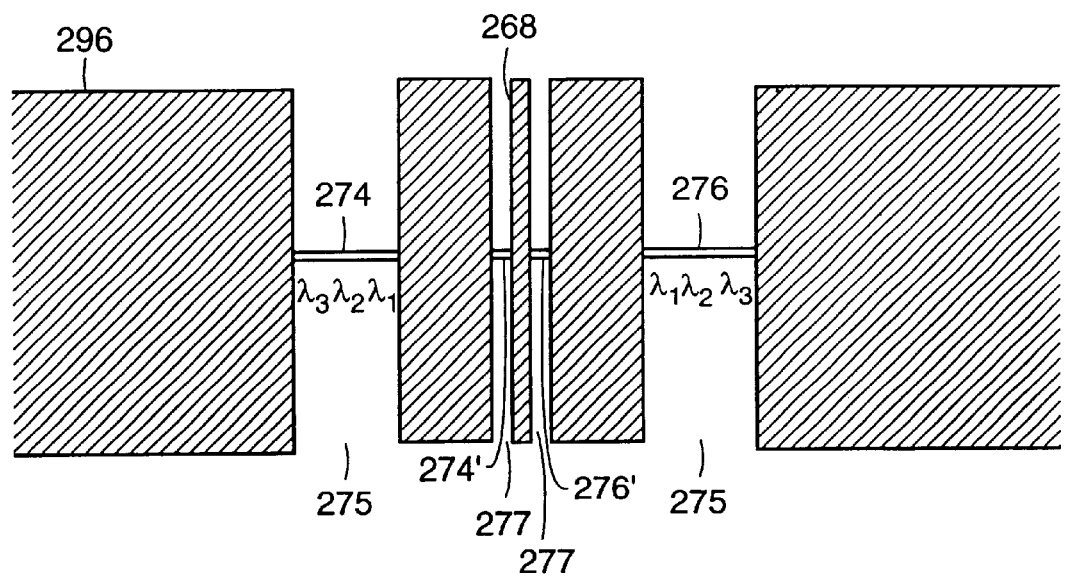
FIG. 19 illustrates one embodiment of two nested double slits for use with an embodiment of the invention.

Referring back to FIG. 17, wide variations of $n_{block}$ produce corresponding wide variations in the spread and location of spectral regions 274 and 276. In one embodiment, a more sophisticated version of double slit 272, such as beam block 296 shown in FIG. 19, may then be used to eliminate unwanted residual diffracted orders. Beam block 296 comprises two nested double slits and includes central obstruction 268. The outer double slit 275 passes spectral regions 274 and 276 for the smallest value $n_{block0}$ used in the measurement sequence in the above example, while the inner double slit 277 passes the desired spectral regions 274' and 276' for the larger values $n_{block1}$ and $n_{block2}$.

Figure 20:
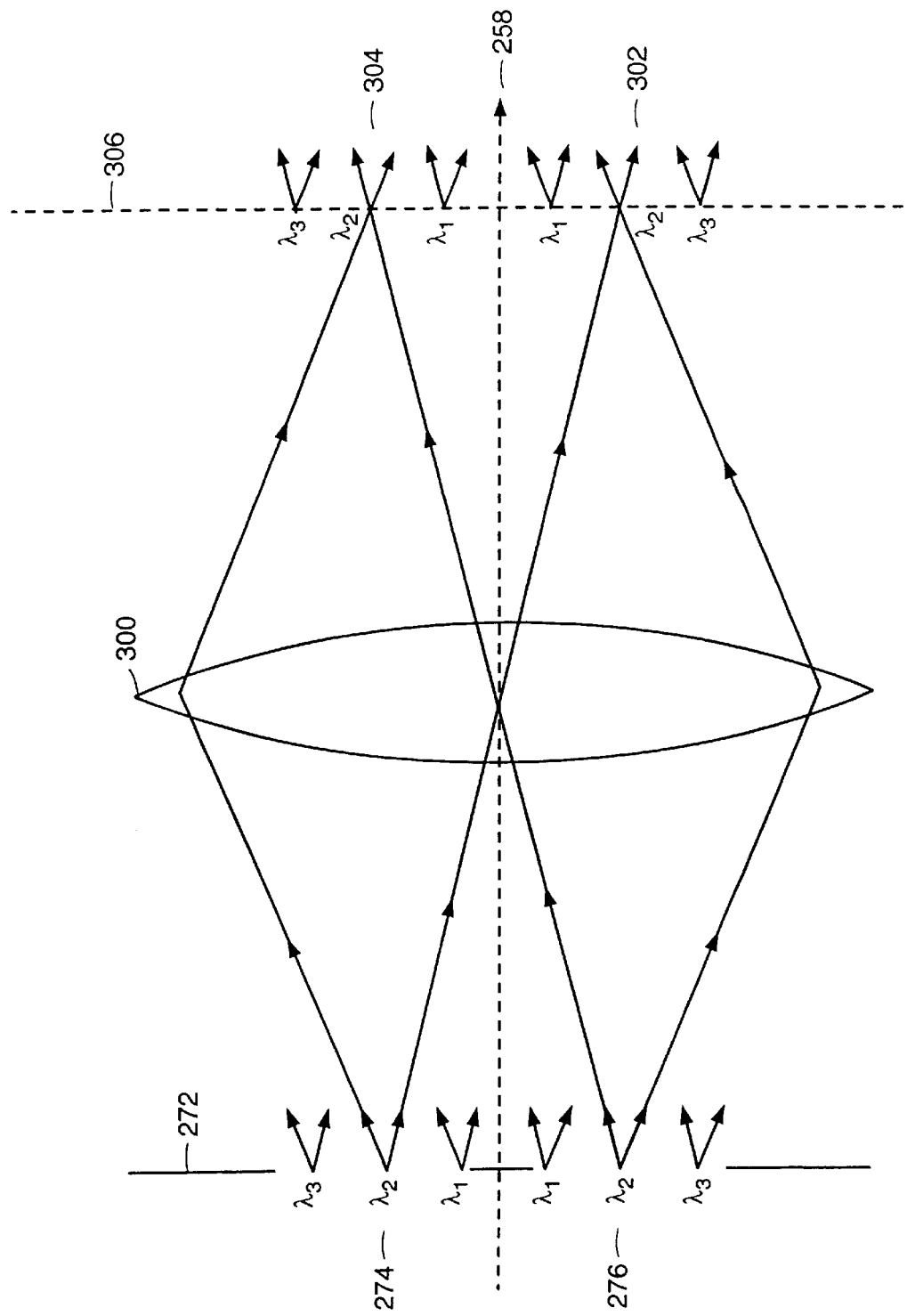
FIG. 20 illustrates an embodiment of the invention for generating accordion fringe motion.

In yet another embodiment illustrated in FIG. 20, accordion motion is achieved by placing lens 300 on optical axis 258 such that images 302 and 304 of spectral regions 274 and 276 are formed at image plane 306. Note that in another embodiment, images 302 and 304 may be virtual images (not shown), if the focal length of lens 300 is negative. Accordion motion results in one embodiment, by varying the magnification of images 302 and 304 by moving lens 300 along optical axis 258. Or, in another embodiment, accordion motion results by changing the focal length of lens 300.

In yet another embodiment, lens 300 is a zoom lens, which varies the focal length without changing the location of image plane 306. In still an alternative embodiment, a discrete set of lenses of different focal lengths can be placed in suitable positions sequentially. The use of lens 300 produces accordion motion without changing any of the components within FIG. 17, including double slit 272.

Figure 21:
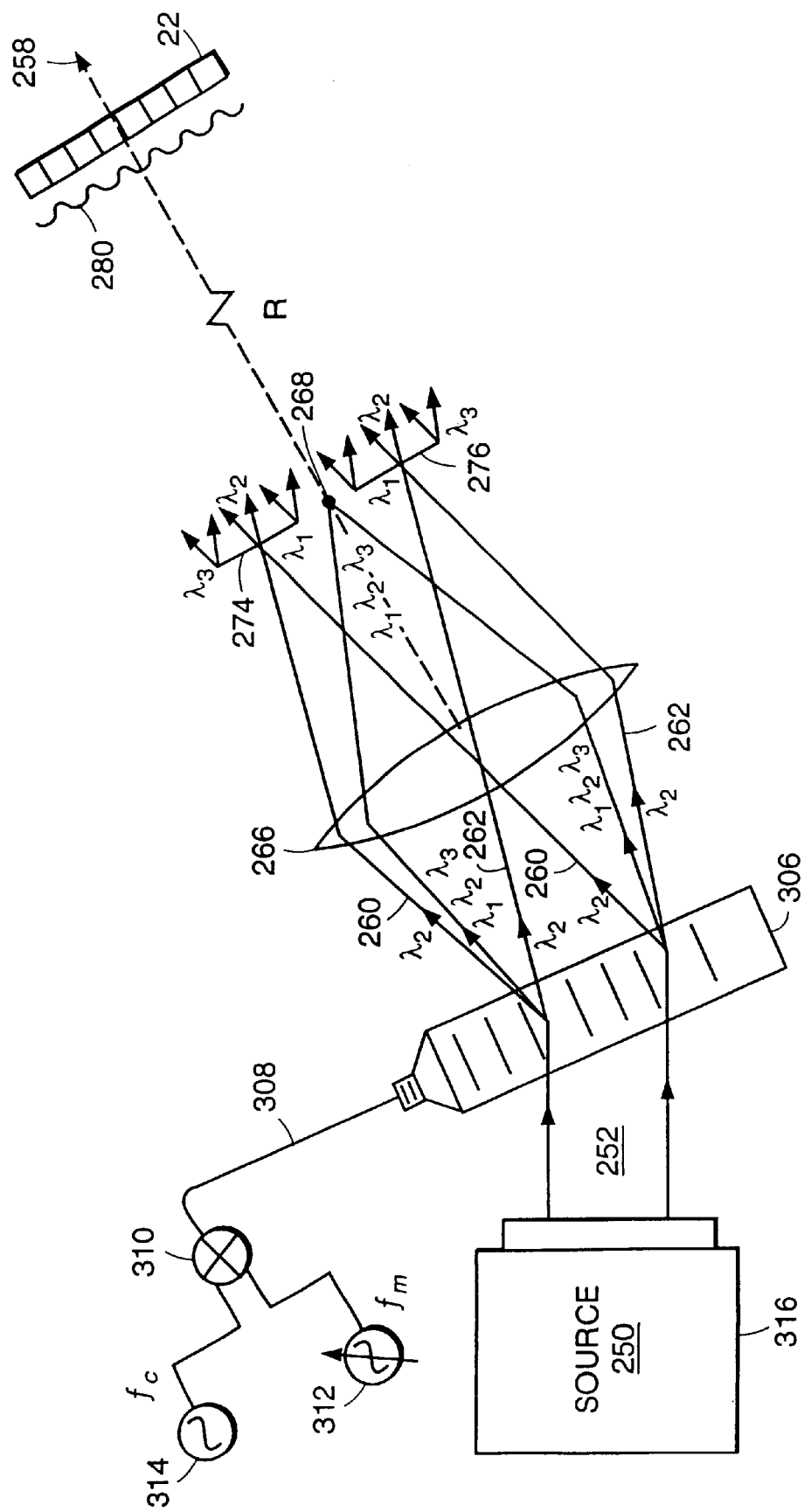
FIG. 21 illustrates an embodiment of a broadband interference-fringe projector of the present invention.

Yet another embodiment of a broadband interference-fringe projector is shown in FIG. 21. This embodiment includes broadband source 250, an acousto-optic modulator (AOM) 306, and a lens 266. AOM 306 is driven with a compound signal 308 generated by multiplier 310 which multiplies a sinusoid 312 having a variable frequency $f_m$ by a sinusoid 314 having a fixed frequency $f_c$. Compound signal 308 produces two traveling acoustic waves of different periods in AOM 306 that in turn generate two angularly separated beams 260 and 262. The different spectral components of diffracted beams 260 and 262 are focused by lens 266 into spectral regions 274 and 276, where the separation $a(\lambda)$ between the focal spot within spectral region 274 and the focal spot within spectral region 276 corresponding to a given wavelength $\lambda$ is substantially proportional to the wavelength $\lambda$. In addition, the midpoint between like spectral components of spectral regions 274 and 276 is substantially localized at position 268 for each spectral component. By adjusting $f_m$ the separation $a(\lambda)$ for each wavelength component $\lambda$ is adjusted about point of symmetry 268 from zero separation to the maximum separation permitted by the bandwidth of AOM 306. Radiation from the two spectral regions 274 and 276 expands and overlaps as it propagates to form a broadband interference-fringe pattern 280 of representative period d at representative distance R. Varying $f_m$ causes fringe pattern 280 to expand or to contract.

Since the pressure variations across AOM 306 are traveling, beams 274 and 276 are Doppler shifted with respect to one another. This causes fringe pattern 280 to travel across the region of overlap at a speed proportional to the difference frequency between the two frequency components of compound signal 308. Interference pattern 280 can be effectively frozen at a particular spatial phase by amplitude modulating source 250 at the difference frequency $2f_m$ of the two beams 260 and 262. The spatial phase of the fringes 280 can be precisely controlled by changing the phase (e.g. changing the delay) of the laser drive signal 316 with respect to the AOM control signal 308. Alternatively, drive signal 316 can be used to control an external amplitude modulator placed in the optical path (not shown) or to modulate the sensitivity of detector 22 used to observe the fringe pattern.

In the above embodiments of a broadband interference-fringe projector, beam 252 is substantially collimated so that diffractive element 254 (FIG. 17) or 306 (FIG. 21) diffracts each spectral component of a given diffraction order m into the same diffracted angle $\theta_m$. Other variations of this configuration are also possible, and remain within the spirit and scope of this invention. For example, in alternate embodiments, beam 252 may be either diverging or converging. In yet another embodiment, beam 252 may enter diffractive element 254 at oblique incidence. In still another embodiment, the order of the refractive and diffractive elements may be reversed.

Many alternative light sources 250 may be used, depending on the degree of temporal and spatial coherence desired. Low temporal coherence (broad spectral content) reduces or eliminates speckle effects. Whereas, high spatial coherence allows for tighter focal spots to be formed for each spectral component in spectral regions 274 and 276. Generally, tight focal spots improve the visibility of fringes and increase the depth of field of fringe pattern 280. Note that the depth of field is infinite for spatially coherent sources. Additionally, tight focal spots also make it easier to separate spectral regions corresponding to different diffracted orders m so that undesired spectral regions can be blocked with representative masks 272 or 296.

One method of achieving high spatial coherence is to make light source 250 laser based. In one embodiment, source 250 is a laser diode with collimating optics. Laser diodes with spectral widths of approximately 3 nm are commonly available. In another embodiment, the spectral width can be broadened by coupling together an array of laser diodes operating at different wavelengths into a single beam. In still another embodiment, a rapidly scanning tunable laser can be used. Another approach to broadening the spectrum of a laser is to pump a standard single-mode silica fiber with a passively Q-switched microchip laser. A variety of nonlinear effects in the fiber produce an extremely broadband spectrum at the output end of the fiber. In yet another approach, broadband illumination is achieved with a modelocked titanium:sapphire laser.

There are many other approaches for generating beam 252 that rely on more conventional sources. Lower (but adequate) spatial coherence can be achieved, for example, by coupling an arc lamp into an optical fiber. The output end of the fiber acts like an extended source. If the output of the fiber is collimated using a lens, the longer the focal length of the lens, the smaller the variation in the angle of propagation in beam 252 and the tighter the focal spots that can be formed within spectral regions 274 and 276. When using an extended source, spatial incoherence effects are minimized by placing lens 266 at a distance along optical axis 258 such that the surface of diffraction grating 254 or the active area of AOM 306 would be imaged onto a plane on or near the surface of object 10 being illuminated. This configuration minimizes spatial incoherence effects because the rays that reach a given area of fringe pattern 280 to interfere all originate from the same region of the diffractive element where the input beam is split into different diffracted orders.

The above embodiments for projecting fringe patterns (whether based on narrow-band or broad-band illumination) vary in the accuracy and repeatability to which the phase shifts $\phi_1$, $\phi_2$, and $\phi_3$ can be set. For instance, phase shifting by moving an optical component such as mirror 94 or 96 in FIG. 10 or grating 254 in FIG. 17 with a piezoelectric transducer suffers from inconsistencies due to hysteresis. Variations of these phase shifts from their assumed values cause errors in the calculation of $\phi$ in Eq. (6) or Eq. (80). These errors in $\phi$ are periodic in nature and produce a rippled appearance in the reconstructed surface profile. Likewise, a rippled appearance is caused by imperfections in the illumination sequence. These imperfections may be caused, for example, by changes in the exposure level or bias level during acquisition of signal intensities $I_1$, $I_2$, and $I_3$. Exposure-level variations may occur, for instance, from fluctuations in source intensity or from differences in exposure time due to shutter imperfections.

The ripple pattern occurs on the reconstructed surface with the same orientation as the projected fringe pattern on the physical surface 10. The dominant period of the ripple pattern depends on the error source. Phase-shift errors, for example, produce two ripple oscillations per fringe period. Ripple can be the dominant error source in a surface profile measurement, particularly if speckle has been eliminated through broad-band illumination, or if speckle effects from narrow-band illumination have been suppressed through one of the mitigation techniques described above.

A versatile and robust technique, referred to as histogram-based derippling, is now introduced that corrects for ripple error. In this technique, the data is analyzed to determine actual phase offsets and exposure-level variations so that $\phi$ can be calculated using corrected values. In order to elucidate this technique, Eq. (80) is first rewritten in a form where assumed values, as well as quantities calculated from assumed values, are differentiated from actual values:

$$\hat{\phi} = \tan^{-1}\frac{I_1(\cos\hat{\phi}_2 - \cos\hat{\phi}_3) + I_2(\cos\hat{\phi}_3 - \cos\hat{\phi}_1) + I_3(\cos\hat{\phi}_1 - \cos\hat{\phi}_2)}{I_1(\sin\hat{\phi}_3 - \sin\hat{\phi}_2) + I_2(\sin\hat{\phi}_1 - \sin\hat{\phi}_3) + I_3(\sin\hat{\phi}_2 - \sin\hat{\phi}_1)}. \quad (82)$$

In Eq. (82), $\hat{\phi}_1$, $\hat{\phi}_2$, and $\hat{\phi}_3$ are the assumed phase-shift values and $\hat{\phi}$ is the calculated phase using these assumed values.

Variations due to imperfections of the illumination sequence may be incorporated into Eq. (82) by writing the intensity in the form $$I_i = B_i + A_i \frac{1 + \cos(\phi - \phi_i)}{2}, \quad (83)$$

where the subscript i takes one of the values 1, 2, or 3, and represents a particular member of the illumination sequence. The parameters $A_i$ and $B_i$ allow for variations in the exposure level and bias level of the illumination sequence, respectively. Without loss of generality, the nominal peak-to-valley amplitude swing in Eq. (83) can be assumed to be unit valued.

If the values of $A_i$ and $B_i$ are known, or are estimated as $\hat{A}_i$ and $\hat{B}_i$, imperfections in the illumination sequence can be corrected by using the calculated intensity $$\hat{I}_i = \frac{I_i - \hat{B}_i}{\hat{A}_i} \quad (84)$$

to replace the measured intensity $I_i$ in Eq. (82). In addition, phase-step errors can be eliminated if the actual values $\phi_1$, $\phi_2$, and $\phi_3$ can be determined and used in Eq. (82) rather than the assumed values $\hat{\phi}_1$, $\hat{\phi}_2$, and $\hat{\phi}_3$. One approach to minimizing ripple is to vary the parameters $A_i$, $B_i$ and $\phi_i$ such that a metric indicating the degree of ripple in $\hat{\phi}$ is minimized. Besides being computationally intensive to implement and requiring a multi-dimensional search algorithm to minimize the metric, it is difficult to find a suitable metric for minimization without first unwrapping the phase function $\hat{\phi}$ over a representative subset of the surface. One example of a metric that could be used, once unwrapping has taken place, is the standard deviation of the difference between $\hat{\phi}$ and a smoothed representation of $\hat{\phi}$. This metric tends to decrease as the contributions due to ripple decrease.

Figure 22:
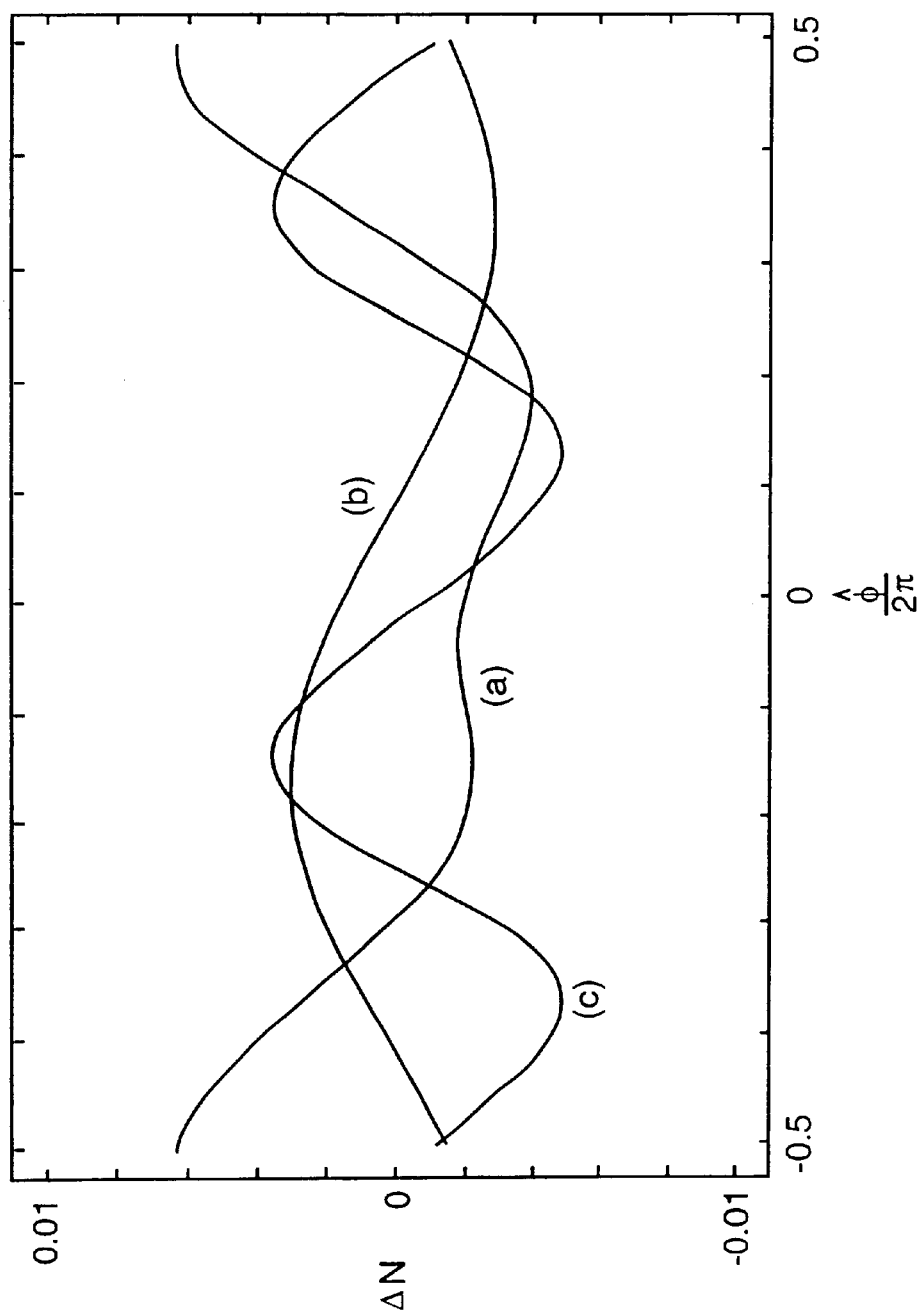
FIG. 22 contains graphical representation of fringe number error $\Delta N$ as a function of $\phi/(2\pi)$ for an embodiment of the invention known as histogram-based derippling.
Figure 22A:
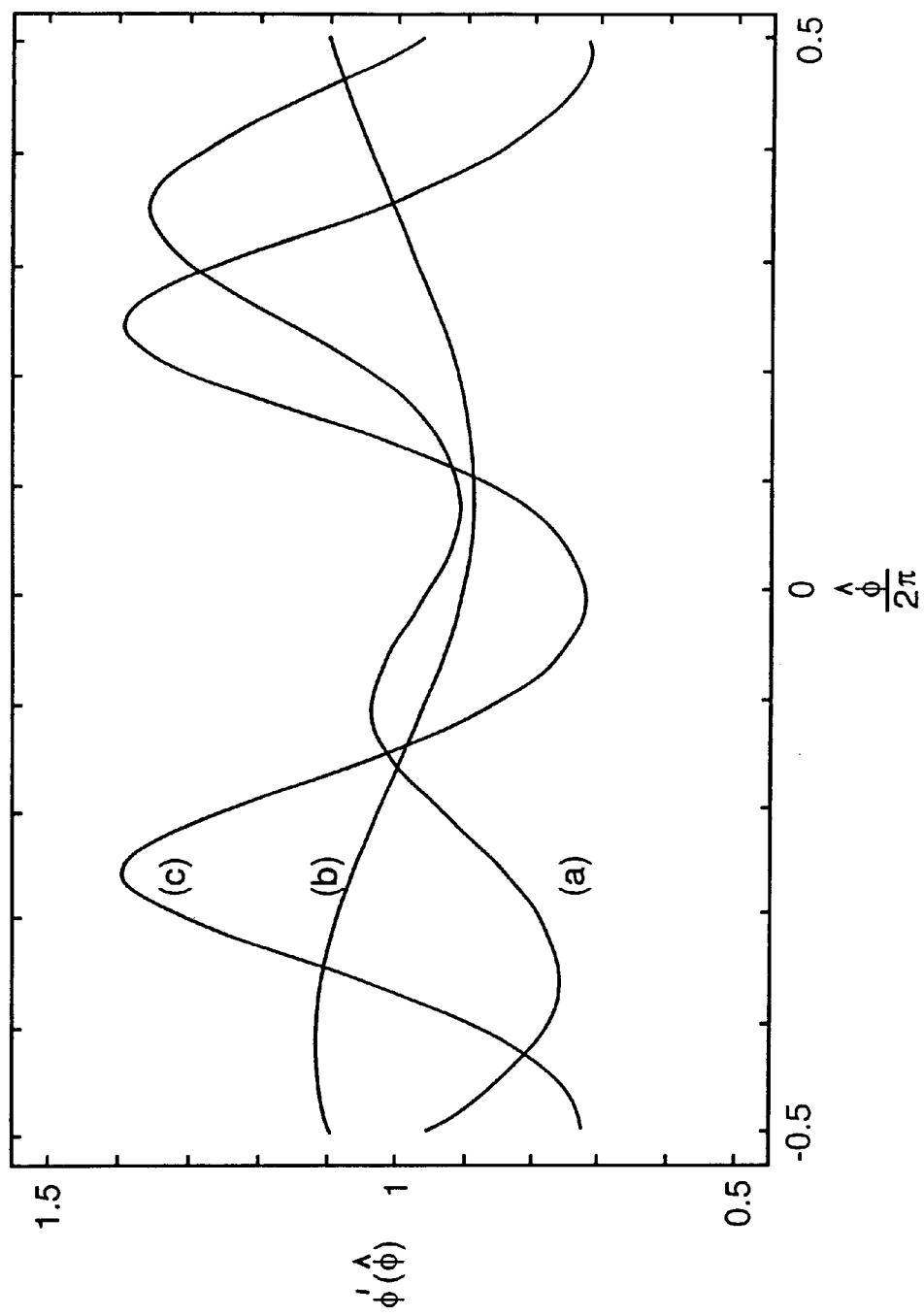
FIG. 22a is a graph of the slopes +1 of the curves shown in FIG. 22.

Histogram-based derippling is superior to the above derippling approach because it does not require phase unwrapping and produces corrected parameters directly. Reference is now made to FIG. 22 for a continued introduction to this technique. FIG. 22 contains plots of the error $(\phi-\hat{\phi})/(2\pi)$ as a function of the calculated quantity $\hat{\phi}/(2\pi)$ for different values of the parameters $A_i$, $B_i$, and $\phi_i$. This error is equivalent to the ripple-induced component of the fringe-number error $\Delta N$ and limits range resolution as described in Eq. (32). In these curves, the assumed phase-step values are $\hat{\phi}_1=-120°$, $\hat{\phi}_2=0°$, and $\hat{\phi}_3=120°$. Both $\phi$ and $\hat{\phi}$ are considered to be wrapped quantities that range between $-\pi$ and $+\pi$ so that $\phi/(2\pi)$ and $\hat{\phi}/(2\pi)$ range between $-\frac{1}{2}$ and $+\frac{1}{2}$. Curve (a) shows the effects of amplitude variations $A_1=0.9$, $A_2=1$, $A_3=1.2$, Curve (b) corresponds to bias variations $B_1=0.2$, $B_2=0$, $B_3=0.1$, and Curve (c) displays the effects of having actual phase shifts $\phi_1=-105°$, $\phi_2=0°$, and $\phi_3=100°$ that differ from the assumed values. Finally, FIG. 22a is a plot of the slope of the curves in FIG. 22, given by the derivative of $\phi$ with respect to $\hat{\phi}$ and denoted as $\phi'(\hat{\phi})$. This slope oscillates about unity and converges to unity at all points as the assumed parameters approach their true values. Note that relatively large slope variations are produced for relatively small errors in $\Delta N$, making slope a sensitive indicator of error in the assumed values of $A_i$, $B_i$, and $\phi_i$.

Clearly, FIG. 22 and FIG. 22a contain a great deal of information about $A_i$, $B_i$, and $\phi_i$. For example, these plots illustrate that bias variations introduce one ripple per fringe and that phase-step errors introduce two ripples per fringe. Amplitude variations produce a mixture of one and two ripples per fringe. If it were possible to produce the curves graphed in FIG. 22 or FIG. 22a from analysis of the data, the dependence of the governing equations for these curves on $A_i$, $B_i$ and $\phi_i$ could be used to recover information about these parameters. Then the data could be derippled by calculating $\phi$ using these corrected parameters. The difficulty with this approach is that these graphs presuppose knowledge of the true values of $\phi$.

The histogram approach overcomes this difficulty. In this approach, a histogram is first made representing the relative occurrence of each value of $\hat{\phi}$ in the measurement (or some subset of the measurement). The histogram is created by dividing the range of possible values of $\hat{\phi}$ into a finite number of bins and counting the number of occurrences of $\hat{\phi}$ that fall within each bin. The histogram of $\hat{\phi}$ provides a numerical approximation to the probability density function of $\hat{\phi}$, written as $P(\hat{\phi})$. The two probability density functions $P(\phi)$ and $P(\hat{\phi})$ can be related through the well-known relation $$P(\hat{\phi})=P(\phi)|\phi'(\hat{\phi})|, \quad (85)$$

which assumes that $\phi$ is a single-valued function of $\hat{\phi}$. The derivative in Eq. (85) is what is graphed in FIG. 22a. The probability distribution function $P(\hat{\phi})$ is available from the data through calculation of the histogram of $\hat{\phi}$. Although $P(\phi)$ in Eq. (85) is unknown, it is reasonable to assume for most cases of interest that $\phi$ is uniformly distributed over its range of potential values. This assumption becomes more precise as the number of fringes covering the sampled surface area increases. In practice, the assumption that $P(\phi)$ is uniformly distributed has proven to be adequate for even a relatively small number of fringes. Other forms of $P(\phi)$, however, can be used for histogram-based derippling where the functional form of $P(\phi)$ is refined based on additional information about the surface.

Given $P(\phi)$ Eq. (85) can be used to relate the quantity $P(\hat{\phi})$ (obtained through calculating a histogram of the measured values $\hat{\phi}$) to the absolute value of the derivative $\phi'(\hat{\phi})$ Actual values of $A_i$, $B_i$ and $\phi_i$ can then be determined based on the functional form of this derivative. To illustrate how this may be done, the functional form of $\phi'(\hat{\phi})$ is now analyzed in greater detail.

First, consider the case where there are no amplitude or bias variations ($A_i=1$ and $B_i=0$), but only phase step errors. For this case, it can be shown that $\phi'(\hat{\phi})$ takes the functional form $$\phi'(\hat{\phi}) = \frac{K}{1 + K_{c2}\cos(2\hat{\phi}) + K_{s2}\sin(2\hat{\phi})}, \quad (86)$$

where $K$, $K_{c2}$, and $K_{s2}$ are constants whose values depend on the assumed phase-step values $\hat{\phi}_i$, and the actual phase-step values $\phi_i$. The value of $K$ (which is close to unity) can be determined from the other two constants $K_{C2}$ and $K_{S2}$, leaving only two degrees of freedom in Eq. (86). The constants $K_{C2}$ and $K_{S2}$ may be obtained from the shape of the histogram of $\hat{\phi}$ by, for example, taking the reciprocal of this histogram and calculating the Fourier coefficients that correspond to the $\cos(2\hat{\phi})$ and $\sin(2\hat{\phi})$ terms of a Fourier series expansion. The Fourier coefficients for the $\cos(2\hat{\phi})$ and $\sin(2\hat{\phi})$ terms are then normalized by the DC term of the Fourier series to yield $K_{C2}$ and $K_{S2}$, respectively.

Because Eq. (86) only has two degrees of freedom, it is not possible to fully recover the values of the three phase shifts $\phi_1$, $\phi_2$, and $\phi_3$ from this equation. Instead, what can be recovered are the relative phase shifts $\phi_1-\phi_2$, $\phi_2-\phi_3$, and $\phi_3-\phi_1$, two of which determine the third. Knowledge of these relative phase shifts is sufficient to completely eliminate ripple. There is, however, a small offset error in the improved calculation of $\hat{\phi}$ that remains. This offset error is due to lack of knowledge of the true value of $\hat{\phi}_2$.

For simplicity, let the assumed phase shifts be equal, of magnitude $\hat{\phi}_{step}$, and centered about zero. These phase shifts can then be expressed as $\hat{\phi}_1=-\hat{\phi}_{step}$, $\hat{\phi}_2=0$, and $\hat{\phi}_3=\hat{\phi}_{step}$. Also assume that $\phi_2=0$ by default. The values of $\phi_1$ and $\phi_3$ can then be determined from $K_{C2}$ and $K_{S2}$ by the relations $$\phi_1 = -\cos^{-1}\left(\frac{K_{c2} + K_{c2}^2 + K_{s2}^2 + (1 + K_{c2} - K_{s2}^2)\cos\phi_{step} + (1 + K_{c2})K_{s2}\sin\phi_{step}}{(1 + K_{c2})(1 + K_{c2}\cos\phi_{step} + K_{s2}\sin\phi_{step})}\right) \quad (87)$$

and $$\phi_3 = \cos^{-1}\left(\frac{K_{c2} + K_{c2}^2 + K_{s2}^2 + (1 + K_{c2} - K_{s2}^2)\cos\phi_{step} - (1 + K_{c2})K_{s2}\sin\phi_{step}}{(1 + K_{c2})(1 + K_{c2}\cos\phi_{step} - K_{s2}\sin\phi_{step})}\right). \quad (88)$$

For the case previously assumed in Eq. (6) where $\phi_{step}=90°$, Eqs. (87) and (88) reduce to $$\phi_1 = -\cos^{-1}\left(\frac{K_{c2} + K_{s2} + K_{c2}^2 + K_{s2}^2 + K_{c2}K_{s2}}{(1 + K_{c2})(1 + K_{s2})}\right) \quad (89)$$

and $$\phi_3 = \cos^{-1}\left(\frac{K_{c2} - K_{s2} + K_{c2}^2 + K_{s2}^2 - K_{c2}K_{s2}}{(1 + K_{c2})(1 - K_{s2})}\right). \quad (90)$$

As a further example of the application of histogram-based derippling, the technique is applied to a combination of phase-step errors and amplitude errors. Although the expression for $\phi_r(\hat{\phi})$ for this case is much more complicated than Eq. (86), it can be approximated for small values of $A_i-1$ and $\phi_i-\hat{\phi}_i$ as $$\phi'(\hat{\phi}) = \frac{1}{1 + K_{c1}\cos(\hat{\phi}) + K_{s1}\sin(\hat{\phi}) + K_{c2}\cos(2\hat{\phi}) + K_{s2}\sin(2\hat{\phi})}. \quad (91)$$

Once again, the coefficients $K_{C1}$, $K_{S1}$, $K_{C2}$, and $K_{S2}$ are obtainable through Fourier analysis, being the corresponding Fourier coefficients of a Fourier-series expansion of the reciprocal of the histogram used to approximate $\phi'(\hat{\phi})$. Setting $\hat{\phi}_2=\phi_2=0$ and $A_2=1$, and allowing unequal step sizes for the assumed values of $\hat{\phi}_1$ and $\hat{\phi}_3$, the newly approximated values of $\phi_1$, $\phi_3$, $A_1$, and $A_3$ can be determined from $K_{C1}$, $K_{S1}$, $K_{C2}$, and $K_{S2}$ through the relations $$\phi_1=\hat{\phi}_1+K_{c1}\sin\hat{\phi}_1+K_{s1}(1-\cos\hat{\phi}_1)+K_{c2}(\sin\hat{\phi}_3-\sin(\hat{\phi}_1+\hat{\phi}_3))-K_{s2}(\cos\hat{\phi}_3-\cos(\hat{\phi}_1+\hat{\phi}_3)), \quad (92)$$

$$\phi_3=\hat{\phi}_3+K_{c1}\sin\hat{\phi}_3+K_{s1}(1-\cos\hat{\phi}_3)+K_{c2}(\sin\hat{\phi}_1-\sin(\hat{\phi}_1+\hat{\phi}_3))-K_{s2}(\cos\hat{\phi}_1-\cos(\hat{\phi}_1+\hat{\phi}_3)), \quad (93)$$

$$A_1=1+K_{c1}(1-\cos\hat{\phi}_1)-K_{s1}\sin\hat{\phi}_1, \quad (94)$$

and $$A_3=1+K_{c1}(1-\cos\hat{\phi}_3)-K_{s1}\sin\hat{\phi}_3. \quad (95)$$

Because Eqs. (92)–(95) are based on the small-error approximation given by Eq. (91), the calculated values of $\phi_1$, $\phi_3$, $A_1$, and $A_3$ are improved, but not exact. If desired, higher accuracy can be obtained by iterating the procedure. To do so, the values of $\phi_1$ and $\phi_3$ calculated from Eqs. (92) and (93) become the new assumed values $\hat{\phi}_1$ and $\hat{\phi}_3$ in Eq. (82), and the values of $A_1$ and $A_3$ obtained from Eqs. (94) and (95) become the new assumed values $\hat{A}_1$, and $\hat{A}_3$ in Eq. (84). This procedure converges rapidly, providing many significant decimal places of precision in only a few iterations.

As an additional benefit, bias variations $B_i$ are handled automatically within the context of this iterative approach. As the number of iterations increases, the effects of bias variations $B_i$ are eliminated by being folded into the other parameters $A_i$ and $\phi_i$. This approach eliminates ripple, leaving a small offset error similar to the error introduced by the lack of precise knowledge of $\phi_2$.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. A method for determining, on an object having a surface, three-dimensional position information of a point on said surface of said object, said method comprising the steps of:
   a) providing two sources of radiation having a spatial distribution of spectral regions;
   b) illuminating said surface with said radiation from each of said sources to produce a first fringe pattern at a first position on said surface;
   c) moving said first fringe pattern to a second position;
   d) generating a first wrapped cycle map in response to said first and second positions of said first fringe pattern;
   e) estimating fringe numbers in said first fringe pattern;
   f) changing said first fringe pattern to generate a second fringe pattern at a first position;

g) moving said second fringe pattern to a second position;

h) generating a second wrapped cycle map in response to said first and second positions of said second fringe pattern;

i) estimating fringe numbers in said second fringe pattern in response to said estimated fringe numbers in said first fringe pattern; and j) determining said three-dimensional position information of said point on said surface in response to said estimated fringe numbers in said second fringe pattern and said second wrapped cycle map.

2. The method of claim 1 wherein said two sources of radiation are coherent with respect to one another.

3. The method of claim 1 wherein said two sources of radiation have a spectral distribution that is narrowband.

4. The method of claim 1 wherein the step of providing two sources of radiation comprises splitting radiation from a single source of radiation.

5. The method of claim 1 wherein the step of providing two sources of radiation comprises providing two sources of laser radiation.

6. The method of claim 1 wherein the steps of estimating fringe numbers in said first fringe pattern and said second fringe pattern comprise applying a mathematical model.

7. The method of claim 1 wherein the steps of estimating fringe numbers in said first fringe pattern and said second fringe pattern comprise applying a linear estimation model.

8. The method of claim 1 wherein the steps of estimating fringe numbers in said first fringe pattern and said second fringe pattern comprise applying three-dimensional position information determined for a different surface.

9. The method of claim 1 wherein each of said spectral regions of one of said sources is separated from a respective spectral region of the other of said sources by a respective distance proportional to the respective wavelength of said spectral regions.

10. The method of claim 9 wherein said distance is linearly proportional to said wavelength of said spectral regions.

11. The method of claim 1 wherein said step of changing said first fringe pattern comprises separating each of said spectral regions relative to the other of said spectral regions by a distance.

12. The method of claim 11 wherein said distance comprises a midpoint equidistant from each of two respective spectral regions and wherein the step of separating each of said spectral regions comprises changing said distance and keeping said midpoint fixed.

13. The method of claim 1 wherein said step of moving said second fringe pattern comprises the step of changing the phase of a spectral region in said spatial distribution from one of said sources relative to the phase of a respective spectral region in said spatial distribution from the other of said sources.

14. A method for synthesizing a wrapped cycle map corresponding to a fringe pattern of a predetermined spacing on a surface, said method comprising the steps of:

a) providing two sources of radiation having a spatial distribution of spectral regions;

b) illuminating said surface with said radiation from each of said sources to produce a first fringe pattern at a first position on said surface;

c) moving said first fringe pattern to a second position on said surface;

d) generating a first wrapped cycle map in response to said first and second positions of said first fringe pattern;

e) changing said first fringe pattern to generate a second fringe pattern at a first position;

f) moving said second fringe pattern to a second position;

g) generating a second wrapped cycle map in response to said first and second positions of said second fringe pattern;

h) subtracting said second wrapped cycle map from said first wrapped cycle map; and i) wrapping said difference between said second wrapped cycle map and said first wrapped cycle map to generate a wrapped cycle map corresponding to said fringe pattern of said predetermined spacing.

15. The method of claim 14 wherein said two sources of radiation are coherent with respect to one another.

16. The method of claim 14 wherein said two sources of radiation have a spectral distribution that is narrowband.

17. The method of claim 14 wherein the step of providing two sources of radiation comprises splitting radiation from a single source of radiation.

18. The method of claim 14 wherein the step of providing two sources of radiation comprises providing two sources of laser radiation.

19. The method of claim 14 wherein each of said spectral regions of one of said sources is separated from a respective spectral region of the other of said sources by a distance proportional to the respective wavelength of said spectral regions.

20. The method of claim 19 wherein said distance is linearly proportional to said wavelength of said spectral regions.

21. The method of claim 14 wherein said step of changing said first fringe pattern comprises separating each of said spectral regions relative to the other of said spectral regions by a distance.

22. The method of claim 21 wherein said distance comprises a midpoint equidistant from each of two respective spectral regions and wherein the step of separating each of said spectral regions comprises changing said distance and keeping said midpoint fixed.

23. The method of claim 14 wherein said step of moving said second fringe pattern comprises the step of changing the phase of a spectral region in said spatial distribution from one of said sources relative to the phase of a respective spectral region in said spatial distribution from the other of said sources.

24. The method of claim 14 wherein said two sources of radiation have a first frequency and wherein said step of changing said first fringe pattern to generate a second fringe pattern comprises changing said first frequency to a second frequency.

25. A method for determining, on an object having a surface, three-dimensional position information of a point on said surface of said object, said method comprising the steps of:

a) generating a first and a second beam of radiation, said first and second beams of radiation having a first frequency and being coherent with respect to one another;

b) illuminating said surface with said second beam of radiation;

c) generating a first interference pattern at a first position in response to said first beam of radiation and radiation from said second beam of radiation scattered by said surface;

d) moving said first interference pattern to a second position;

e) generating a first wrapped cycle map in response to said first and second positions of said first interference pattern;
f) estimating intensity cycles in said first interference pattern;
g) changing said first interference pattern to generate a second interference pattern at a first position;
h) moving said second interference pattern to a second position;
i) generating a second wrapped cycle map in response to said first and second positions of said second interference pattern;
j) estimating intensity cycles in said second interference pattern in response to estimated intensity cycles in said first interference pattern; and
k) calculating said three-dimensional position information in response to said estimated intensity cycles in said second interference pattern and said second wrapped cycle map.

26. The method of claim 25 wherein said step of changing said first interference pattern to generate a second interference pattern comprises changing said first frequency to a second frequency.

27. The method of claim 25 further comprising the step of imaging said surface onto an image plane.

28. The method of claim 27 wherein said image plane comprises a detector.

29. A method for determining, on an object having a surface, three-dimensional position information of a point on said surface of said object, said method comprising the steps of:
a) generating a first and a second beam of radiation, said first and second beams of radiation being coherent with respect to one another;
b) illuminating said surface with said second beam of radiation;
c) generating a first interference pattern in response to said first beam of radiation and radiation from said second beam of radiation scattered by said surface;
d) phase shifting one of said first and second beams of radiation with respect to the other of said first and second beams of radiation to generate a first phase shifted interference pattern;
e) generating a first wrapped cycle map in response to said first interference pattern and said first phase shifted interference pattern;
f) changing said first interference pattern to generate a second interference pattern;
g) phase shifting one of said first and second beams of radiation with respect to the other of said first and second beams of radiation to generate a second phase shifted interference pattern;
h) generating a second wrapped cycle map in response to said second interference pattern and said second phase shifted interference pattern;
i) subtracting said second wrapped cycle map from said first wrapped cycle map; and
j) wrapping said difference between said second wrapped cycle map and said first wrapped cycle map to generate a wrapped cycle map.

30. The method of claim 29 wherein said first and second beams of radiation have a first frequency and wherein said step of changing said first interference pattern to generate a second interference pattern comprises changing said first frequency to a second frequency.

31. The method of claim 29 further comprising the step of determining said three-dimensional position information by using said wrapped cycle map.

32. The method of claim 29 further comprising the step of imaging said surface onto an image plane.

33. The method of claim 32 wherein said image plane comprises a detector.

34. A method for determining, on an object having a surface, three-dimensional position information of a point on said surface of said object, said method comprising the steps of:
a) projecting a first cyclical pattern to produce a first projected pattern at a first position on said surface;
b) moving said first projected pattern to a second position;
c) generating a first wrapped cycle map in response to said first and second positions of said first projected pattern;
d) estimating cycle numbers in said first projected pattern;
e) changing said first projected pattern to generate a second projected pattern at a first position;
f) moving said second projected pattern to a second position;
g) generating a second wrapped cycle map in response to said first and second positions of said second projected pattern;
h) estimating cycle numbers in said second projected pattern in response to said estimated cycle numbers in said first projected pattern; and
i) determining said surface in response to said estimated cycle numbers in said second projected pattern and said second wrapped cycle map.

35. The method of claim 34 wherein the step of changing said first projected pattern comprises projecting a second cyclical pattern to generate a second projected pattern at a first position.

36. A method for synthesizing a wrapped cycle map corresponding to a projected cyclical pattern of a predetermined spacing on a surface, said method comprising the steps of:
a) projecting a first cyclical pattern to produce a first projected pattern at a first position on said surface;
b) moving said first projected pattern to a second position on said surface;
c) generating a first wrapped cycle map in response to said first and second positions of said first projected pattern;
d) changing said first projected pattern to generate a second projected pattern at a first position;
e) moving said second projected pattern to a second position;
f) generating a second wrapped cycle map in response to said first and second positions of said second projected pattern;
g) subtracting said second wrapped cycle map from said first wrapped cycle map; and
h) wrapping said difference between said second wrapped cycle map and said first wrapped cycle map to generate a wrapped cycle map corresponding to said projected cyclical pattern of said predetermined spacing.

37. The method of claim 36 wherein the step of changing said first projected pattern comprises projecting a second cyclical pattern to generate a second projected pattern at a first position.

38. A method for mitigating the effects of speckle on a measurement of a point on a surface of an object, said method comprising the steps of:

a) generating a coherent fringe pattern from two sources of radiation separated by a distance;

b) projecting the coherent fringe pattern onto the surface of the object;

c) detecting the fringe pattern and the speckle in an image of the surface of the object;

d) translating the two sources such that the fringe pattern remains substantially stationary and the speckle changes;

e) detecting the new fringe pattern and the changed speckle in an image of the surface of the object; and f) determining the fringe pattern substantially without speckle in response to the detected fringe patterns and the change in speckle.

39. The method of claim 38 further comprising the step of iteratively repeating steps d) and e).

40. The method of claim 38 wherein the two sources of radiation are laser radiation.

41. A method for mitigating the effects of speckle on a measurement of a point on a surface of an object, said method comprising the steps of:

a) generating a coherent fringe pattern from two sources of radiation separated by a distance;

b) projecting the coherent fringe pattern onto the surface of the object;

c) detecting the fringe pattern and the speckle in an image of the surface of the object;

d) translating the object laterally with respect to the two sources of radiation along a path parallel to the equiphase plane of the fringe pattern such that the fringe pattern remains substantially stationary with respect to the surface of the object and the speckle changes;

e) detecting the new fringe pattern and the changed speckle in an image of the surface of the object; and f) determining the fringe pattern substantially without speckle in response to the detected fringe patterns and the change in speckle.

42. The method of claim 41 further comprising the step of iteratively repeating steps d) and e).

43. The method of claim 41 wherein the two sources of radiation are laser radiation.

44. A method for mitigating the effects of speckle on a measurement of a point on a surface of an object, said method comprising the steps of:

a) projecting a coherent fringe pattern onto the surface of the object;

b) providing a lens having a transmission function having a gradual transmission drop off at the lens edge; and c) detecting the fringe pattern in an image of the surface of the object, wherein the transmission function substantially reduces the speckle influence on the measurement.

45. A method for mitigating the effects of speckle on a measurement of a point on a surface of an object, said method comprising the steps of:

a) generating a first fringe pattern from two sources of radiation having a first frequency and separated by a distance;

b) changing said first fringe pattern to generate a second fringe pattern by changing said first frequency to a second frequency; and c) changing said distance in response to the difference between said first frequency and second frequency, wherein the ratio of said distance to the difference between said first frequency and said second frequency is substantially constant.

46. A method for projecting fringes onto a surface of object, said method comprising the steps of:

a) providing two sources of radiation separated by a distance, each of said sources having a spectral distribution and being coherent with respect to the other of said sources;

b) illuminating said point on said surface of said object with said radiation from each of said sources;

c) moving one of said sources relative to the other of said sources;

d) detecting radiation scattered by said point on said surface of said object; and e) calculating position information in response to said movement of said sources and said detected radiation scattered by said point on said surface of said object.

47. The method of claim 46 wherein the step of moving one of said sources relative to the other of said sources comprises changing said distance between a spectral component of one of said sources relative to a respective spectral component of the other of said sources to change said distance between each of said spectral components of said sources.

48. The method of claim 47 wherein said distance comprises a midpoint equidistant from each of said spectral components of said sources and wherein the step of moving one of said sources relative to the other of said sources comprises changing said distance between a spectral component of one of said sources relative to a respective spectral component of the other of said sources to change said distance between each of said spectral components of said sources and keeping said midpoint fixed.

49. The method of claim 46 wherein the step of providing two sources of radiation comprises:

a) providing an initial beam of radiation having a spectral width;

b) generating a first radiation beam at a first beam angle and a second radiation beam at a second beam angle from said initial beam of radiation; and c) imaging said first radiation beam and said second radiation beam to form said two sources of radiation.

50. The method of claim 49 further comprising amplitude modulating said initial beam of radiation.

51. The method of claim 49 wherein said generating a first radiation beam and a second radiation beam comprises acousto-optically modulating with an acoustic field said initial beam.

52. The method of claim 51 wherein said step of acousto-optically modulating comprises the step of phase modulating said acoustic field.

53. The method of claim 51 wherein said step of acousto-optically modulating comprises the step of amplitude modulating said acoustic field.

54. The method of claim 46 wherein said step of moving one of said sources relative to the other of said sources comprises acousto-optically modulating said initial beam by frequency modulating an acoustic field.

55. An apparatus for projecting fringes onto a surface of an object, said apparatus comprising:

a) two sources of radiation separated by a distance, each of said sources having a spectral distribution and being coherent with respect to the other of said sources;

b) control system moving each of said sources relative to the other of said sources;

c) a detector positioned to receive radiation scattered from said point on said surface of said object; and d) a processor receiving signals from said detector, said processor calculating position information in response to said movement of said sources and said received radiation scattered from said point on said surface of said object.

56. The apparatus of claim 55 wherein said control system moves each of a spectral component of one of said sources of radiation relative to a respective spectral component of the other of said sources of radiation to change said distance between each of said spectral components of said two sources of radiations.

57. The apparatus of claim 56 wherein said distance comprises a midpoint equidistant from each of said spectral components of said sources and said control system moves each of said spectral components of said sources relative to the other of said spectral components of said sources to change said distance and keep said midpoint fixed.

58. The apparatus of claim 55 wherein said detector comprises a plurality of photodetectors and wherein said processor comprises a multiprocessor system having a plurality of processing units and each of said plurality of photodetectors is in electrical communication with a respective one of said plurality of processing units.

59. The apparatus of claim 55 wherein said two sources of radiation comprise:

a) an initial source of a beam of radiation having a spectral width;

b) a beam separator in optical communication with said initial source of a beam of radiation, said beam separator generating a first optical beam and a second optical beam; and c) an imaging system in optical communication with said beam separator, said imaging system generating said two sources of radiation each respective source of radiation corresponding to said first optical beam and said second optical beam, respectively.

60. The apparatus of claim 59 wherein said beam separator is a diffraction grating.

61. The apparatus of claim 55 wherein a point at a wavelength in said spectral distribution of one source is separated from a respective point at said wavelength in said spectral distribution of the other source by said distance, said distance being substantially proportional to said wavelength of said points.

62. The apparatus of claim 55 wherein said control system further comprises a phase shifter.

63. The apparatus of claim 62 wherein said phase shifter is a translator for changing the position of said beam separator relative to said beam of radiation.

64. The apparatus of claim 55 wherein said control system comprises a zoom lens having a variable focal length, said zoom lens varying said distance of separation in response to a change in said variable focal length.

65. The apparatus of claim 55 wherein said control system comprises a plurality of lenses of different focal length, said distance of separation corresponding to a respective focal length of one of said plurality of lenses.

66. The apparatus of claim 60 wherein said diffraction grating is a spatial light modulator.

67. The apparatus of claim 66 wherein said spatial light modulator has an adjustable grating period, said grating period being responsive to an electrical signal applied to said spatial light modulator.

68. The apparatus of claim 59 wherein said beam separator is an acousto-optic modulator.

69. The apparatus of claim 59 further comprising an amplitude modulator in optical communication with said initial source of a beam of radiation.

70. The apparatus of claim 59 further comprising an order-blocking mask.

71. The apparatus of claim 70 wherein the order-blocking mask is a double-slit mask.

72. The apparatus of claim 59 further comprising an amplitude modulator in optical communication with said beam separator, said amplitude modulator modulating the amplitude of said initial source.

73. A method for determining, on an object having a surface, three-dimensional position information of a point on said surface of said object, said method comprising the steps of:

a) providing two sources of radiation, each of said two sources of radiation having a spectral distribution and being coherent with respect to the other of said two sources;

b) providing a detector at said point on said surface;

c) illuminating said point on said surface of said object with said radiation from each of said sources;

d) moving each of said sources relative to each other;

e) detecting said radiation at said point on said surface of said object; and f) calculating position information in response to said movement of said sources and said radiation detected at said point on said surface of said object.

74. The method of claim 73 wherein said two sources of radiation have a spectral distribution that is narrowband.

75. The method of claim 73 further comprising the step of changing the phase of a spectral component in said spectral distribution of said radiation from one of said sources relative to the phase of a respective spectral component in said spectral distribution of said radiation from the other of said sources as measured at said point on said surface of said object.

76. The method of claim 73 wherein said sources of radiation are virtual sources of radiation.

77. The method of claim 73 wherein the step of moving each of said sources comprises changing the distance between a spectral component of one of said sources relative to a respective spectral component of the other of said sources to change the distance between each of said spectral components of said sources.

78. The method of claim 77 wherein said distance comprises a midpoint equidistant from each of said spectral components of said sources and wherein the step of moving each of said sources comprises changing said distance between a spectral component of one of said sources relative to a respective spectral component of the other of said sources to change said distance between each of said spectral components of said sources and keeping said midpoint fixed.

79. An apparatus for determining, on an object having a surface, three-dimensional position information of a point on said surface of said object, said apparatus comprising:

a) two sources of radiation, each of said sources having a spectral distribution and being coherent with respect to one another;

b) a control system moving each of said sources relative to each other;

c) a detector positioned at said point on said surface of said object to receive radiation illuminating said point on said surface of said object; and d) a processor receiving signals from said detector, said processor calculating position information of said point on said surface of said object in response to said movement of said sources and said radiation received at said point on said surface of said object.

80. The apparatus of claim 79 wherein said two sources of radiation have a spectral distribution that is narrowband.

81. The apparatus of claim 79 wherein said control system changes the phase of a spectral component in said spectral distribution of said radiation from one of said sources relative to the phase of a respective spectral component in said spectral distribution of said radiation from the other of said sources as measured at said point on said surface of said object.

82. The apparatus of claim 79 wherein said sources of radiation are virtual sources of radiation.

83. The apparatus of claim 79 wherein said control system moves each of a spectral component of one of said sources of radiation relative to a respective spectral component of the other of said sources of radiation to change said distance between each of said spectral components of said two sources of radiation.

84. The apparatus of claim 83 wherein said distance comprises a midpoint equidistant from each of said spectral components of said sources and said control system moves each of said spectral components of said sources relative to the other of said spectral components of said sources to change said distance and keep said midpoint fixed.

* * * * *

UNITED STATES PATENT AND TRADEMARK OFFICE
CERTIFICATE OF CORRECTION

| | | |
|---|---|---|
| PATENT NO. | : 6,690,474 B1 | Page 1 of 1 |
| APPLICATION NO. | : 09/480043 | |
| DATED | : February 10, 2004 | |
| INVENTOR(S) | : Lyle Shirley | |

It is certified that error appears in the above-identified patent and that said Letters Patent is hereby corrected as shown below:

Delete the paragraph titled 'GOVERNMENT SUPPORT' encompassing column 1, line 16-19:

"Work described herein was supported by Federal Contract No. F19628-95-L-002, awarded by the United States Air Force. The Government may have certain rights in the invention."

and replace with:

--This invention was made with government support under Contract No. F19628-95-C-0002 awarded by the U.S. Air Force. The government has certain rights in this invention.--

Signed and Sealed this

Fourth Day of December, 2012

David J. Kappos
*Director of the United States Patent and Trademark Office*